(12) United States Patent
Iwatsuka

(10) Patent No.: US 7,072,111 B2
(45) Date of Patent: Jul. 4, 2006

(54) REFLECTION-TYPE OPTICAL DEVICE

(75) Inventor: Shinji Iwatsuka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/964,915

(22) Filed: Oct. 15, 2004

(65) Prior Publication Data

US 2005/0111102 A1  May 26, 2005

(30) Foreign Application Priority Data

Oct. 20, 2003 (JP) ............................ 2003-358975
Nov. 19, 2003 (JP) ............................ 2003-388995
Apr. 28, 2004 (JP) ............................ 2004-133953

(51) Int. Cl.
  *G02B 5/30* (2006.01)
  *G02F 1/09* (2006.01)
(52) U.S. Cl. ...................... 359/484; 359/495; 359/497; 359/282; 385/11
(58) Field of Classification Search ................ 359/281, 359/282, 484, 487, 495, 497; 385/11
See application file for complete search history.

(56) References Cited

U.S. PATENT DOCUMENTS

| 5,204,771 | A | | 4/1993 | Koga | |
|---|---|---|---|---|---|
| 5,345,329 | A | * | 9/1994 | Shirai et al. ................ | 359/282 |
| 5,471,340 | A | | 11/1995 | Cheng et al. | |
| 5,689,359 | A | * | 11/1997 | Kurata et al. ............... | 359/281 |
| 5,724,165 | A | * | 3/1998 | Wu ............................. | 398/55 |
| 5,768,005 | A | * | 6/1998 | Cheng et al. ................ | 359/281 |
| 5,930,422 | A | | 7/1999 | Cheng | |
| 6,111,695 | A | | 8/2000 | Lee | |
| 6,154,581 | A | * | 11/2000 | Lu et al. ..................... | 385/11 |
| 6,212,313 | B1 | * | 4/2001 | Li ............................... | 385/24 |
| 6,239,900 | B1 | * | 5/2001 | Chen et al. ................. | 359/282 |
| 6,246,518 | B1 | * | 6/2001 | Chang et al. ............... | 359/494 |
| 6,549,686 | B1 | * | 4/2003 | Huang et al. ............... | 385/11 |
| 6,631,238 | B1 | * | 10/2003 | Liu et al. .................... | 385/140 |
| 6,636,651 | B1 | * | 10/2003 | Li ............................... | 385/11 |
| 6,795,242 | B1 | * | 9/2004 | Pan et al. ................... | 359/484 |
| 6,795,245 | B1 | * | 9/2004 | Xiao .......................... | 359/495 |

FOREIGN PATENT DOCUMENTS

| JP | A-05-061001 | 3/1993 |
|---|---|---|
| JP | A-07-306390 | 11/1995 |
| JP | A-11-258549 | 9/1999 |
| JP | B2-3008959 | 12/1999 |
| JP | A-2003-509721 | 3/2003 |
| WO | WO-01/20390 A1 | 3/2001 |

* cited by examiner

*Primary Examiner*—Ricky D. Shafer
(74) *Attorney, Agent, or Firm*—Oliff & Berridge, PLC

(57) ABSTRACT

A reflection-type optical device used for an optical communication system, in which an element structure can be simplified and excellent optical characteristics are obtained. The reflection-type optical device includes a birefringent plate, a magnetic domain A of a Faraday rotator, a magnetic domain B of the Faraday rotator, a birefringent plate which allows the light beams to pass through as extraordinary rays, and a birefringent plate which allows a light beam having been reflected by a reflecting film and having passed through the birefringent plate and the magnetic domain A to pass through as an extraordinary ray, allows a light having been reflected by the reflecting film and having passed through the birefringent plate and the magnetic domain B to pass through as an ordinary ray, and emits a light beam from a light incoming/outgoing port.

12 Claims, 33 Drawing Sheets

REFLECTION-TYPE OPTICAL DEVICE

BACKGROUND OF THE INVENTION

1. Field of the Invention

The present invention relates to a reflection-type optical device used for an optical communication system, such as a reflection-type circulator, a reflection-type isolator or a reflection-type optical switch.

2. Description of the Related Art

As optical devices used for an optical communication system, there are an optical circulator, an optical isolator and an optical switch. Many structures are known for the optical circulator, the optical isolator and the optical switch. As compared with a transmission type, according to a reflection-type optical circulator, optical isolator, or optical switch in which an optical fiber is disposed at only one side and a reflecting plate is disposed at the other side, the accommodation space of the optical fiber in a case where the reflection-type device is disposed in an apparatus can be made small, and therefore, the reflection type is effective in miniaturization of the whole apparatus.

FIGS. 34A and 34B show a structure of a conventional reflection-type optical circulator disclosed in patent document 1 (U.S. Pat. No. 5,471,340). As shown in FIGS. 34A and 34B, this reflection-type optical circulator includes three pairs of optical fibers 100 and lenses 102, a birefringent plate 104, two ½ wavelength plates 106 and 107, a Faraday rotator 108, a birefringent plate 110, a Faraday rotator 112 and a reflecting mirror 114. In the structure shown in FIGS. 34A and 34B, except the reflecting mirror 114 and the lens 102, three kinds and six optical elements (the two birefringent plates 104 and 110, the two ½ wavelength plates 106 and 107, and the two Faraday rotators 108 and 112) are required, and the element structure of the reflection-type optical circulator becomes complicated. Thus, there arises a problem that it becomes difficult to miniaturize the reflection-type optical circulator and to reduce the cost thereof. Besides, in the structure shown in FIGS. 34A and 34B, also when a light beam having passed through the birefringent plate 104 as an ordinary ray is reflected by the reflecting mirror 114 and is returned, it passes through the birefringent plate 104 as the ordinary ray. On the other hand, also when a light beam having passed through the birefringent plate 104 as an extraordinary ray is reflected by the reflecting mirror 114 and is returned, it passes through the birefringent plate 104 as the extraordinary ray. Since a light path length is difference between the case of passing through as the ordinary ray and the case of passing through as the extraordinary ray, in this structure, a value of polarization mode dispersion (PMD) does not become 0 but becomes large.

FIGS. 35A and 35B shows another conventional reflection-type optical circulator disclosed in the patent document 1. As shown in FIGS. 35A and 35B, this reflection-type optical circulator includes three pairs of optical fibers 100 and lenses 102, a birefringent plate 104, a Faraday rotator 108, two birefringent plates 110a and 110b, a Faraday rotator 112, and a reflecting mirror 114. In the structure shown in FIGS. 35A and 35B, although the element structure becomes simpler than the structure shown in FIGS. 34A and 34B, there arises a problem that the PMD value does not become 0 because of the same reason as the above.

FIG. 36 shows a structure of a conventional reflection-type optical circulator disclosed in patent document 2 (U.S. Pat. No. 5,930,422). As shown in FIG. 36, this reflection-type optical circulator includes three optical fibers 100, a birefringent plate 104, four ½ wavelength plates 106 (only two are shown in FIG. 36), a Faraday rotator 108, a birefringent plate 110, a lens 102 and a reflecting mirror 114. In the structure shown in FIG. 36, except the reflecting mirror 114 and the lens 102, three kinds and seven optical elements (the two birefringent plates 104 and 110, the four ½ wavelength plates 106 and the one Faraday rotator 108) are required, and the element structure of the reflection-type optical circulator becomes complicated. Thus, there arises a problem that it becomes difficult to miniaturize the reflection-type optical circulator and to reduce the cost thereof. Besides, because of the same reason as the above, there arises a problem that the PMD value does not become zero.

FIGS. 37A and 37B show a structure of a conventional reflection-type optical circulator disclosed in patent document 3 (U.S. Pat. No. 6,111,695). As shown in FIGS. 37A and 37B, this reflection-type optical circulator includes a birefringent plate 104, a birefringent plate 105, two Faraday rotators 108a and 108b, a birefringent plate 110, two Faraday rotators 112a and 112b and a reflecting mirror 114. In this structure, a light beam having passed through the birefringent plate 104 as an ordinary ray passes through the birefringent plate 105 as an extraordinary ray, and when it is reflected by the reflecting mirror 114 and is returned, it passes through the birefringent plate 105 as the extraordinary ray, and passes through the birefringent plate 104 as the ordinary ray. On the other hand, a light beam having passed through the birefringent plate 104 as an extraordinary ray passes through the birefringent plate 105 as an ordinary ray, and when it is reflected by the reflecting mirror 114 and is returned, it passes through the birefringent plate 105 as the ordinary ray and passes through the birefringent plate 104 as the extraordinary ray. Thus, in the structure shown in FIGS. 37A and 37B, the PMD value becomes zero. Such combination of the two birefringent plates 104 and 105 is known as a Savart plate. The Savart plate is used as an element to give a lateral shift to two polarized components perpendicular to each other without causing a phase difference. However, in the structure using the Savart plate as shown in FIGS. 37A and 37B, except the reflecting mirror 114 and a lens (not shown), seven optical elements (the three birefringent plates 104, 105 and 110, and the four Faraday rotators 108a, 108b, 112a and 112b) are required, and the element structure of the reflection-type optical circulator becomes complicated. Thus, there arises a problem that it becomes difficult to miniaturize the reflection-type optical circulator and to reduce the cost thereof.

As described above, the conventional reflection-type optical device has at least one of the problems that the element structure becomes complicated so that the miniaturization and reduction in cost become difficult, and the PMD value does not become zero.

SUMMARY OF THE INVENTION

An object of the present invention is to provide a reflection-type optical device in which an element structure can be simplified and excellent optical characteristics can be obtained.

The above object can be achieved by a reflection-type optical device including a first polarization separation/combination part for separating a light beam incident from a first port into a first light beam having an ordinary ray component and a second light beam having an extraordinary ray component and emitting them, a first Faraday rotating part for rotating a polarization direction of the first light beam by 45° and emitting it as a third light beam, a second Faraday rotating part for rotating a polarization direction of the second light beam by −45° and emitting it as a fourth light beam having a polarization direction substantially parallel to a polarization direction of the third light beam, a polarizer which allows the third and the fourth light beams to pass through, a reflecting part for reflecting the third and the fourth light beams, and a second polarization separation/combination part which allows the third light beam, which has been reflected by the reflecting part and has passed through the polarizer and a third Faraday rotating part, to pass through as an extraordinary ray, allows the fourth light beam, which has been reflected by the reflecting part and has passed through the polarizer and a fourth Faraday rotating part, to pass through as an ordinary ray, combines the third and the fourth light beams, and emits them from a second port.

In the reflection-type optical device of the invention, the first to the fourth Faraday rotating parts includes a same magneto-optical element.

In the reflection-type optical device of the invention, the first polarization separation/combination part includes a first birefringent plate, the second polarization separation/combination part includes a second birefringent plate, the first and the third Faraday rotating parts include a same region of a first magneto-optical element, and the second and the fourth Faraday rotating parts include a same region of a second magneto-optical element.

In the reflection-type optical device of the invention, the polarizer is a third birefringent plate, and the reflecting part is a dihedral reflector.

In the reflection-type optical device of the invention, the first and the second polarization separation/combination part include a same birefringent plate, the first and the fourth Faraday rotating parts include a same region of a first magneto-optical element, and the second and the third Faraday rotating parts include a same region of a second magneto-optical element.

In the reflection-type optical device of the invention, the first and the second magneto-optical elements are the same.

The reflection-type optical device of the invention includes at least one ½ wavelength plate for rotating a polarization direction by 90°, and the reflecting part includes a lens and a reflecting film.

In the reflection-type optical device of the invention, the first Faraday rotating part and the second Faraday rotating part respectively include Faraday rotators which have a same material composition and in which directions of magnetization are opposite to each other.

In the reflection-type optical device of the invention, the first Faraday rotating part has a magnetic domain A in which magnetization is made uniformly to have one direction in one region of the Faraday rotator, and the second Faraday rotating part has a magnetic domain B in which magnetization is made uniformly to have a direction opposite to the magnetic domain A in the other region of the Faraday rotator.

In the reflection-type optical device of the invention, the first and the second polarization separation/combination parts include a same birefringent plate.

The reflection-type optical device of the invention further comprises a magnetic field application system inverting directions of magnetization of the first to the fourth Faraday rotating parts by applying a variable magnetic field so as to invert polarization rotation directions of the first to the fourth Faraday rotating parts.

According to the invention, the reflection-type optical device can be realized in which the element structure can be simplified and excellent optical characteristics can be obtained.

DETAILED DESCRIPTION OF THE INVENTION

FIRST EMBODIMENT

Figure 1A:
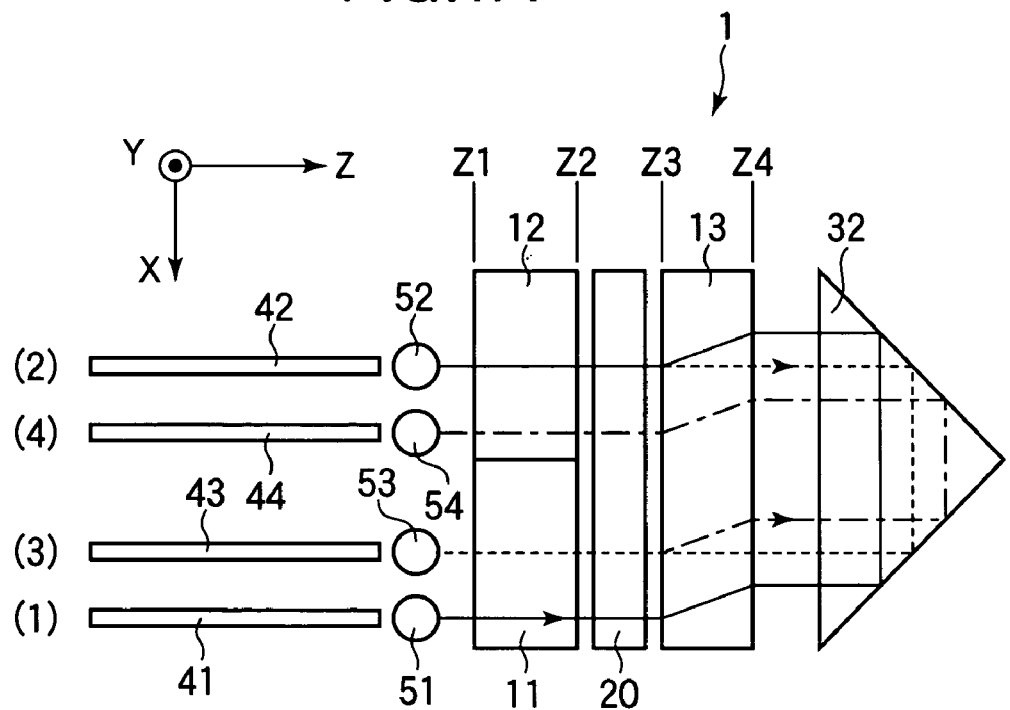
FIGS. 1A and 1B are views schematically showing a structure of a reflection-type optical device according to a first embodiment of the invention.
Figure 1B:
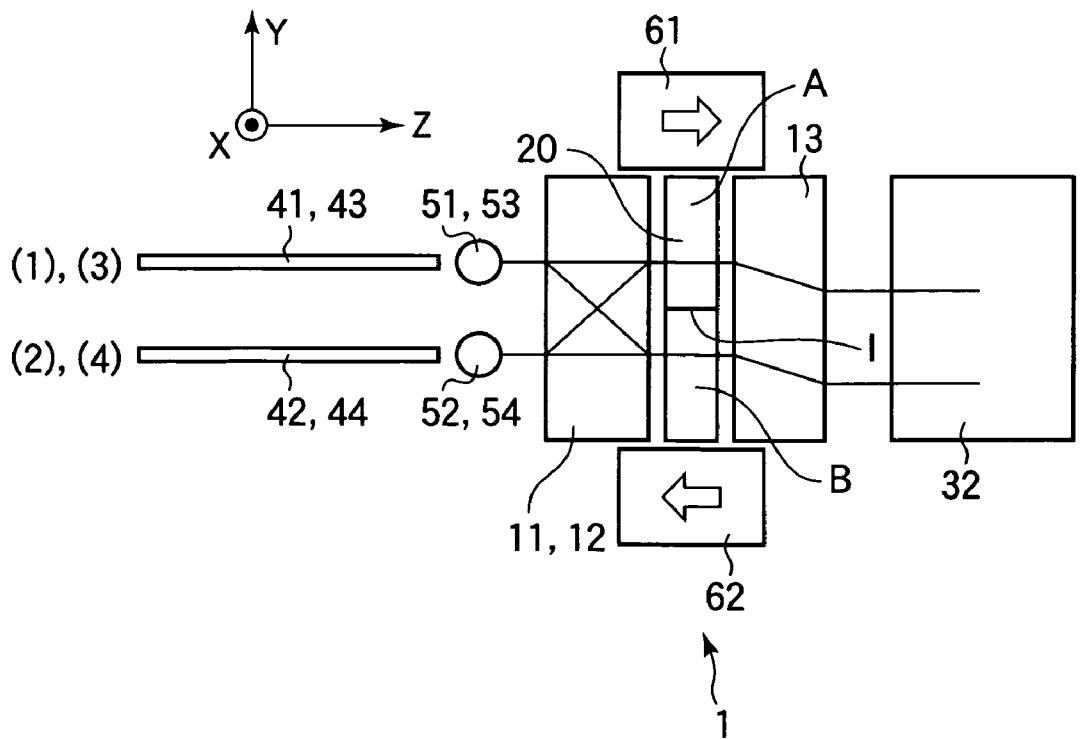

A reflection-type optical device according to a first embodiment of the invention will be described with reference to FIGS. 1A to 6D. FIGS. 1A and 1B schematically show a structure of a reflection-type optical circulator according to this embodiment. In FIGS. 1A and 1B, the Z axis is made in a traveling direction of light, and the +Z direction is a direction in which external light travels toward a dihedral reflector (reflecting part) 32 included in the reflection-type optical circulator. The X axis and the Y axis are made in two directions perpendicular to each other in a plane perpendicular to the Z axis. FIG. 1A shows a structure in which the reflection-type optical circulator is viewed in the −Y direction, and FIG. 1B shows a structure in which the reflection-type optical circulator is viewed in the −X direction.

As shown in FIGS. 1A and 1B, a reflection-type optical circulator 1 is connected to four optical fibers 41, 42, 43 and 44. End parts of the respective optical fibers 41, 42, 43 and 44 at the −Z side are light incoming/outgoing ports P1, P2, P3 and P4 (denoted by numerals (1) to (4) in the drawing) on which light is incident from the outside or which emit light to the outside. Lenses 51, 52, 53 and 54 for converting divergent light beams emitted from the optical fibers 41, 42, 43 and 44 into parallel light beams are respectively disposed in the +Z direction of the respective optical fibers 41, 42, 43 and 44. In order to miniaturize the reflection-type optical circulator 1 and an apparatus containing it, the miniaturization of the lenses 51, 52, 53 and 54 becomes important.

Figure 2A:
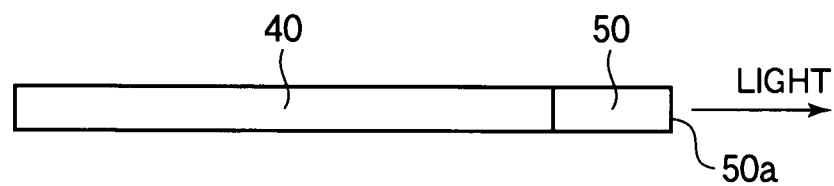
FIGS. 2A and 2B are views showing an example of a structure of a lens which can be miniaturized.

FIG. 2A shows an example of a structure of a lens which can be miniaturized. As shown in FIG. 2A, a gradient index lens (GI lens) 50 coaxial with an optical finer 40 and having a cylindrical shape is fused to a tip end of the single mode optical fiber 40. The GI lens 50 has a diameter (for example, 125 μm) substantially equal to the diameter of the single mode optical fiber 40. The optical fiber 40 and the GI lens 50 are united to each other and function as an optical fiber with a lens. The GI lens 50 has an end face 50a perpendicular to its cylindrical axis. Light incident on the GI lens 50 from the optical fiber 40 is converted into parallel light, and is emitted from the end face 50a in a direction perpendicular to the end face 50a (direction parallel to the cylindrical axis of the optical fiber 40 and the GI lens 50). Since the outer diameter of the GI lens 50 can be made small as compared with a spherical lens, it is suitable for use in the lenses 51, 52, 53 and 54 of the reflection-type optical circulator 1 of this embodiment shown in FIGS. 1A and 1B.

Figure 2B:
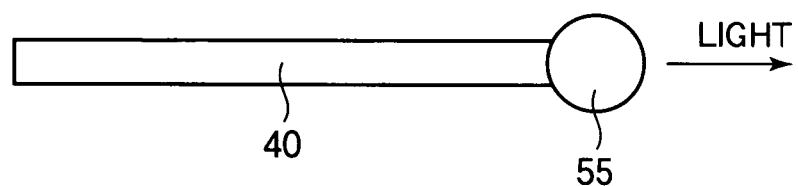

FIG. 2B shows a modified example of the structure of the lens. As shown in FIG. 2B, an optical fiber with a lens in which a small spherical lens 55, instead of the GI lens 50, is fixed to an optical fiber 40 is also desirable in the embodiment. In addition to these structures, a core expansion (TEC: Thermal Expansion Core) fiber in which a core is expanded and a core expanded region having the same function as a lens is provided in the vicinity of a tip end can also be used.

With reference to FIGS. 1A and 1B again, a birefringent plate (polarization separation/combination part) 11 is disposed in the +Z direction of the lenses 51 and 53, and a birefringent plate 12 is disposed in the +Z direction of the lenses 52 and 54. The two birefringent plates 11 and 12 are disposed to be adjacent to each other in parallel to the X-Y plane, and has light incoming/outgoing planes perpendicular to the Z axis. Here, in optics, although there is a case where the "light incoming plane" is defined as a plane including an incoming light beam and a normal of a boundary surface, the "light incoming/outgoing plane" in the present specification is different from this definition, and means a plane of birefringent plates 11 and 12 (or another optical element) on/from which light is incident/emitted.

Figure 3A:
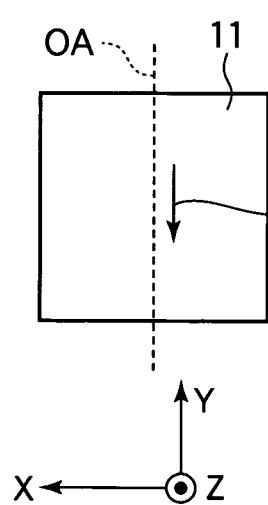
FIGS. 3A and 3B are views for explaining an optic axis of a birefringent plate.
Figure 3B:
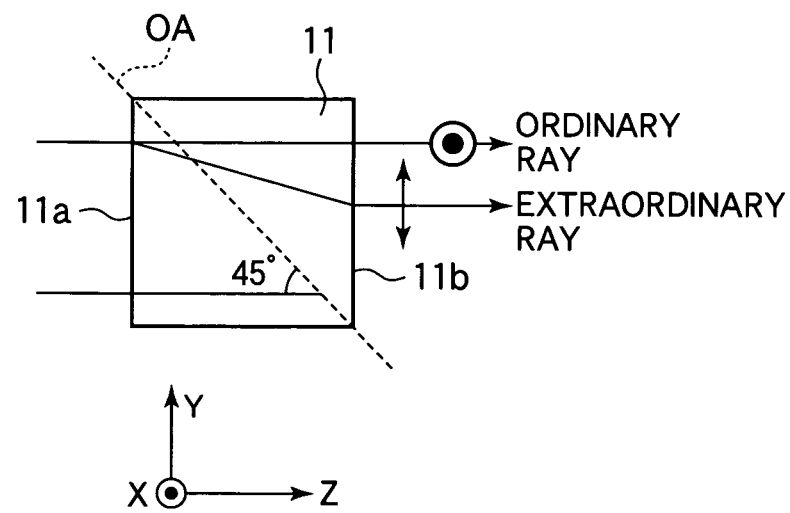

FIGS. 3A and 3B are views for explaining an optic axis of the birefringent plate 11. FIG. 3A shows a structure of the birefringent plate 11 when viewed in the −Z direction, and FIG. 3B shows a structure of the birefringent plate 11 when viewed in the −X direction. As shown in FIGS. 3A and 3B, an optic axis OA of the birefringent plate 11 is disposed in parallel to the Y-Z plane. An angle between the optic axis OA and the X-Z plane is about 45° in a clockwise direction with respect to the X axis when viewed in the −X direction. Light incident on a light incoming/outgoing plane (parallel to the X-Y plane in this example) 11a vertically is separated into an ordinary ray and an extraordinary ray, and are emitted onto optical paths different from each other. At this time, the extraordinary ray is axially shifted from the ordinary ray, for example, downward (−Y direction) as shown in FIG. 3B. Hereinafter, in the drawing in which the birefringent plate 11 is viewed in the −Z direction like FIG. 3A, that the extraordinary ray of the light incident in the +Z direction is axially shifted downward is denoted by a downward single-headed arrow C. On the other hand, since the birefringent plate 12 is disposed so that the angle between the optic axis OA and the X-Z plane becomes 45° in the counterclockwise direction with respect to the X axis when viewed in the −X direction, the extraordinary ray is axially shifted upward with respect to the ordinary ray in FIG. 3B (not shown). Accordingly, in the case where the birefringent plate 12 is viewed in the −Z direction, that the extraordinary ray of the light incident in the +Z direction is axially shifted upward is denoted by an upward single-headed arrow C. As crystal constituting the birefringent plates 11 and 12, rutile (TiO$_2$), yttrium vanadate (YVO$_4$) or the like is used. The birefringent plates 11 and 12 are elements obtained by, for example, cutting the same crystal into the same shape and having the same specification, and are disposed to be adjacent to each other so that the optic axis OA is parallel to the Y-Z plane and the directions of the axial shifts of the extraordinary rays are opposite to each other. Incidentally, according to the optical characteristics of birefringent crystal, the birefringent plate 11 in which the optic axis OA is arranged as shown in FIG. 3B and the axial shift occurs upward may be combined and used.

With reference to FIGS. 1A and 1B again, a Faraday rotator 20 as a magneto-optical element having irreciprocity is disposed in the +Z direction of the birefringent plates 11 and 12. The Faraday rotator 20 is formed by, for example, a liquid phase epitaxial (LPE) method, and is formed by using a magnetic garnet single crystal film having perpendicular magnetic properties in which an axis of easy magnetization appears in the direction perpendicular to the film growth plane. A permanent magnet 61 is disposed at an end part of the Faraday rotator 20 in the +Y direction, and a permanent magnet 62 is disposed at an end part thereof in the −Y direction. The permanent magnets 61 and 62 have magnetic poles opposite to each other. For example, as indicated by arrows in the drawing, the direction of the magnetic pole of the permanent magnet 61 is the +Z direction, and the direction of the permanent magnet 62 is the −Z direction. In the magnetic field applied to a region of the Faraday rotator 20 at the +Y side from substantially the center, a magnetic component of the permanent magnet 61 in the −Z direction becomes dominant. On the other hand, in the magnetic field applied to a region of the Faraday rotator 20 at the −Y side from substantially the center, a magnetic field component of the permanent magnet 62 in the +Z direction becomes dominant. The intensity of the magnetic field applied to both the regions is made higher than the saturation magnetic field of the Faraday rotator, so that a magnetic domain A in which the magnetization is made uniformly to have one direction is formed in the region where the magnetic field in the −Z direction is applied, and a magnetic domain B in which the magnetization is made uniform in the direction opposite to the magnetic domain A is formed in the region where the magnetic field in the +Z direction is applied. A magnetic wall I is formed at a boundary surface between the magnetic domain A and the magnetic domain B. A Faraday rotation angle of the magnetic domain A in this example is, for example, 45° in the clockwise direction with respect to the Z axis when viewed in the −Z direction, and similarly, a Faraday rotation angle of the magnetic domain B is 45° in the counterclockwise direction. Since the Faraday rotator 20 has the irreciprocity, even if light is incident from any one of the two light incoming/outgoing planes of the Faraday rotator 20, the condition of the rotation angle is kept. Incidentally, instead of making the one Faraday rotator 20 function as two Faraday rotating parts, a Faraday rotating part functioning as one Faraday rotating part and another Faraday rotating part functioning as the other Faraday rotating part may be disposed to be adjacent to each other in the Y direction. In this case, both the Faraday rotating parts are made to have, for example, the same material composition. It is also naturally possible to use, instead of the permanent magnets 61 and 62, semihard magnets in which the retentivity is smaller than the permanent magnet and the magnetization can be inverted.

A birefringent plate 13 is disposed in the +Z direction of the Faraday rotator 20. The birefringent plate 13 is formed by using, for example, the same crystal as the birefringent plates 11 and 12. When the coordinate system shown in FIGS. 1A, 1B, 3A and 3B is used, the optic axis of the birefringent plate 13 is parallel to a plane obtained by rotating the Y-Z plane counterclockwise by 45° with respect to the Y axis when viewed in the −Y direction, and is not included in at least planes parallel to the optic axes of the birefringent plates 11 and the birefringent plate 12. The extraordinary ray of light incident on the birefringent plate 13 in the +Z direction is axially shifted in both directions of the −X direction and the −Y direction. A dihedral reflector 32, such as a rectangular prism, is disposed at the +Z side of the birefringent plate 13. The dihedral reflector 32 has a function to change an optical path by dihedral reflection. In addition to the rectangular prism as shown in FIGS. 1A and 1B, the dihedral reflector 32 may have such a structure that two reflecting mirrors (reflecting plates) are combined.

In this embodiment, the reflection-type optical circulator 1 can be constructed by using the four optical elements (the three birefringent plates 11, 12 and 13 and the one Faraday rotator 20). Even in the case where the magnetic domain structure of the Faraday rotator 20 is not used, but two Faraday rotators are used, the reflection-type optical circulator 1 can be constructed by using the five optical elements. As the birefringent plates 11 and 12, for example, elements cut from the same crystal and having the same specification can be used. Accordingly, according to this embodiment, the element structure of the reflection-type optical circulator 1 becomes simple, and miniaturization and reduction in cost become easy.

Incidentally, in FIGS. 1A and 1B, although the light is made vertically incident on the respective elements, in order to prevent the reflected light from the respective boundary surfaces from returning to the origin, it is desirable to dispose the respective elements obliquely to the incident light.

Figure 4:
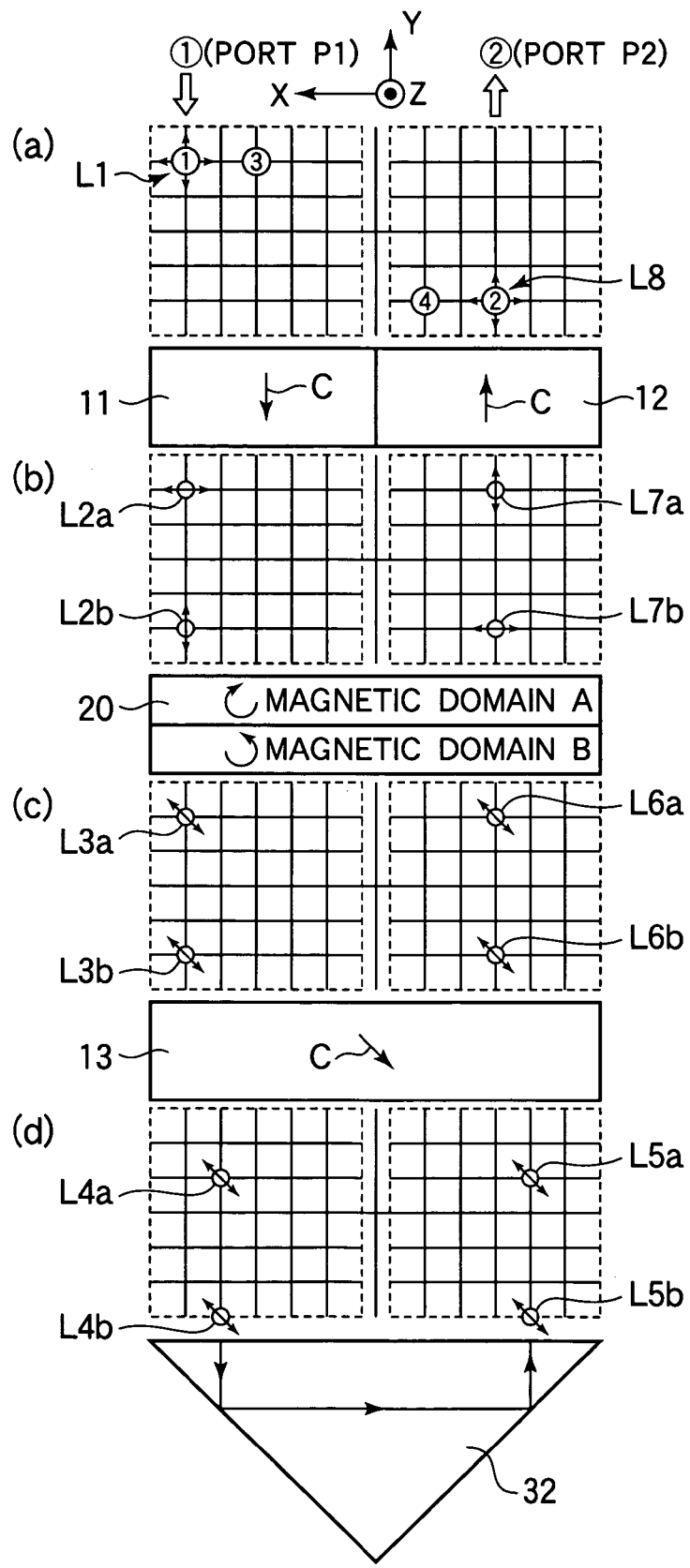
FIG. 4 is a view showing polarization states of light beams passing through respective optical elements constituting a reflection-type optical circulator.
Figure 5:
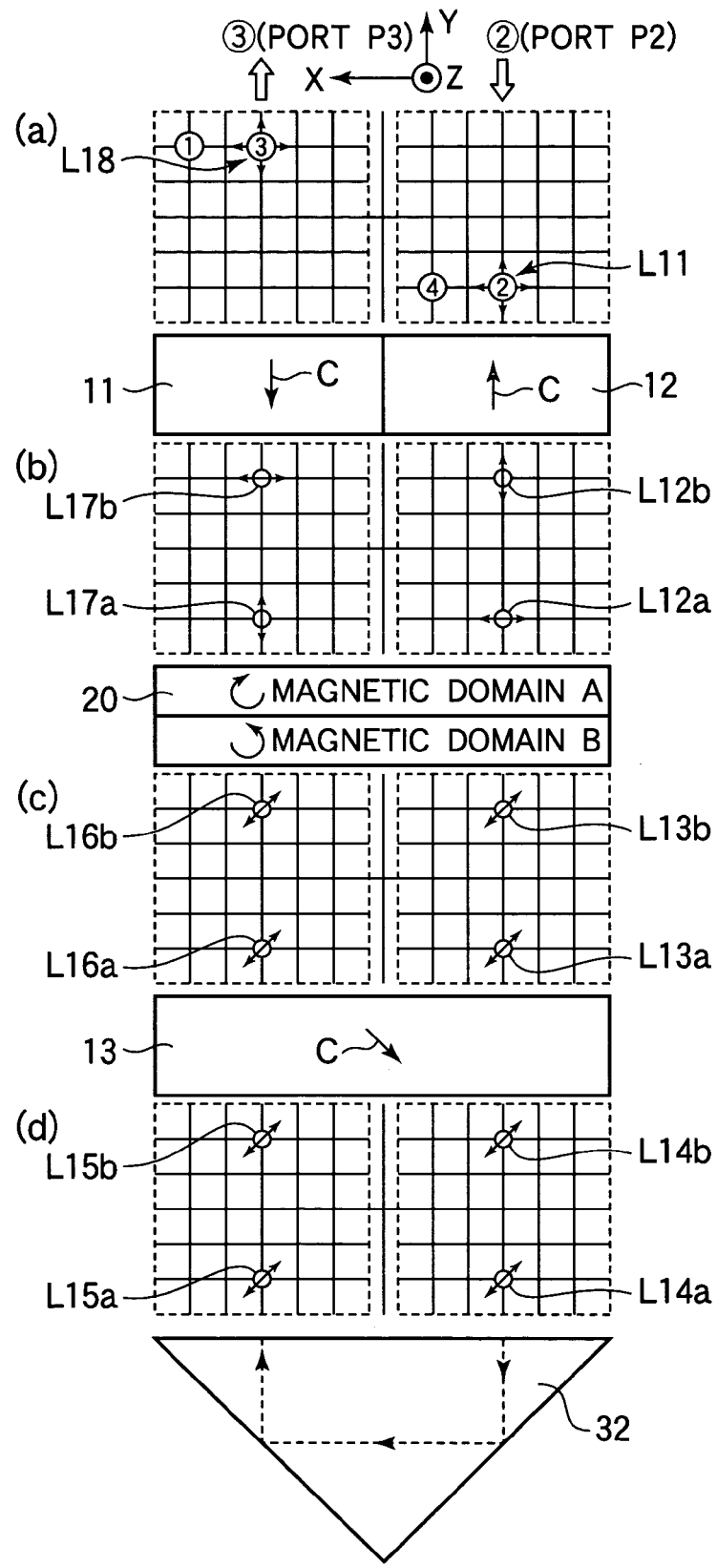
FIG. 5 is a view showing polarization states of light beams passing through the respective optical elements constituting the reflection-type optical circulator.
Figure 6:
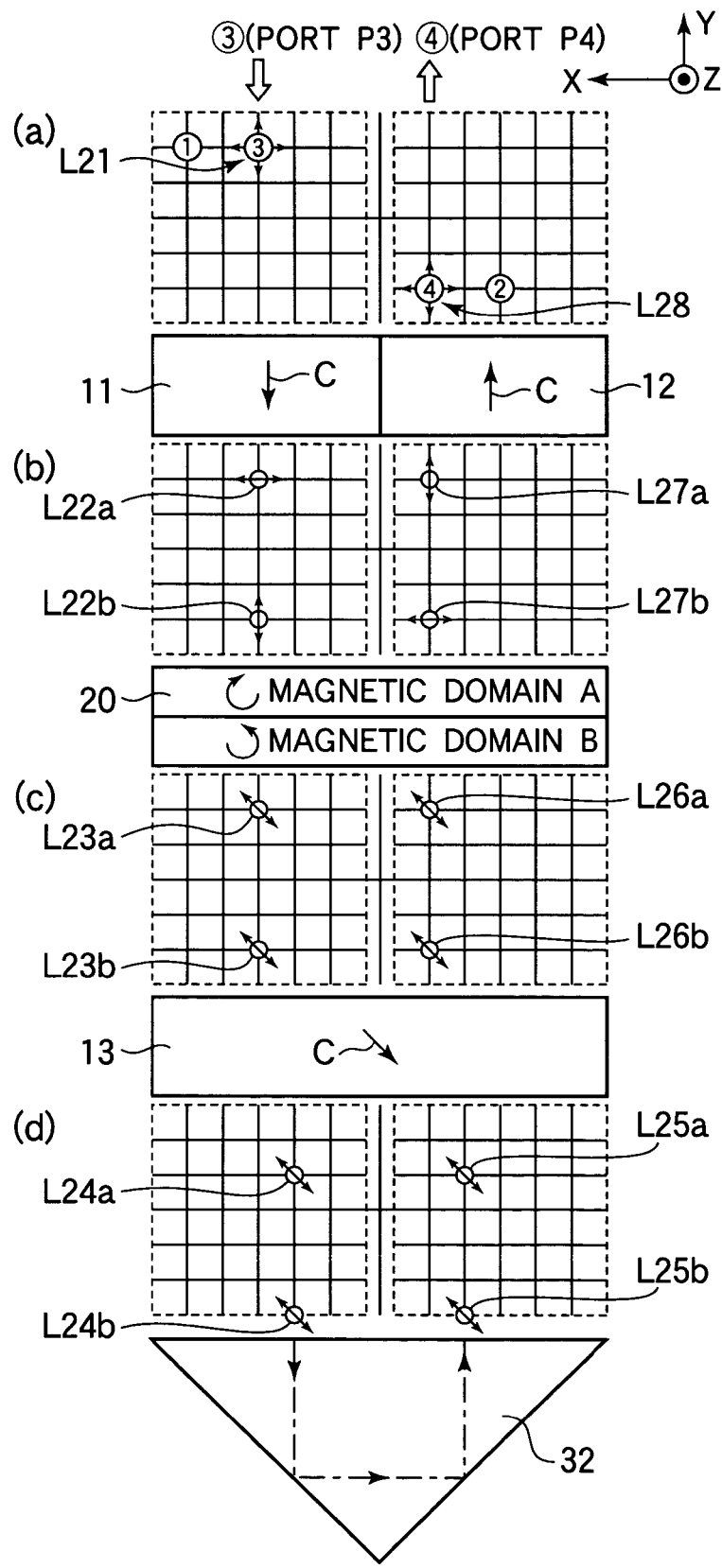
FIG. 6 is a view showing polarization states of light beams passing through the respective optical elements constituting the reflection-type optical circulator.

Next, the operation of the reflection-type optical circulator according to this embodiment will be described with reference to FIGS. 4 to 6. FIGS. 4 to 6 are views in which polarization states of light beams passing through the respective optical elements constituting the reflection-type optical circulator 1 are viewed in the −Z direction. FIGS. 4(a), 5(a) and 6(a) show polarization states of light beams at light incoming/outgoing planes Z1 of the birefringent plates 11 and 12 at the −Z side as shown in FIGS. 1A and 1B. FIGS. 4(b), 5(b) and 6(b) show polarization states of light beams at light incoming/outgoing planes Z2 of the birefringent plates 11 and 12 at the +Z side. FIGS. 4(c), 5(c) and 6(c) show polarization states of light beams at a light incoming/outgoing plane Z3 of the birefringent plate 13 at the −Z side. FIGS. 4(d), 5(d) and 6(d) show polarization states of light beams at a light incoming/outgoing plane Z4 of the birefringent plate 13 at the +Z side.

In order to facilitate understanding, FIGS. 4 to 6 schematically show a state in which the birefringent plates 11 and 12, the Faraday rotator 20 and the birefringent plate 13 are viewed in the −Z direction, and a state in which the dihedral reflector 32 is viewed in the −Y direction.

FIG. 4 shows light incident from the light incoming/outgoing port P1 and emitted from the light incoming/outgoing port P2 to the outside like a light beam indicated by a solid line of FIG. 1A. As shown at the left side of FIG. 4(a), a light beam L1 incident from the light incoming/outgoing port P1 is incident on the birefringent plate (first birefringent plate) 11, and as shown at the left side of FIG. 4(b), it is separated into an ordinary ray L2a and an extraordinary ray L2b axially shifted in the −Y direction, and they are emitted from the birefringent plate 11. Next, the light beam L2a of the ordinary ray component is incident on the magnetic domain A (first Faraday rotating part) of the Faraday rotator 20, and the light beam L2b of the extraordinary ray component is incident on the magnetic domain B (second Faraday rotating part) of the Faraday rotator 20. The Faraday rotation angle of the magnetic domain A of the Faraday rotator 20 is made, for example, +45° with respect to the Z axis when viewed in the −Z direction, and the Faraday rotation angle of the magnetic domain B is made −45° with respect to the Z axis when viewed in the −Z direction. As shown at the left side of FIG. 4(c), the light beam L2a is emitted from the Faraday rotator 20 as a light beam L3a in which the polarization direction is rotated clockwise by 45° with respect to the Z axis when viewed in the −Z direction, and the light beam L2b is emitted from the Faraday rotator 20 as a light beam L3b in which the polarization direction is rotated counterclockwise by 45°. By this, the polarization directions of the light beams L3a and L3b become parallel to a plane formed by crossing of a virtual straight line parallel to the traveling directions of the light beams L3a and L3b and a virtual straight line parallel to the optic axis of the birefringent plate (polarizer) 13. Next, as shown at the left side of FIG. 4(d), the light beams L3a and L3b are incident on one surface of the birefringent plate 13, pass through as extraordinary rays, are respectively axially shifted, and are emitted from the other surface of the birefringent plate 13 as light beams L4a and L4b. The light beams L4a and L4b are reflected by the dihedral reflector 32, and, as shown at the right side of FIG. 4(d), they are incident on the other surface of the birefringent plate 13 as light beams L5a and L5b whose optical paths are respectively changed.

As shown at the right side of FIG. 4(c), the light beams L5a and L5b are respectively axially shifted, and are emitted from one surface of the birefringent plate 13 as light beams L6a and L6b. The light beam L6a is incident on the magnetic domain A (same region as the region on which the light beam L2a is incident) of the Faraday rotator 20, and the light beam L6b is incident on the magnetic domain B (same region as the region on which the light beam L2b is incident) of the Faraday rotator 20. As shown at the right side of FIG. 4(b), the light beam L6a is emitted from the Faraday rotator 20 as a light beam L7a in which the polarization direction is rotated clockwise by 45° with respect to the Z axis when viewed in the −Z direction, and the light beam L6b is emitted from the Faraday rotator 20 as a light beam L7b in which the polarization direction is rotated counterclockwise by 45°. The light beam L7a is incident on the birefringent plate (second birefringent plate) 12 and becomes the extraordinary ray, while the light beam L7b is incident on the birefringent plate 12 and becomes the ordinary ray. As shown at the right side of FIG. 4(a), the light beam L7a is axially shifted, is combined with the light beam L7b, and is emitted from the birefringent plate 12 as a light beam L8. The light beam L8 is incident on the light incoming/outgoing port P2 and is emitted to the outside.

Similarly, as shown in FIG. 5 and FIG. 6, in the reflection-type optical circulator 1 according to this embodiment, the input light beam from the light incoming/outgoing port P1 is outputted from the light incoming/outgoing port P2, the input light beam from the light incoming/outgoing port P2 is outputted from the light incoming/outgoing port P3, and the input light beam from the light incoming/outgoing port P3 is outputted from the light incoming/outgoing port P4.

In this embodiment, the light beam, which has passed through one of the birefringent plates 11 and 12 having the same optical characteristics as the ordinary ray, passes through the other as the extraordinary ray when it is reflected by the dihedral reflector 32 and is returned, whereas the light beam, which has passed through one of the birefringent plates 11 and 12 as the extraordinary ray, passes through the other as the extraordinary ray when it is reflected by the dihedral reflector 32 and is returned. Besides, in a period in which the light beams pass through the Faraday rotator 20, are reflected by the dihedral reflector 32, and are again incident on the Faraday rotator 20, the polarization directions of the two separated light beams are the same. Accordingly, according to the reflection-type optical circulator 1 of this embodiment, the PMD value can be made zero.

SECOND EMBODIMENT

Figure 7A:
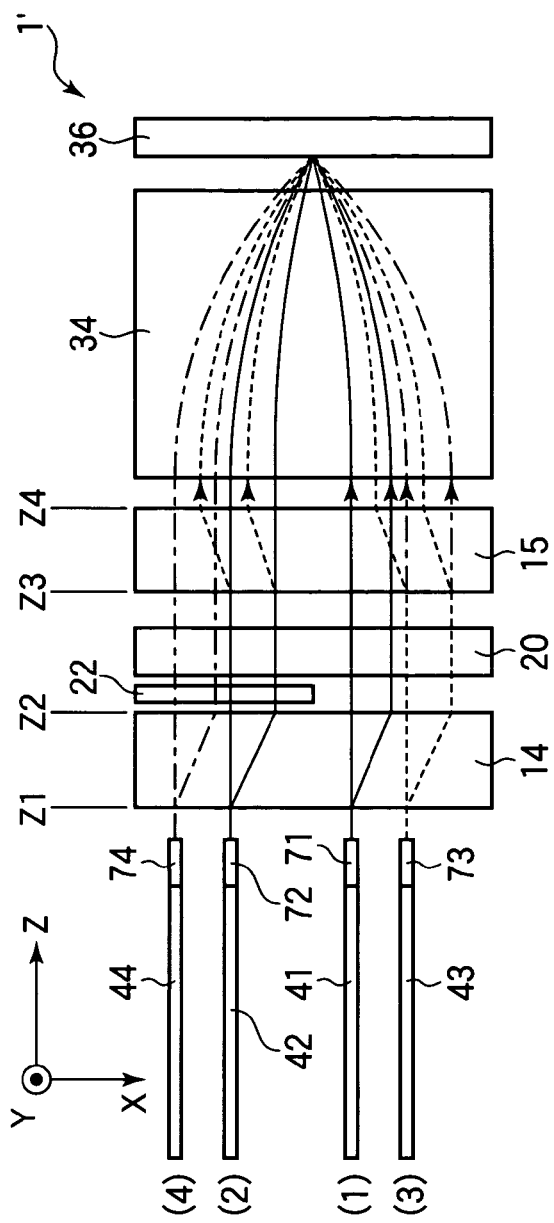
FIGS. 7A and 7B are views schematically showing a structure of a reflection-type optical device according to a second embodiment of the invention.
Figure 7B:
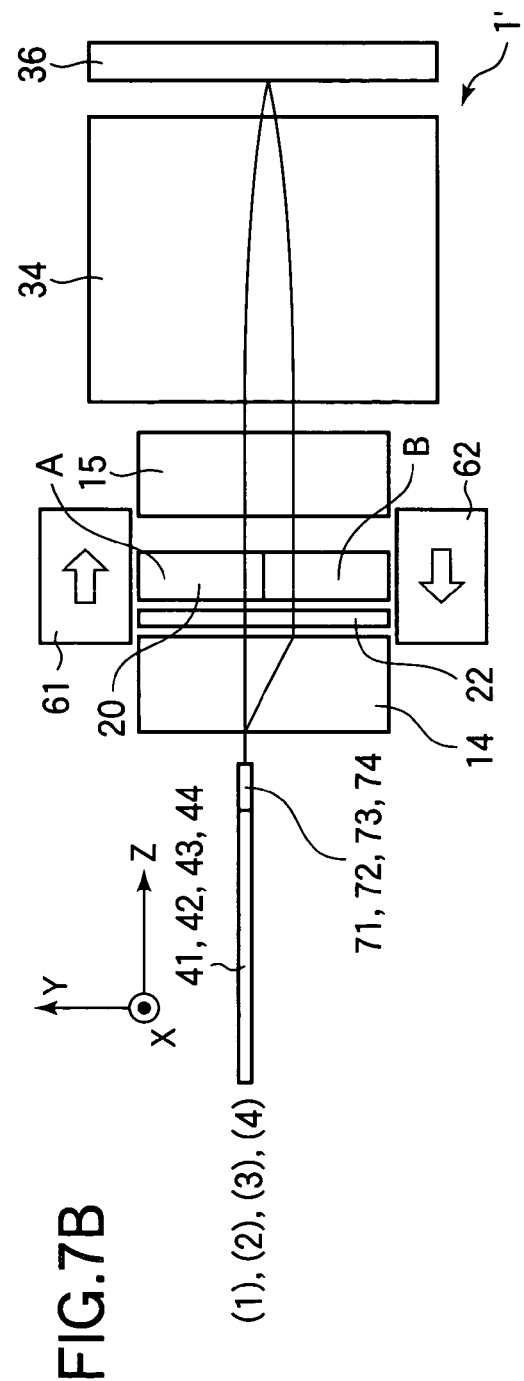

Next, a reflection-type optical device according to a second embodiment of the invention will be described with reference to FIGS. 7A to 12D. FIGS. 7A and 7B schematically show a structure of a reflection-type optical circulator according to this embodiment. In FIGS. 7A and 7B, a coordinate system is taken similarly to FIGS. 1A and 1B. FIG. 7A shows the structure of the reflection-type optical circulator when viewed in the −Y direction, and FIG. 7B shows the structure of the reflection-type optical circulator when viewed in the −X direction. As shown in FIGS. 7A and 7B, a reflection-type optical circulator 1' according to this embodiment is connected to optical fibers 41, 42, 43 and 44 arranged in a row. End parts of the respective optical fibers 41, 42, 43 and 44 at the −Z side are four light incoming/outgoing ports P1, P2, P3 and P4 (denoted by numerals (1) to (4) in the drawing). The optical fibers 41, 42, 43 and 44 and GI lenses 71, 72, 73 and 74 fused to end parts of the optical fibers 41, 42, 43 and 44 at the +Z side are respectively united and function as optical fibers with lenses. One birefringent plate 14 is disposed in the +Z direction of the GI lenses 71, 72, 73 and 74. When the coordinate system shown in FIGS. 7A and 7B is used, the optic axis of the birefringent plate 14 is parallel to a plane obtained by rotating the Y-Z plane clockwise by 45° with respect to the Y axis when viewed in the −Y direction. The extraordinary ray of light incident on the birefringent plate 14 in the +Z direction is axially shifted in both directions of the +X direction and the −Y direction.

A ½ wavelength plate 22 for rotating a polarization direction of light by 90° is disposed at a position in the +Z direction of the birefringent plate 14 and corresponding to the light incoming/outgoing ports P2 and P4. A Faraday rotator 20 is disposed in the +Z direction of the ½ wavelength plate 22. A permanent magnet 61 is disposed at an end part of the Faraday rotator 20 in the +Y direction, and a permanent magnet 62 is disposed at an end part thereof in the −Y direction. The permanent magnets 61 and 62 have magnetic poles opposite to each other. For example, as indicted by arrows in the drawing, the direction of the magnetic pole of the permanent magnet 61 is the +Z direction, and the direction of the magnetic pole of the permanent magnet 62 is the −Z direction. A magnetic domain A in which magnetization is made uniformly to have one direction is formed in a region of the Faraday rotator 20 to which the magnetic field in the −Z direction is applied, and a magnetic domain B in which magnetization is made uniformly to have a direction opposite to the magnetic domain A is formed in a region thereof to which the magnetic field in the +Z direction is applied. A magnetic wall I is formed between the magnetic domain A and the magnetic domain B. The Faraday rotation angle of the magnetic domain A of this example is, for example, 45° in the clockwise direction with respect to the Z axis when viewed in the −Z direction, and similarly, the Faraday rotation angle of the magnetic domain B is 45° in the counterclockwise direction. A birefringent plate 15 is disposed in the +Z direction of the Faraday rotator 20. When the coordinate system shown in FIGS. 7A and 7B is used, the optic axis of the birefringent plate 15 is parallel to the X-Z plane. The extraordinary ray of light incident on the birefringent plate 15 in the +Z direction is axially shifted in the −X direction. A lens 34 and a reflecting mirror 36 are disposed as a reflecting part in the +Z direction of the birefringent plate 15. As the lens 34, a graded refractive index rod lens, spherical lens, aspheric lens or the like is used. The reflecting mirror 36 is fabricated by forming a total reflection film on a glass plate, and is disposed in the +Z direction of the lens 34. The reflecting mirror 36 includes a focal point in the case where parallel light is incident on the lens 34, and is disposed in a plane perpendicular to the traveling direction of the parallel light. By this, when parallel light traveling on an optical path is incident on the lens 34 and the reflecting mirror 36, an optical path of the reflected light is converted to a position symmetrical with respect to a virtual straight line including the focal point and parallel to the traveling direction of the parallel light. Instead of the reflecting mirror 36, a total reflecting film may be directly formed on the lens 34.

In this embodiment, the reflection-type optical circulator 1' can be constructed by using the four optical elements (the two birefringent plates 14 and 15, the one ½ wavelength plate 22 and the one Faraday rotator 20). Even in the case where the magnetic structure of the Faraday rotator 20 is not used, but two Faraday rotators are used, the reflection-type optical circulator 1' can be constructed by using the five optical elements. Accordingly, according to the embodiment, the element structure of the reflection-type optical circulator 1' becomes simple, and miniaturization and reduction in cost become easy.

Besides, in this embodiment, since the four light incoming/outgoing ports P1 to P4 (the optical fibers 41 to 44) can be arranged in one line, there is a merit that assembling becomes easy.

Figure 8:
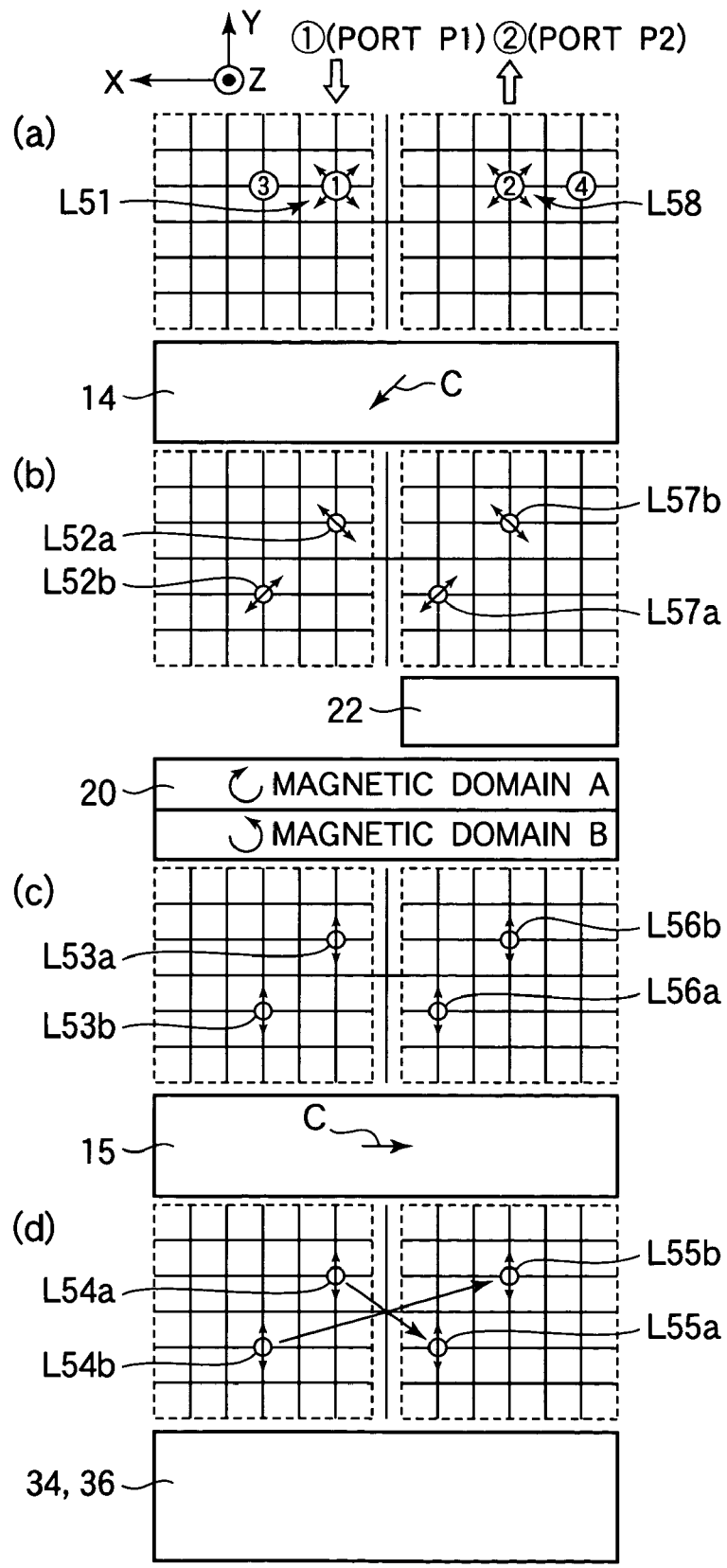
FIG. 8 is a view showing polarization states of light beams passing through respective optical elements constituting a reflection-type optical circulator.
Figure 9:
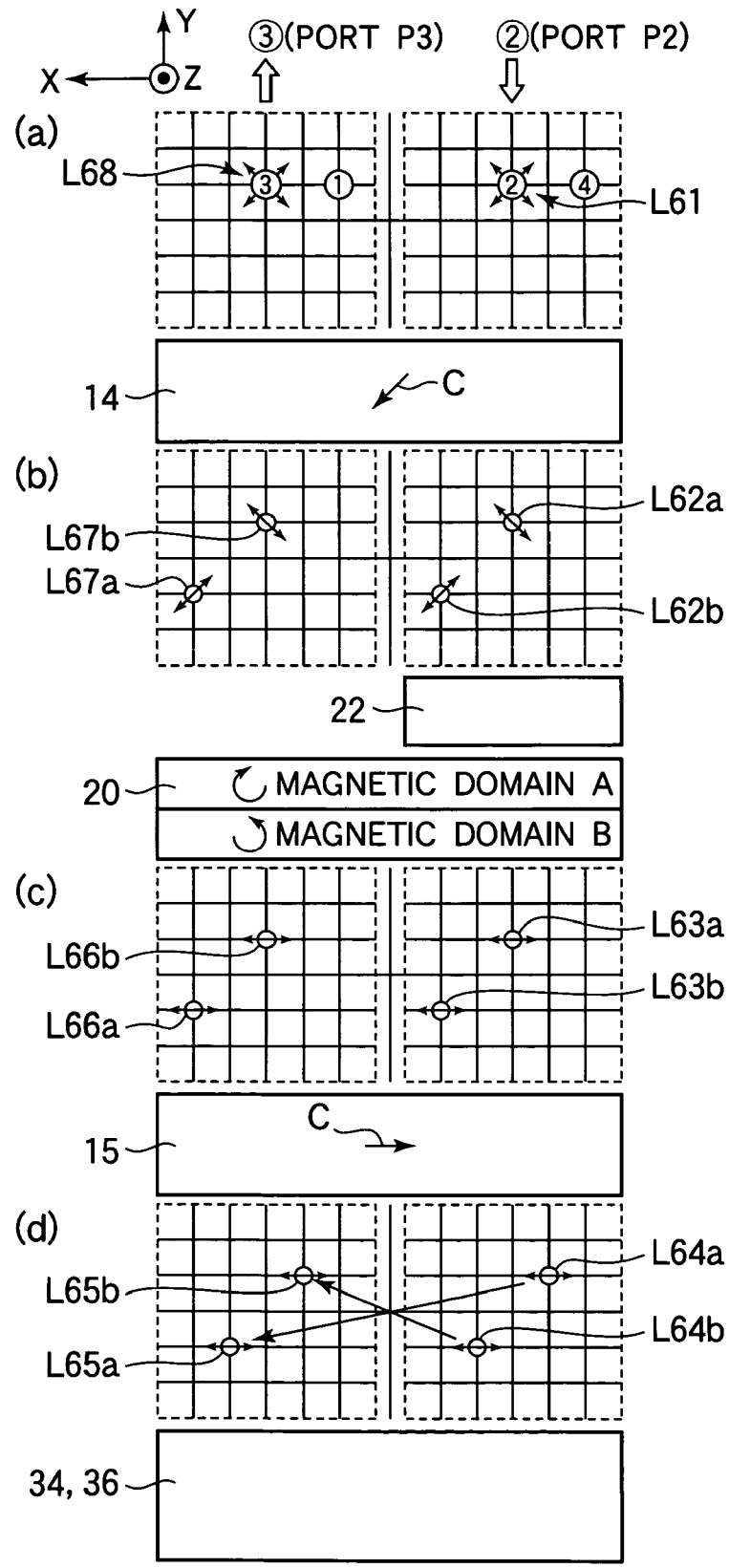
FIG. 9 is a view showing polarization states of light beams passing through the respective optical elements constituting the reflection-type optical circulator.
Figure 10:
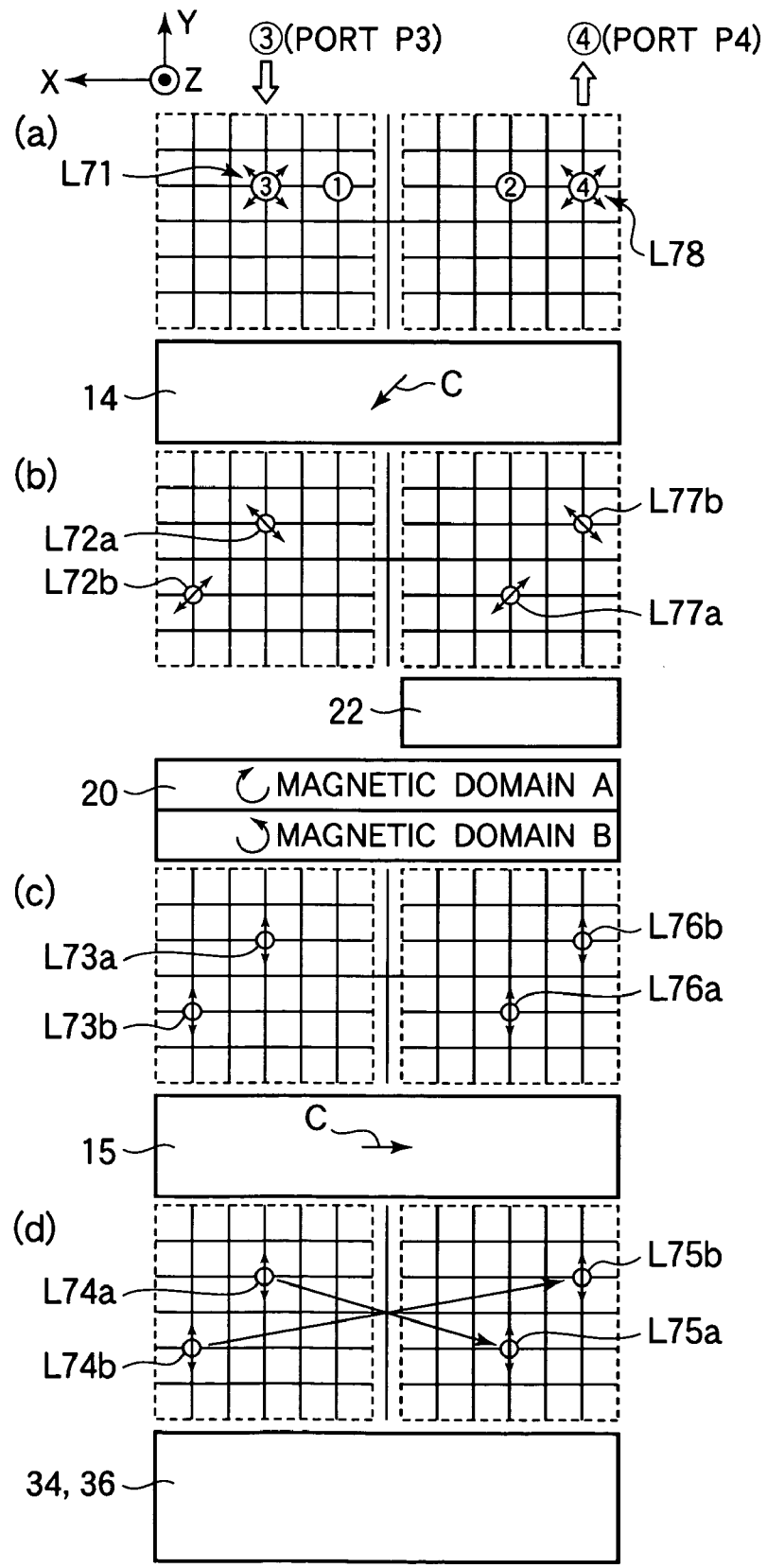
FIG. 10 is a view showing polarization states of light beams passing through the respective optical elements constituting the reflection-type optical circulator.

Next, the operation of the reflection-type optical circulator according to this embodiment will be described. FIGS. 8 to 10 are views in which polarization states of light beams passing through the respective optical elements constituting the reflection-type optical circulator 1' are viewed in the −Z direction. FIGS. 8(a), 9(a) and 10(a) show polarization state of light beams at a light incoming/outgoing plane Z1 of the birefringent plate 14 at the −Z side shown in FIGS. 7A and 7B. FIGS. 8(b), 9(b) and 10(b) show polarization states of light beams at a light incoming/outgoing plane Z2 of the birefringent plate 14 at the +Z side. FIGS. 8(c), 9(c) and 10(c) show polarization states of light beams at a light incoming/outgoing plane Z3 of the birefringent plate 15 at the −Z side. FIGS. 8(d), 9(d) and 10(d) show polarization states of light beams at a light incoming/outgoing plane Z4 of the birefringent plate 15 at the +Z side. In order to facilitate understanding, FIGS. 8 to 10 also schematically show a state in which the birefringent plate 14, the ½ wavelength plate 22, the Faraday rotator 20, the birefringent plate 15 and the reflecting part (the lens 34 and the reflecting mirror 36) are viewed in the −Z direction.

FIG. 8 shows light, like a light beam indicated by a solid line of FIG. 7A, incident from the light incoming/outgoing port P1 and emitted from the light incoming/outgoing port P2 to the outside. As shown at the left side of FIG. 8(a), a light beam L51 incident from the light incoming/outgoing port P1 is incident on the birefringent plate 14, and as shown at the left side of FIG. 8(b), it is separated into an ordinary ray L52a and an extraordinary ray L52b axially shifted in both directions of the +X direction and the −Y direction, and they are emitted from the birefringent plate 14. Next, the light beam L52a of the ordinary ray component is incident on the magnetic domain A (first Faraday rotating part) of the Faraday rotator 20, and the light beam L52b of the extraordinary ray component is incident on the magnetic domain B (second Faraday rotating part) of the Faraday rotator 20. Here, both the light beams L52a and L52b do no pass through the ½ wavelength plate 22. The Faraday rotation angle of the magnetic domain A of the Faraday rotator 20 is made, for example, +45° with respect to the Z axis when viewed in the −Z direction, and the Faraday rotation angle of the magnetic domain B is made −45° with respect to the Z axis when viewed in the −Z direction. As shown at the left side of FIG. 8(c), the light beam L52a is emitted from the Faraday rotator 20 as a light beam L53a in which the polarization direction is rotated clockwise by 45° with respect to the Z axis when viewed in the −Z direction, and the light beam L52b is emitted from the Faraday rotator 20 as a light beam L53b in which the polarization direction is rotated counterclockwise by 45°. By this, the polarization directions of the light beams L53a and L53b become perpendicular to a plane formed by crossing of a virtual straight line parallel to the traveling directions of the light beams L53a and L53b and a virtual straight line parallel to the optic axis of the birefringent plate 15. Accordingly, the light beams L53a and L53b are incident on one surface of the birefringent plate 15 and become the ordinary rays, and as shown at the left side of FIG. 8(d), they are emitted as light beams L54a and L54b from the other surface of the birefringent plate 15 without axial shift. The light beams L54a and L54b pass through the lens 34, are reflected by the reflecting mirror 36, and as shown at the right of FIG. 8(d), they are incident on the other surface of the birefringent plate 15 as light beams L55a and L55b whose light paths are changed.

The light beams L55a and L55b are incident on the other surface of the birefringent plate 15 and become the ordinary rays, and as shown at the right side of FIG. 8(c), they are emitted from one surface of the birefringent plate 15 as light beams L56a and L56b without axial shift. The light beam L56a is incident on the magnetic domain B (same region as the region on which the light beam L52b is incident) of the Faraday rotator 20, and the light beam L56b is incident on the magnetic domain A (same region as the region on which the light beam L52a is incident) of the Faraday rotator 20. The light beam 56a is emitted from the Faraday rotator 20 as a light beam in which the polarization direction is rotated counterclockwise by 45° with respect to the Z axis when viewed in the −Z direction. The light beam is further incident on the ½ wavelength plate 22, and as shown at the right side of FIG. 8(b), it is emitted as a light beam L57a in which the polarization direction is rotated by 900 with respect to the Z axis. The light beam L56b is emitted from the Faraday rotator 20 as a light beam in which the polarization direction is rotated clockwise by 45°. The light beam is further incident on the ½ wavelength plate 22, and is emitted as a light beam L57b in which the polarization direction is rotated by 90° with respect to the Z axis. The light beam L57a is incident on the birefringent plate 14 and becomes the extraordinary ray, while the light beam L57b is incident on the birefringent plate 14 and becomes the ordinary ray. As shown at the right side of FIG. 8(a), the light beam L57a is axially shifted, is combined with the light beam L57b, and is emitted from the birefringent plate 14 as a light beam L58. The light beam L58 is incident on the light incoming/outgoing port P2, and is emitted to the outside.

Similarly, as shown in FIG. 9 and FIG. 10, in the reflection-type optical circulator 1' according to this embodiment, the input light beam from the light incoming/outgoing port P1 is outputted from the light incoming/outgoing port P2, the input light beam from the light incoming/outgoing port P2 is outputted from the light incoming/outgoing port P3, and the input light beam from the light incoming/outgoing port P3 is outputted from the light incoming/outgoing port P4.

In this embodiment, by the optical path conversion caused by the lens 34 and the reflecting mirror 36, the incident light beam, which has passed through one of the two Faraday rotating parts (the magnetic domain A and the magnetic domain B of the Faraday rotator 20), passes through the other when it is reflected by the reflecting mirror 36 and is returned as the reflected light beam. Since the Faraday rotation angles of both the Faraday rotating parts have the same magnitude and are different from each other in sign, the polarization direction of the light beam is eventually returned to the original. Since the ½ wavelength plate 22 is disposed on one of the incident optical path and the reflection optical path between the birefringent plate 14 and the Faraday rotator 20, the polarization directions of the light beams L52a, L62a and L72a (or light beams L52b, L62b and L72b) emitted from the birefringent plate 14 are respectively perpendicular to the polarization directions of the light beams L57a, L67a and L77a (or light beams L57b, L67b and L77b) incident on the birefringent plate 14. Accordingly, the light beam, which has passed through the birefringent plate 14 as the ordinary ray, passes through as the extraordinary ray when it is reflected by the reflecting mirror 36 and is returned, whereas the light beam, which has passed through the birefringent plate 14 as the extraordinary ray, passes through as the ordinary ray when it is reflected by the reflecting mirror 36 and is returned. Besides, in a period in which the light beams pass through the Faraday rotator 20, are reflected by the reflecting mirror 36, and are again incident on the Faraday rotator 20, the polarization directions of the two separated light beams are the same. Accordingly, according to the reflection-type optical circulator 1' of this embodiment, the PMD value can be made zero. Incidentally, the ½ wavelength plate 22 may be disposed between the Faraday rotator 20 and the birefringent plate 15, not between the birefringent plate 14 and the Faraday rotator 20. Besides, although the ½ wavelength plate 22 is disposed on the reflection optical path (incident optical path of the light beam incident from the light incoming/outgoing port P2) of the light beam incident from the light incoming/outgoing port P1 or P3, it maybe disposed on the incident optical path (on the reflection optical path of the light beam incident from the light incoming/outgoing port P2) of the light beam incident from the light incoming/outgoing port P1 or P3.

In the embodiment, the optical fibers with lenses in which the GI lenses 71 to 74 are respectively fused to the tip ends of the optical fibers 41 to 44 are used. When the optical fibers 41 to 44 in which the GI lenses 71 to 74 are not fused are used, expanded angles of light beams emitted from the end parts of the optical fibers 41 to 44 become large, and there is a fear that the light beams from the respective light incoming/outgoing ports P1 to P4 overlap with each other. Thus, it is desirable that the lens function is added to the optical fibers 41 to 44 to suppress the expansion of the light beam. Instead of fusing the GI lenses 71 to 74, the cores of the optical fibers 41 to 44 at the tip ends may be expanded. Besides, as shown in FIGS. 1A and 1B, the lenses 51 to 54 may be naturally separately provided.

Besides, in this embodiment, although the axial shift amount of the birefringent plate 14 is set to be $2\sqrt{2}$ times as large as the axial sift amount of the birefringent plate 15, it is not necessary to limit the invention to this, and the axial shift amounts of the birefringent plates 14 and 15 can be independently set.

When the structure of this embodiment is made to function as an optical isolator, instead of the birefringent plate 15, a polarizing glass plate can be used as a polarizer.

Figure 11:
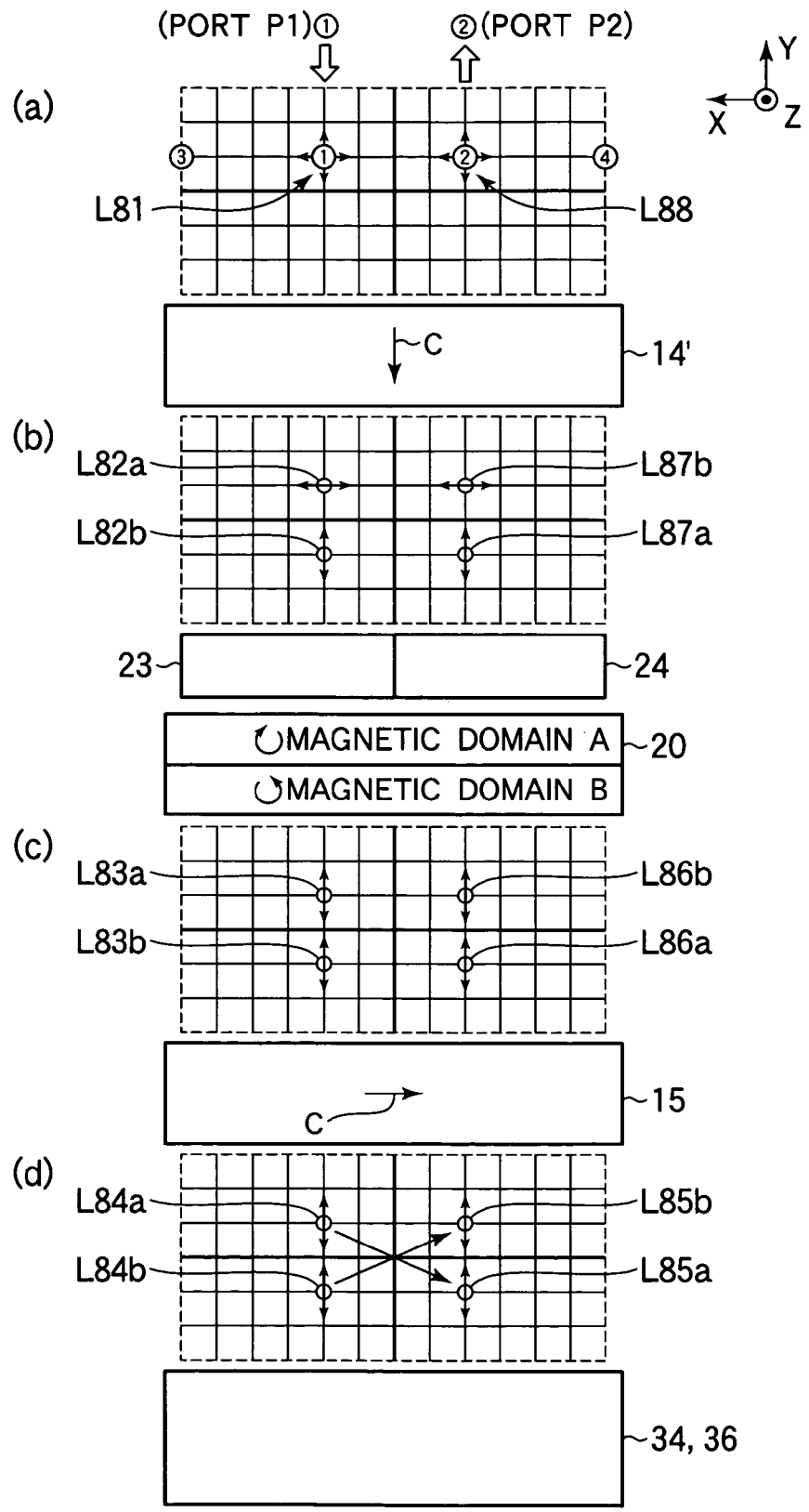
FIG. 11 is a view showing a modified example of the reflection-type optical device according to the second embodiment of the invention.
Figure 12:
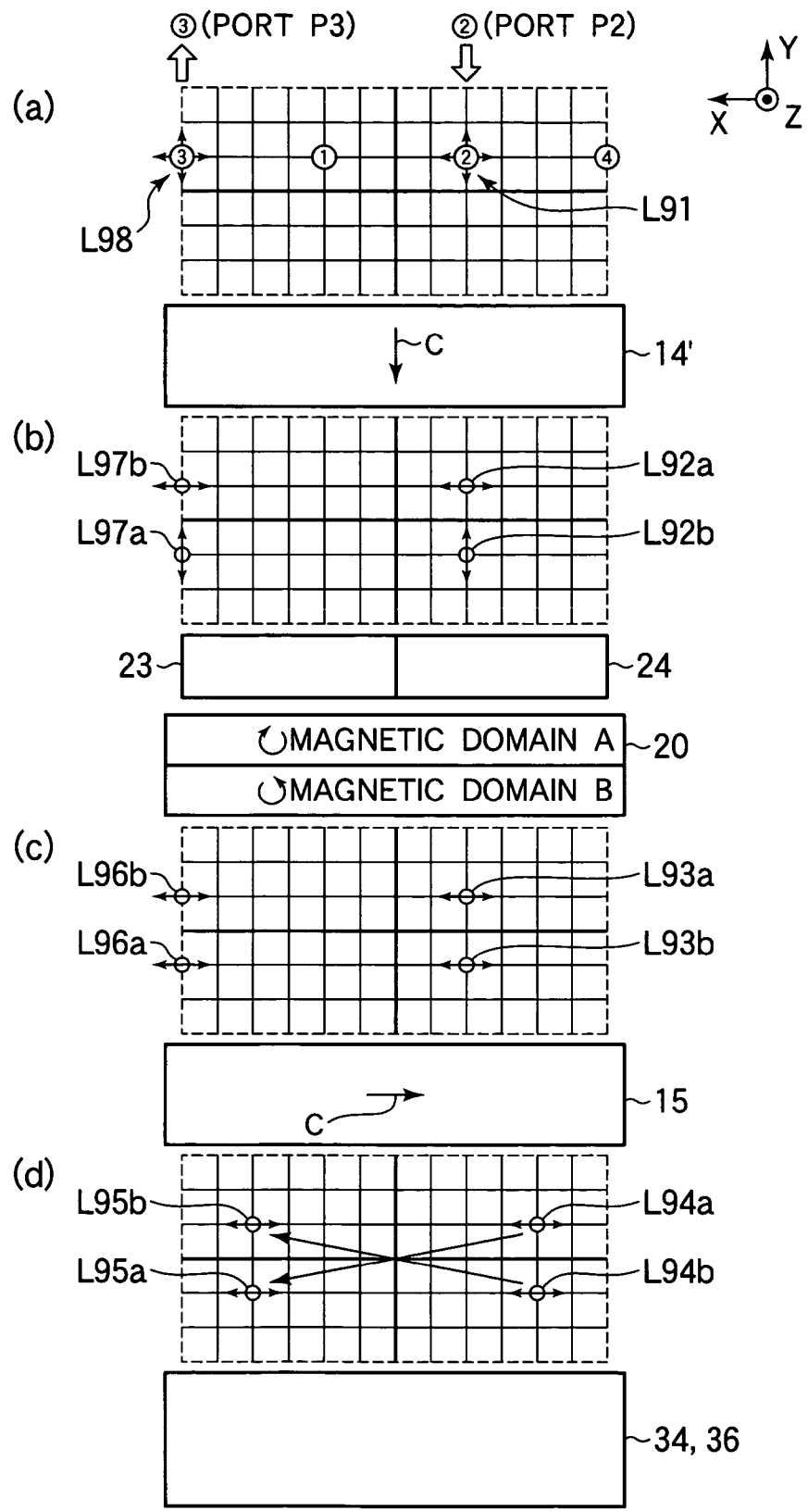
FIG. 12 is a view showing a modified example of the reflection-type optical device according to the second embodiment of the invention.

FIG. 11 and FIG. 12 show a modified example of the reflection-type optical circulator according to this embodiment, and correspond to FIG. 8 and FIG. 9. As shown in FIG. 11 and FIG. 12, the reflection-type optical circulator according to this modified example includes a birefringent plate 14' in which the direction of the optic axis is different from the birefringent plate 14. An extraordinary ray of a light beam incident on the birefringent plate 14' in the +Z direction is axially shifted in the −Y direction. Two ½ wavelength plates 23 and 24 are disposed in the +Z direction of the birefringent plate 14'. The ½ wavelength plate 23 is disposed at a position corresponding to the light incoming/outgoing ports P1 and P3, and rotates the polarization direction of the light beam incident in the +Z direction clockwise by 45° when viewed in the −Z direction. The ½ wavelength plate 24 is disposed at a position corresponding to the light incoming/outgoing ports P2 and P4, and rotates the polarization direction of the light beam incident in the +Z direction by 45° in a direction opposite to the above.

Although the description is omitted, as shown in FIG. 11 and FIG. 12, in the reflection-type optical circulator according to this modified example, the input light beam from the light incoming/outgoing port P1 is outputted from the light incoming/outgoing port P2, and the input light beam from the light incoming/outgoing port P2 is outputted from the light incoming/outgoing port P3. Besides, although the illustration and description are omitted, the input light beam from the light incoming/outgoing port P3 is outputted from the light incoming/outgoing port P4.

In the reflection-type optical circulator according to this modified example, similarly to the reflection-type optical circulator shown in FIGS. 7A to 10, the respective light incoming/outgoing ports can be arranged at equal intervals in one line. Thus, assembling of the reflection-type optical circulator becomes easy.

Besides, in this modified example, since the optical path lengths of the two polarization-separated light beams in the lens 34 are almost equal to each other, as compared with the reflection-type optical circulator shown in FIGS. 7A to 10, polarization dependent loss (PDL) can be further reduced.

THIRD EMBODIMENT

Figure 13A:
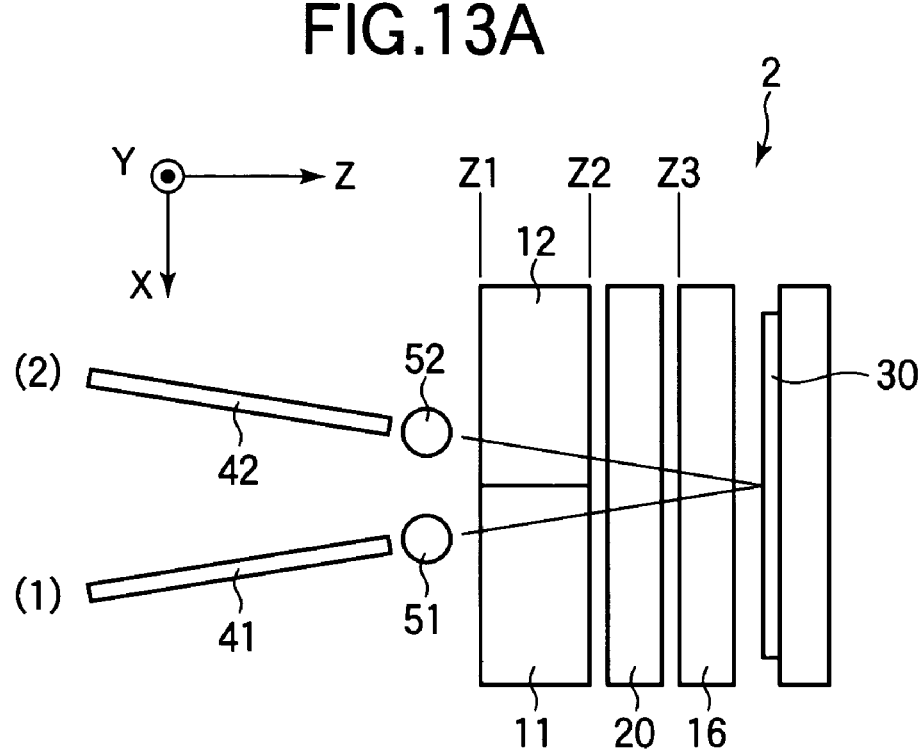
FIGS. 13A and 13B are views schematically showing a structure of a reflection-type optical device according to a third embodiment of the invention.
Figure 13B:
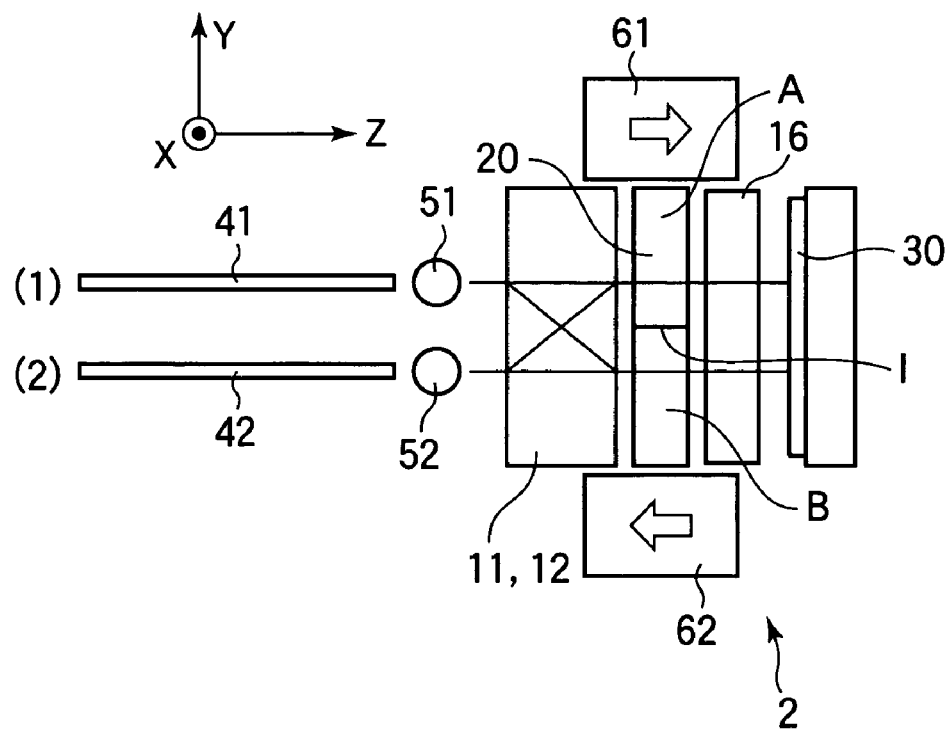

Next, a reflection-type optical device according to a third embodiment of the invention will be described with reference to FIGS. 13A to 18. FIGS. 13A and 13B schematically show a structure of a reflection-type optical isolator according to this embodiment. In FIGS. 13A and 13B, the Z axis is made in the direction perpendicular to the surface of a reflecting film (reflecting part) 30 included in the reflection-type optical isolator, and the direction in which external light travels toward the reflecting film 30 is made the +Z direction. The X axis and the Y axis are made in two directions perpendicular to each other in a plane perpendicular to the Z axis. FIG. 13A shows a structure in which the reflection-type optical isolator is viewed in the −Y direction, and FIG. 13B shows a structure in which the reflection-type optical isolator is viewed in the −X direction.

As shown in FIGS. 13A and 13B, the reflection-type optical isolator 2 is connected to two optical fibers 41 and 42. An end part of the optical fiber 41 at the −Z side is a light incoming port P1 (denoted by numeral (1) in the drawing) on which external light is incident. An end part of the optical fiber 42 at the −Z side is a light outgoing port P2 (denoted by numeral (2) in the drawing) which emits light to the outside. A lens 51 for converting divergent light emitted from the optical fiber 41 into parallel light is disposed in the +Z direction of the optical fiber 41, and a lens 52 for converting parallel light into convergent light and making it incident on the optical fiber 42 is disposed in the +Z direction of the optical fiber 42.

A birefringent plate 11 is disposed in the +Z direction of the lens 51, and a birefringent plate 12 is disposed in the +Z direction of the lens 52. A Faraday rotator 20 is disposed in the +Z direction of the birefringent plates 11 and 12. A permanent magnet 61 is disposed at an end part of the Faraday rotator 20 in the +Y direction, and a permanent magnet 62 is disposed at an end part thereof in the −Y direction. The permanent magnets 61 and 62 have magnetic poles opposite to each other. For example, as indicated by arrows in the drawing, the direction of the magnetic pole of the permanent magnet 61 is the +Z direction, and the direction of the magnetic pole of the permanent magnet 62 is the −Z direction. A magnetic domain A in which magnetization is made uniformly to have one direction is formed in a region of the Faraday rotator 20 to which a magnetic field in the −Z direction is applied. A magnetic domain B in which magnetization is made uniformly to have a direction opposite to the magnetic domain A is formed in a region thereof to which a magnetic field in the +Z direction is applied. A magnetic wall I is formed between the magnetic domain A and the magnetic domain B. The Faraday rotation angle of the magnetic domain A in this example is, for example, 45° in the clockwise direction with respect to the Z axis when viewed in the −Z direction, and similarly, the rotation angle of the Faraday rotation angle of the magnetic domain B is 45° in the counterclockwise direction. Since the Faraday rotator 20 has the irreciprocity, even if light is incident from any one of the two light incoming/outgoing planes of the Faraday rotator 20, the condition of the rotation angle is kept.

A polarizing glass plate (polarizer) 16 is disposed in the +Z direction of the Faraday rotator 20. The polarizing glass plate 16 is such that a specified linearly polarized light is allowed to pass through, and a linearly polarized light perpendicular thereto is absorbed. The transmission axis of the polarizing glass plate 16 is parallel to a direction in which the X axis is inclined clockwise by 45° with respect to the Z axis when viewed in the −Z direction. A reflecting part is disposed in the +Z direction of the polarizing glass plate 16. In this example, since a function to change an optical path is not required, for example, a reflecting mirror in which a dielectric multilayer film or a metal thin film of aluminum or the like is evaporated as the reflecting film 30 on a glass substrate surface can be used as the reflecting part. Instead of the reflecting mirror, the reflecting film 30 may be formed on the surface of the polarizing glass plate 16 at the +Z side.

In this embodiment, the reflection-type optical isolator 2 can be constructed by using the four optical elements (the two birefringent plates 11 and 12, the one polarizing glass plate 16 and the one Faraday rotator 20). Even in the case where the magnetic domain structure of the Faraday rotator 20 is not used, but two Faraday rotators are used, the reflection-type optical isolator can be constructed by using the five optical elements. Besides, as the birefringent plates 11 and 12, for example, elements cut from the same crystal and having the same specification can be used. Accordingly, according to this embodiment, the element structure of the reflection-type optical isolator 2 becomes simple, and miniaturization and reduction in cost become easy.

Figure 14:
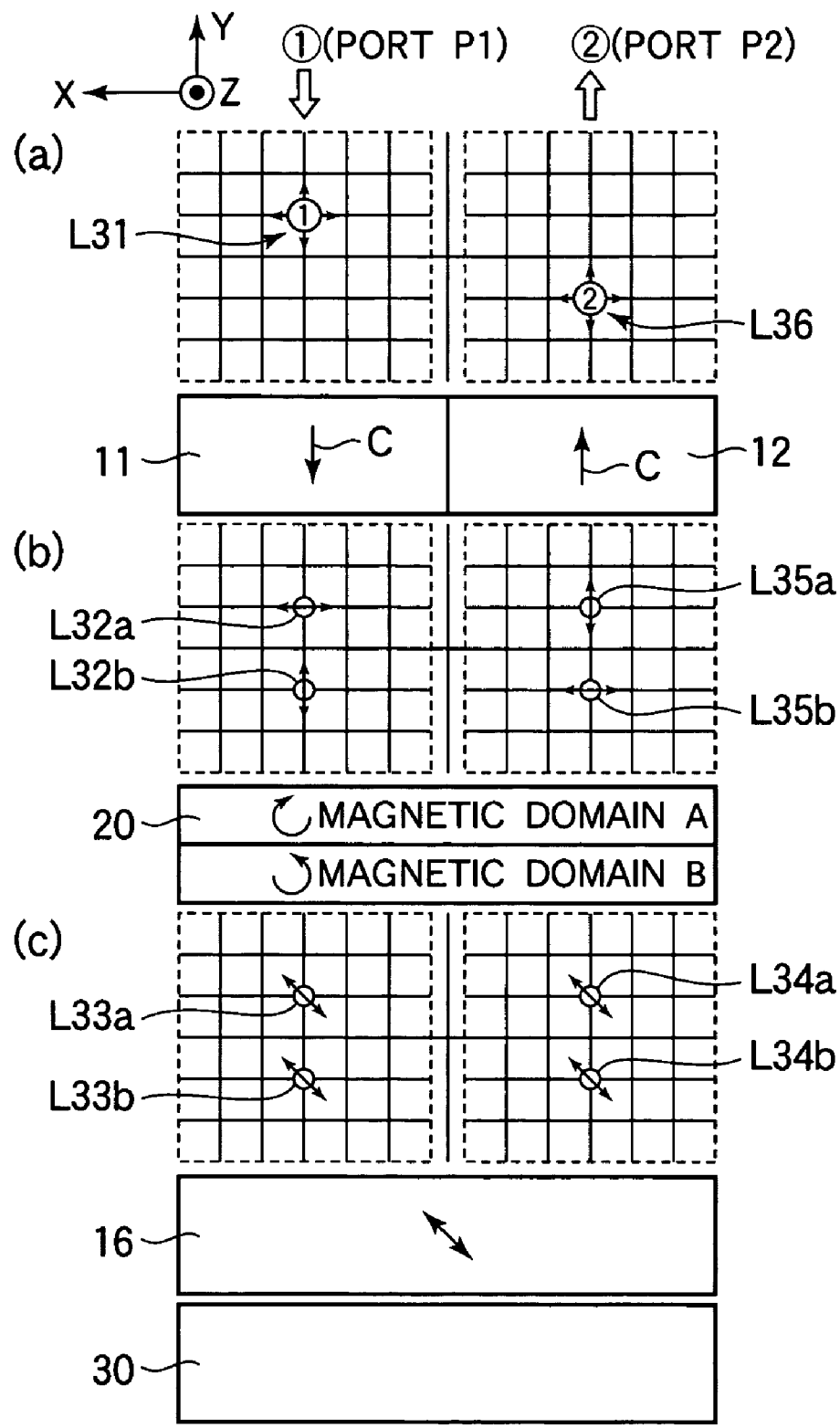
FIG. 14 is a view showing polarization states of light beams passing through respective optical elements constituting a reflection-type optical isolator.
Figure 15:
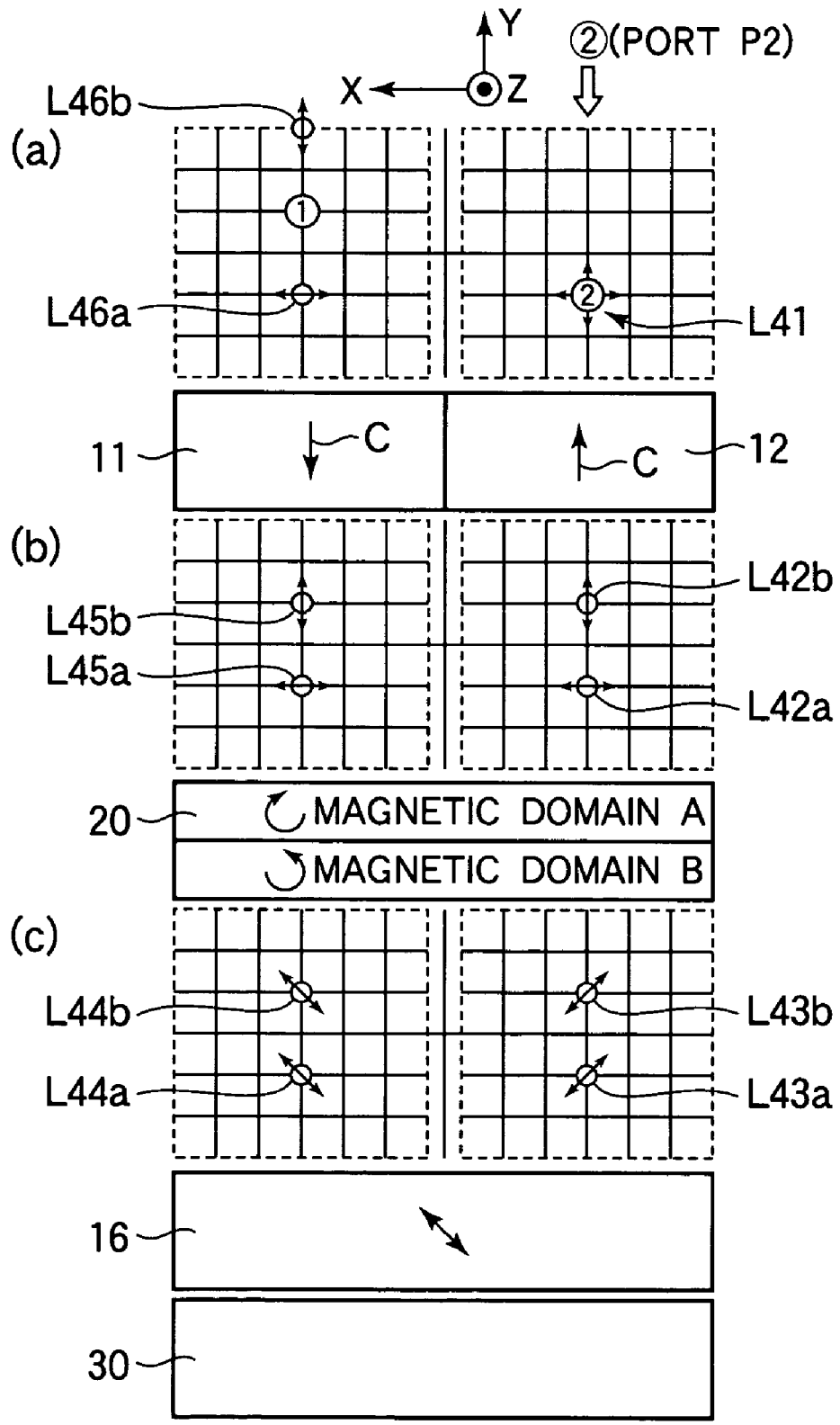
FIG. 15 is a view showing polarization states of light beams passing through the respective optical elements constituting the reflection-type optical isolator.

Next, the operation of the reflection-type optical isolator according to this embodiment will be described with reference to FIG. 14 and FIG. 15. FIG. 14 and FIG. 15 are views in which polarization states of light beams passing through the respective optical elements constituting the reflection-type optical isolator 2 are viewed in the −Z direction. FIGS. 14(a) and 15(a) show polarization states of light beams at light incoming/outgoing planes Z1 of the birefringent plates 11 and 12 at the −Z side as shown in FIGS. 13A and 13B. FIGS. 14(b) and 15(b) show polarization states of light beams at light incoming/outgoing planes Z2 of the birefringent plates 11 and 12 at the +Z side. FIGS. 14(c) and 15(c) show polarization states of light beams at a light incoming/outgoing plane Z3 of the polarizing glass plate 16 at the −Z side. In order to facilitate understanding, FIGS. 14 and 15 also schematically show a state in which the birefringent plates 11 and 12, the Faraday rotator 20, the polarizing glass plate 16 and the reflecting film 30 are viewed in the −Z direction.

FIG. 14 shows light incident from the light incoming port P1 and emitted to the outside from the light outgoing port P2. As shown at the left side of FIG. 14(a), a light beam L31 incident from the light incoming port P1 is incident on the birefringent plate (first birefringent plate) 11, and as shown at the left side of FIG. 14(b), it is separated into an ordinary ray L32a and an extraordinary ray L32b axially shifted in the −Y direction, and they are emitted from the birefringent plate 11. Next, the light beam L32a of the ordinary ray component is incident on the magnetic domain A (first Faraday rotating part) of the Faraday rotator 20, and the light beam L32b of the extraordinary ray component is incident on the magnetic domain B (second Faraday rotating part) of the Faraday rotator 20. The Faraday rotation angle of the magnetic domain A of the Faraday rotator 20 is made, for example, +45° with respect to the Z axis when viewed in the −Z direction, and the Faraday rotation angle of the magnetic domain B is made −45° with respect to the Z axis when viewed in the −Z direction. As shown at the left side of FIG. 14(c), the light beam L32a is emitted from the Faraday rotator 20 as a light beam L33a in which the polarization direction is rotated clockwise by 45° with respect to the Z axis when viewed in the −Z direction, and the light beam L32b is emitted from the Faraday rotator 20 as a light beam L33b in which the polarization direction is rotated counterclockwise by 45°. By this, the polarization directions of the light beams L33a and L33b become parallel to the transmission axis (indicated by a double-headed arrow in the drawing) of the polarizing glass plate (polarizer) 16. Accordingly, the light beams L33a and L33b pass through the polarizing glass plate 16, are reflected by the reflecting film 30, pass through the polarizing glass plate 16 again, and are emitted as light beams L34a and L34b shown at the right side of FIG. 14(c).

The light beam L34a is incident on the magnetic domain A of the Faraday rotator 20, and the light beam L34b is incident on the magnetic domain B of the Faraday rotator 20. As shown at the right side of FIG. 14(b), the light beam L34a is emitted from the Faraday rotator 20 as a light beam L35a in which the polarization direction is rotated clockwise by 45° with respect to the Z axis when viewed in the −Z direction, and the light beam L34b is emitted from the Faraday rotator 20 as a light beam L35b in which the polarization direction is rotated counterclockwise by 45°. The light beam L35a is incident on the birefringent plate (second birefringent plate) 12 and becomes the extraordinary ray, and the light beam L35b is incident on the birefringent plate 12 and becomes the ordinary ray. As shown at the right side of FIG. 14(a), the light beam L35a is axially shifted, is combined with the light beam L35b, and is emitted as a light beam L36 from the birefringent plate 12. The light beam L36 is incident on the light outgoing port P2 and is emitted to the outside.

FIG. 15 shows light incident from the light outgoing port P2. As shown at the right side of FIG. 15(a), a light beam L41 incident from the light outgoing port P2 is incident on the birefringent plate (first birefringent plate) 12, is separated into an ordinary ray L42a and an extraordinary ray L42b axially shifted in the +Y direction as shown at the right side of FIG. 15(b), and they are emitted from the birefringent plate 12. Next, the light beam L42a of the ordinary ray component is incident on the magnetic domain B (first Faraday rotating part) of the Faraday rotator 20, and the light beam L42b of the extraordinary ray component is incident on the magnetic domain A (second Faraday rotating part) of the Faraday rotator 20. As shown at the right side of FIG. 15(c), the light beam L42a is emitted from the Faraday rotator 20 as a light beam L43a in which the polarization direction is rotated counterclockwise by 45° with respect to the Z axis when viewed in the −Z direction, and the light beam L42b is emitted from the Faraday rotator 20 as a light beam L43b in which the polarization direction is rotated clockwise by 45°. By this, the polarization directions of the light beams L43a and L43b become perpendicular to the transmission axis of the polarizing glass plate (polarizer) 16. Accordingly, both the light beams L43a and L43b are absorbed by the polarizing glass plate 16, and do not pass through the polarizing glass plate 16.

Here, there can occur a state in which the polarization directions of the light beams L43a and L43b do not become perpendicular to the transmission axis of the polarizing glass plate 16 due to an angle shift of the Faraday rotation angle caused by a fabrication error of the Faraday rotator 20 or temperature wavelength change, an angle shift of the optic axis of the birefringent plate 12 or the like, and partial light passes through the polarizing glass plate 16. As shown at the left side of FIG. 15(c), a light beam L44a, which has passed through the polarizing glass plate 16, has been incident on the reflecting film 30, and has again passed through the polarizing glass plate 16, is incident on the magnetic domain B of the Faraday rotator 20. Similarly, a light beam L44b having passed through the polarizing glass plate 16 is again incident on the magnetic domain A of the Faraday rotator 20. As shown at the left side of FIG. 15(b), the light beam L44a is emitted from the Faraday rotator 20 as a light beam L45a in which the polarization direction is rotated counterclockwise by 45° with respect to the Z axis when viewed in the −Z direction, and the light beam L44b is emitted from the Faraday rotator 20 as a light beam L45b in which the polarization direction is rotated clockwise by 45°. The light beam L45a is incident on the birefringent plate (second birefringent plate) 11 and becomes the ordinary ray, and the light beam L45b is incident on the birefringent plate 11 and becomes the extraordinary ray. As shown at the left side of FIG. 15(a), the light beam L45a is emitted as a light beam L46a from the birefringent plate 11 without causing an axial shift, and the light beam L45b is axially shifted and is emitted as a light beam L46b from the birefringent plate 11. Both the light beams L46a and L46b do not incident on the light incoming port P1. Accordingly, even if the partial light passes through the polarizing glass plate 16, the transmitted light is not incident on the light incoming port P1. As stated above, it is understood that the reflection-type optical isolator 2 of this embodiment functions as a tandem-type optical isolator.

Besides, in this embodiment, a light beam, which has passed through one of the birefringent plates 11 and 12 having the same optical characteristics as an ordinary ray, passes through the other as an extraordinary ray when it is reflected by the reflecting film 30 and is returned. On the other hand, a light beam, which has passed through one of the birefringent plates 11 and 12 as an extraordinary ray, passes through the other as an ordinary ray when it is reflected by the reflecting film 30 and is returned. Besides, in a period in which the light beams pass through the Faraday rotator 20, are reflected by the reflecting film 30 and are again incident on the Faraday rotator 20, the polarization directions of the two separated light beams are the same. Accordingly, according to the reflection-type optical isolator 2 of this embodiment, the PMD value can be made zero, the tandem-type structure is obtained, and high isolation characteristics can be obtained.

Figure 16:
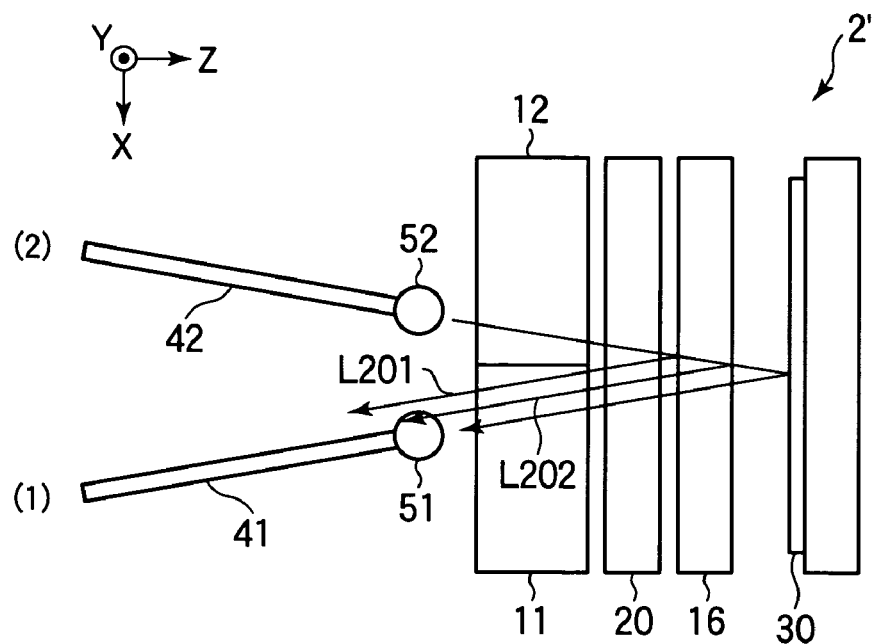
FIG. 16 is a view for explaining a problem which can occur in the reflection-type optical device according to the third embodiment of the invention.

Incidentally, although FIGS. 13A and 13B show that the polarizing glass plate 16 and the reflecting film 30 are parallel to each other, the polarizing glass plate 16 and the reflecting film 30 are actually disposed to be nonparallel to each other. FIG. 16 shows a reflection-type optical isolator 2' in which a polarizing glass plate 16 and a reflecting film 30 are disposed to be parallel to each other. As shown in FIG. 16, when the polarizing glass plate 16 and the reflecting film 30 are disposed to be parallel to each other, light from a light outgoing port P2 is incident on a light incoming port P1 as reflected light reflected by the light incoming/outgoing plane of the polarizing glass plate 16 or as scattered light scattered by the polarizing glass plate 16 (light beams L201 and L202 of FIG. 16). Thus, in the reflection-type optical isolator 2', there arises a problem that high isolation characteristics can not be obtained.

Figure 17:
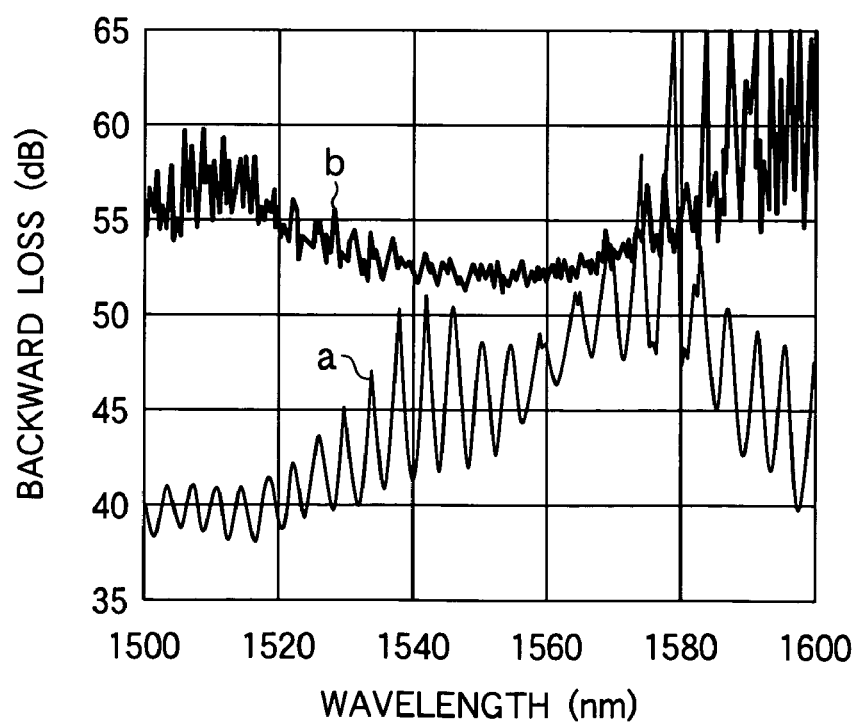
FIG. 17 is a view for explaining a problem which can occur in the reflection-type optical device according to the third embodiment of the invention.

Besides, in the reflection-type optical isolator 2', interference occurs between the reflected light reflected by the light incoming/outgoing plane of the polarizing glass plate 16 or the scattered light scattered by the polarizing glass plate 16 and the reflected light reflected by the reflecting film 30, and there arises a problem that wavelength characteristics become unstable. FIG. 17 is a graph showing the wavelength characteristics of backward loss of the reflection-type optical isolators 2 and 2'. The horizontal axis of FIG. 17 indicates the wavelength (nm), and the vertical axis indicates the backward loss (dB). A line "a" in the graph indicates the wavelength characteristics of the backward loss of the reflection-type optical isolator 2' in which a distance between the surface of the polarizing glass plate 16 at the +Z side and the light reflecting surface of the reflecting film 30 is made 0 mm, and the polarizing glass plate 16 and the reflecting film 30 are disposed to be parallel to each other. A line "b" indicates the wavelength characteristics of the backward loss of the reflection-type optical isolator 2 in which a distance between the surface of the polarizing glass plate 16 at the +Z side and the light reflecting surface of the reflecting film 30 is made 0.16 mm, and the polarizing glass plate 16 and the reflecting film 30 are disposed so that an angle between them becomes 5°. As shown in FIG. 17, in the reflection-type optical isolator 2, in general, the backward loss higher than the backward loss of the reflection-type optical isolator 2' is obtained. Besides, ripples are present in the waveform indicated by the line "a", and the wavelength characteristics of the backward loss of the reflection-type optical isolator 2' is unstable, whereas the wavelength characteristics of the backward loss of the reflection-type optical isolator 2 is relatively stable.

As stated above, in order to obtain high isolation characteristics, it becomes necessary that the polarizing glass plate 16 and the reflecting film 30 are disposed to be nonparallel to each other, and the interval therebetween is made as wide as possible.

Figure 18:
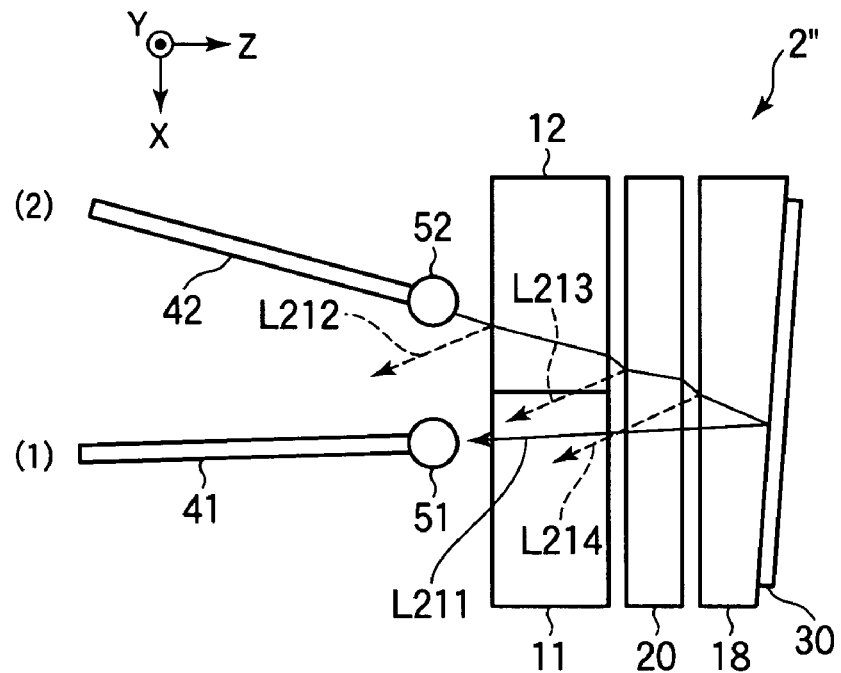
FIG. 18 is a view showing a modified example of the reflection-type optical device according to the third embodiment of the invention.

Next, a modified example of the structure of the reflection-type optical isolator according to this embodiment will be described. FIG. 18 shows a reflection-type optical isolator 2" according to this modified example. As shown in FIG. 18, in this modified example, instead of the polarizing glass plate 16, a wedge birefringent crystal plate 18 having a wedge shape is used as a polarizer. The surface of the wedge birefringent crystal plate 18 at the −Z side is disposed to be substantially parallel to light incoming/outgoing planes of birefringent plates 11 and 12 and a Faraday rotator 20. A reflecting film 30 is disposed at the surface of the wedge birefringent crystal plate 18 at the +Z side, and the reflecting film 30 is directly grown on the surface of the wedge birefringent crystal plate 18 at the +Z side. Since the surface of the wedge birefringent crystal plate 18 at the +Z side and the surface at the −Z side are nonparallel to each other, the light reflecting surface of the reflecting film 30 is nonparallel to the light incoming/outgoing planes of the birefringent plates 11 and 12 and the Faraday rotator 20. Light incident on the surface of the wedge birefringent crystal plate 18 at the −Z side is separated into an ordinary ray and an extraordinary ray. The ordinary ray and the extraordinary ray are reflected by the reflecting film 30, and are emitted from the surface of the wedge birefringent crystal plate 18 at the −Z side in directions different from each other. By this, since only one polarized component can be extracted, the wedge birefringent crystal plate 18 functions as a polarizer.

In this modified example, even if the light incoming/outgoing planes of the birefringent plates 11 and 12, the light incoming/outgoing planes of the Faraday rotating part and the surface of the wedge birefringent crystal plate 18 at the −Z side are disposed to be parallel to each other, the light reflecting surface of the reflecting film 30 becomes nonparallel to these. Accordingly, a reflected light beam L211 obtained in such a manner that light from the light outgoing port P2 is reflected by the reflecting film 30, a reflected light beam L212 reflected by the light incoming/outgoing plane of the birefringent plate 12 at the −Z side, a reflected light beam L213 reflected by the light incoming/outgoing plane of the Faraday rotator 20 at the −Z side and a reflected light beam L214 reflected by the surface of the wedge birefringent crystal plate 18 at the −Z side are different from each other in traveling direction. Thus, there does not occur a problem of interference or the like, and the reflection-type optical isolator 2" having high isolation characteristics can be obtained. Besides, in this modified example, the reflecting film 30 can be directly formed on the surface of the wedge birefringent crystal plate 18 at the +Z side. Thus, this modified example is effective also in reduction of the number of parts and miniaturization of the reflection-type optical isolator 2".

FOURTH EMBODIMENT

Figure 19:
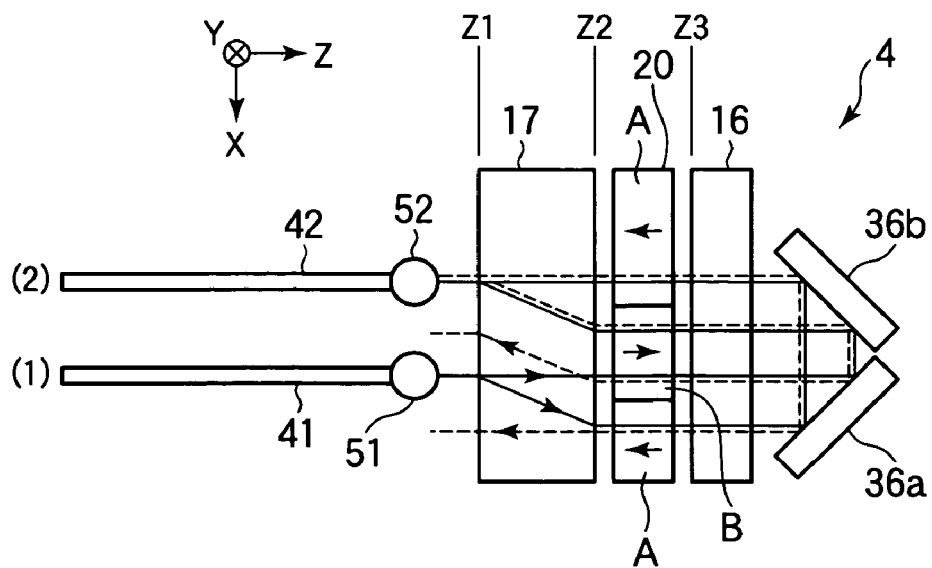
FIG. 19 is a view schematically showing a structure of a reflection-type optical device according to a fourth embodiment of the invention.

Next, a reflection-type optical device according to a fourth embodiment of the invention will be described with reference to FIGS. 19 to 22. FIG. 19 schematically shows a structure of a reflection-type optical isolator according to this embodiment. In FIG. 19, the Z axis is made in the traveling direction of light, and the direction in which external light travels toward reflecting plates (reflecting parts) 36a and 36b included in the reflection-type optical isolator is made the +Z direction. The X axis and the Y axis are made in two directions perpendicular to each other in a plane perpendicular to the Z axis.

As shown in FIG. 19, the reflection-type optical isolator 4 is connected to two optical fibers 41 and 42. An end part of the optical fiber 41 at the −Z side is a light incoming port P1(1) on which light is incident from the outside. An end part of the optical fiber 42 at the −Z side is a light outgoing port P2(2) which emits light to the outside. A lens 51 for converting divergent light emitted from the optical fiber 41 into parallel light is disposed in the +Z direction of the optical fiber 41, and a lens 52 for converting parallel light into convergent light and makes it incident on the optical fiber 42 is disposed in the +Z direction of the optical fiber 42.

A birefringent plate 17 is disposed in the +Z direction of the lenses 51 and 52. The birefringent plate 17 includes an optic axis OA parallel to a direction in which the X axis is inclined counterclockwise by 45° with respect to the Y axis when viewed in the +Y direction. A Faraday rotator 20 is disposed in the +Z direction of the birefringent plate 17. A permanent magnet for applying a specified magnetic field to the Faraday rotator 20 is disposed, for example, in the vicinity of the Faraday rotator 20.

Figure 20A:
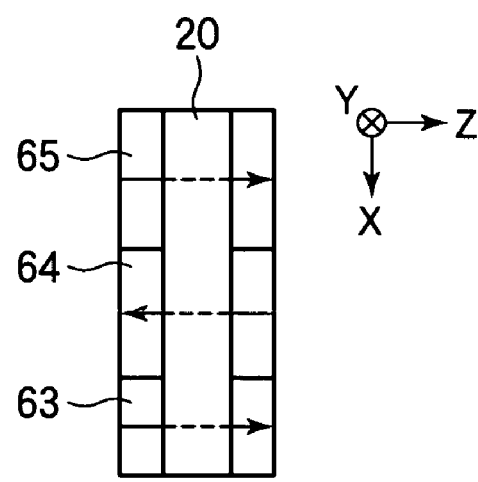
FIGS. 20A and 20B are views showing the arrangement of a Faraday rotator and a permanent magnet of the reflection-type optical device according to the fourth embodiment of the invention.
Figure 20B:
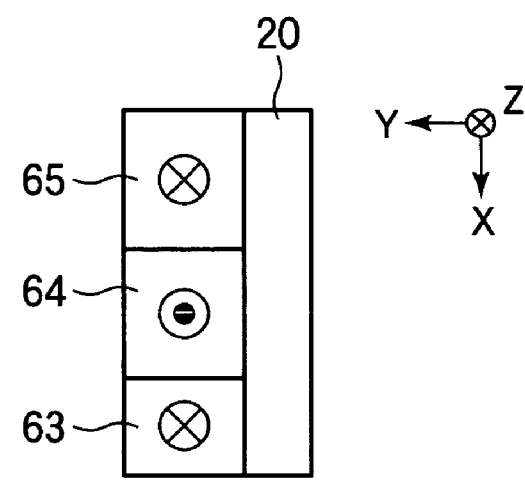

FIGS. 20A and 20B show the arrangement of the Faraday rotator and the permanent magnet. FIG. 20A shows the arrangement in which the Faraday rotator and the permanent magnet are viewed in the +Y direction, and FIG. 20B shows the arrangement in which the Faraday rotator and the permanent magnet are viewed in the +Z direction. FIGS. 20A and 20B also show the direction of magnetization of the permanent magnet. As shown in FIGS. 20A and 20B, three permanent magnets 63, 64 and 65 are disposed in the vicinity of the Faraday rotator 20 in the +Y direction. The permanent magnets 63, 64 and 65 are disposed in this order from the +X side. The directions of magnetization of the permanent magnets 63 and 65 are the +Z direction, and the direction of magnetization of the permanent magnet 64 is the −Z direction. By this, as shown in FIG. 19, magnetic domains A in which magnetization is made uniformly to have the −Z direction are formed at the +X side and the −X side of the Faraday rotator 20, and a magnetic domain B in which magnetization is made uniformly to have the +Z direction is formed in the vicinity of the center of the Faraday rotator 20 (arrows in FIG. 19 indicate the directions of magnetization). That is, the Faraday rotator 20 has a structure with three magnetic domains in which the magnetic domains A are formed at both sides of the magnetic domain B. Among light beams incident from the light incoming port P1, a light beam having passed through the birefringent plate 17 as an ordinary ray is incident on the magnetic domain B of the Faraday rotator 20, and a light beam having passed through the birefringent plate 17 as an extraordinary ray is incident on the magnetic domain A of the Faraday rotator 20. Among light beams incident from the light outgoing port P2, a light beam passing through the birefringent plate 17 as an ordinary ray is incident on the magnetic domain A of the Faraday rotator 20 and a light beam having passed through the birefringent plate 17 as an extraordinary ray is incident on the magnetic domain B of the Faraday rotator 20.

A polarizing glass plate (polarizer) 16 is disposed in the +Z direction of the Faraday rotator 20. The polarizing glass plate 16 allows a specified linearly polarized light to pass through, and absorbs a linearly polarized light perpendicular thereto. The transmission axis of the polarizing glass plate 16 is almost parallel to the direction in which the X axis is inclined clockwise by 45° with respect to the Z axis when viewed in the −Z direction. A reflecting part is disposed in the +Z direction of the polarizing glass plate 16. The reflecting part includes the two reflecting plates 36a and 36b having light reflecting surfaces disposed to be almost perpendicular to each other, so that the optical path of incident light is changed by dihedral reflection. The light reflecting surface of the reflecting plate 36a is disposed to be substantially parallel to a plane obtained by inclining the Y-Z plane counterclockwise by 45° with respect to the Y axis when viewed in the +Y direction, and the light reflecting surface of the reflecting plate 36b is disposed to be substantially parallel to a plane obtained by inclining the Y-Z plane clockwise by 45° with respect to the Y axis when viewed in the +Y direction.

Figure 21:
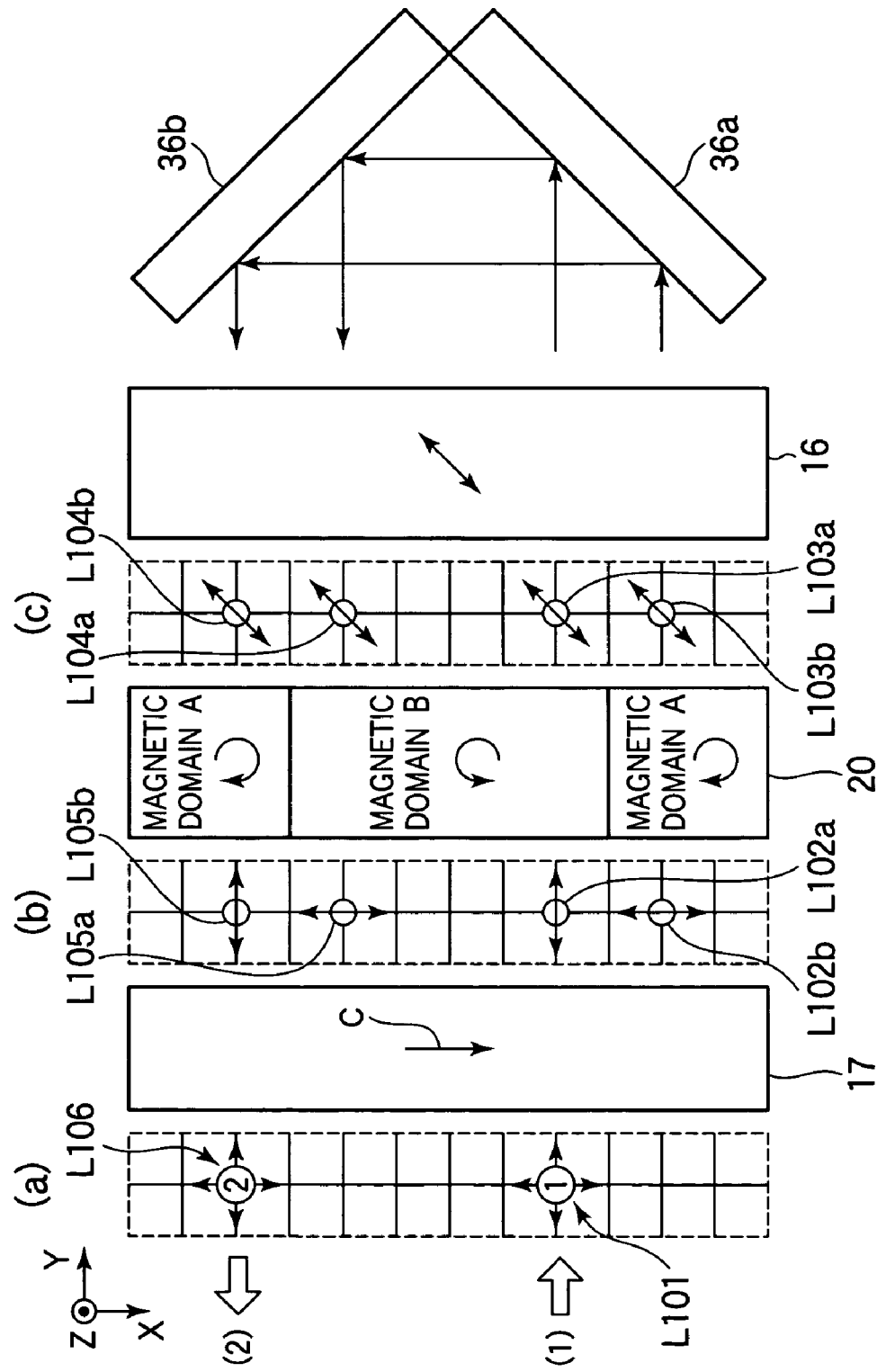
FIG. 21 is a view showing polarization states of light beams passing through respective optical elements constituting a reflection-type optical isolator.
Figure 22:
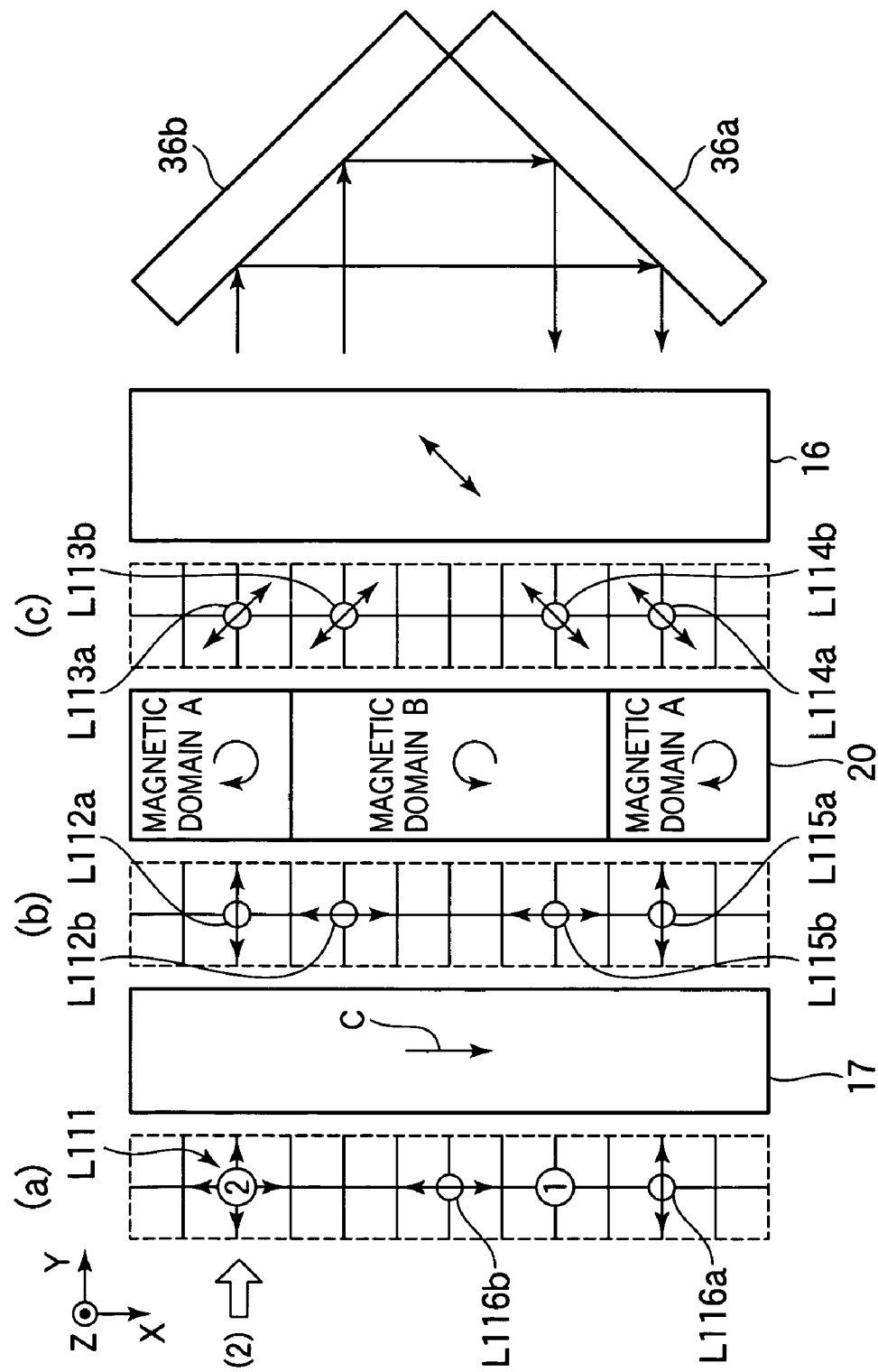
FIG. 22 is a view showing polarization states of light beams passing through the respective optical elements constituting the reflection-type optical isolator.

Next, the operation of the reflection-type optical isolator according to this embodiment will be described with reference to FIG. 21 and FIG. 22. FIG. 21 and FIG. 22 are views showing polarization states of light beams passing through the respective optical elements constituting the reflection-type optical isolator 4 when viewed in the −Z direction. FIGS. 21(a) and 22(a) show polarization state of light beams at a light incoming/outgoing plane Z1 of the birefringent plate 17 at the −Z side shown in FIG. 19. FIGS. 21(a) and 22(b) show polarization states of light beams at a light incoming/outgoing plane Z2 of the birefringent plate 17 at the +Z side. FIGS. 21(c) and 22(c) show polarization states of light beams at a light incoming/outgoing plane Z3 of the polarizing glass plate 16 at the −Z side. In order to facilitate understanding, FIG. 21 and FIG. 22 also schematically show a state in which the birefringent plate 17, the Faraday rotator 20 and the polarizing glass plate 16 are viewed in the −Z direction, and a state in which the reflecting plates 36a and 36b are viewed in the +Y direction.

FIG. 21 shows light incident from the light incoming port P1 and emitted from the light outgoing port P2 to the outside like a light beam indicated by a solid line of FIG. 19. As shown at the lower side of FIG. 21(a), a light beam L101 incident from the light incoming port P1 is incident on the birefringent plate 17. The light beam L101 is separated into an ordinary ray L102a and an extraordinary ray L102b axially shifted in the +X direction as shown at the lower side of FIG. 21(b), and they are emitted from the birefringent plate 17. The light beam L102a of the ordinary ray component is incident on the magnetic domain B (first Faraday rotating part) of the Faraday rotator 20, and the light beam L102b of the extraordinary ray component is incident on the magnetic domain A (second Faraday rotating part) of the Faraday rotator 20. The Faraday rotation angle of the magnetic domain A of the Faraday rotator 20 is, for example, +45° with respect to the Z axis when viewed in the −Z direction, and the Faraday rotation angle of the magnetic domain B is made −45° with respect to the Z axis when viewed in the −Z direction. As shown at the lower side of FIG. 21C, the light beam L102a is emitted from the Faraday rotator 20 as a light beam L103a in which the polarization direction is rotated counterclockwise by 45° with respect to the Z axis when viewed in the −Z direction, and the light beam L102b is emitted from the Faraday rotator 20 as a light beam L103b in which the polarization direction is rotated clockwise by 45°. By this, the polarization directions of the light beams L103a and L103b become parallel to the transmission axis (indicated by a double-headed arrow in the drawing) of the polarizing glass plate 16. Accordingly, the light beams L103a and L103b pass through the polarizing glass plate 16, are reflected by the reflecting plates 36a and 36b in sequence, again pass through the polarizing glass plate 16, and are respectively emitted as light beams L104a and L104b shown at the upper side of FIG. 21(c).

The light beam L104a is incident on the magnetic domain B (third Faraday rotating part) of the Faraday rotator 20, and the light beam L104b is incident on the magnetic domain A (fourth Faraday rotating part) of the Faraday rotator 20. Here, the magnetic domain B on which the light beam L104a is incident is formed in the same region as the magnetic domain B on which the light beam L102a is incident, and the magnetic domain A on which the light beam L104b is incident is formed in a region different from the magnetic domain A on which the light beam L102b is incident. As shown at the upper side of FIG. 21(b), the light beam L104a is emitted from the Faraday rotator 20 as a light beam L105a in which the polarization direction is rotated counterclockwise by 45° with respect to the Z axis when viewed in the −Z direction, and the light beam L104b is emitted from Faraday rotator 20 as a light beam L105b in which the polarization direction is rotated clockwise by 45°. The light beams L105a and L105b are respectively incident on the birefringent plate 17, the light beam L105a passes through the birefringent plate 17 as the extraordinary ray, and the light beam L105b passes through the birefringent plate 17 as the ordinary ray. As shown at the upper side of FIG. 21(a), the light beam L105a is axially shifted in the −X direction, is combined with the light beam L105b, and is emitted from the birefringent plate 17 as a light beam L106. The light beam L106 is incident on the light outgoing port P2 and is emitted to the outside.

FIG. 22 shows light incident from the light outgoing port P2 like a light beam indicated by a broken line of FIG. 19. As shown at the upper side of FIG. 22(a), a light beam L111 incident from the light outgoing port P2 is incident on the birefringent plate 17. As shown at the upper side of FIG. 22(b), the light beam L111 is separated into an ordinary ray L112a and an extraordinary ray 112b axially shifted in the +X direction, and they are emitted from the birefringent plate 17. The light beam L112a of the ordinary ray component is incident on the magnetic domain A of the Faraday rotator 20, and the light beam L112b of the extraordinary ray component is incident on the magnetic domain B of the Faraday rotator 20. As shown at the upper side of FIG. 22(c), the light beam L112a is emitted from the Faraday rotator 20 as a light beam L113a in which the polarization direction is rotated clockwise by 45° with respect to the Z axis when viewed in the −Z direction, and the light beam L112b is emitted from the Faraday rotator 20 as a light beam L113b in which the polarization direction is rotated counterclockwise by 45°. By this, the polarization directions of the light beams L113a and 113b become perpendicular to the transmission axis of the polarizing glass plate 16. Accordingly, both the light beams L113a and L13b are absorbed by the polarizing glass plate 16, and do not pass through the polarizing glass plate 16.

Here, there can occur a state in which the polarization directions of the light beams L113a and L113b do not become perpendicular to the transmission axis of the polarizing glass plate 16 due to an angle shift of the Faraday rotation angle caused by a fabrication error of the Faraday rotator 20 or temperature wavelength change, an angle shift of the optic axis of the birefringent plate 17 or the like, and partial light passes through the polarizing glass plate 16. As show at the lower side of FIG. 22C, a light beam L114a, which has passed through the polarizing glass plate 16, has been reflected by the reflecting plates 36b and 36a, and has passed through the polarizing glass plate 16 again, is incident on the magnetic domain A of the Faraday rotator 20. Similarly, a light beam L114b having passed through the polarizing glass plate 16 again is incident on the magnetic domain B of the Faraday rotator 20. As shown at the lower side of FIG. 22B, the light beam L114a is emitted from the Faraday rotator 20 as a light beam L115a in which the polarization direction is rotated clockwise by 45° with respect to the Z axis when viewed in the −Z direction, and the light beam L114b is emitted from the Faraday rotator 20 as a light beam L115b in which the polarization direction is rotated counterclockwise by 45°. The light beams L115a and L115b are respectively incident on the birefringent plate 17, the light beam L115a passes through the birefringent plate 17 as the ordinary ray, and the light beam L115b passes through the birefringent plate 17 as the extraordinary ray. As shown at the lower side of FIG. 22A, the light beam L115a is emitted as a light beam L116a from the birefringent plate 17 without causing an axial shift, and the light beam L115b is axially shifted in the −X direction, and is emitted as a light beam L116b from the birefringent plate 17. Both the light beams L116a and L116b are not incident on the light incoming port P1. Accordingly, even if the partial light passes through the polarizing glass plate 16, the transmitted light is not incident on the light incoming port P1. It is understood that as stated above, the reflection-type optical isolator 4 of this embodiment functions as a tandem reflection-type optical isolator.

In this embodiment, the reflection-type optical isolator 4 can be constructed by using the three optical elements (the one birefringent plate 17, the one Faraday rotator 20 and the one polarizing glass plate 16). Accordingly, according to this embodiment, the element structure of the reflection-type optical isolator 4 becomes simple, and miniaturization and reduction in cost become easy. When compared with the reflection-type optical isolator 2 according to the third embodiment, although the two reflecting plates 36a and 36b performing the dihedral reflection are required, the number of birefringent plates becomes one. Besides, since the incoming/outgoing angles of the light incident/emitted from the respective ports P1 and P2 with respect to the birefringent plate 17 become substantially equal to each other, the optical fibers 41 and 42 can be disposed substantially in parallel to each other. Accordingly, the reflection-type optical isolator 4 can be further miniaturized. Besides, the reflection-type optical isolator 4 according to this embodiment has the tandem structure although the element structure is simple. Thus, the reflection-type optical isolator 4 having high isolation characteristics can be realized.

Besides, in this embodiment, the light beam having passed through the birefringent plate 17 as the ordinary ray passes through the birefringent plate 17 as the extraordinary ray when it is reflected by reflecting plates 36a and 36b and is returned, whereas the light beam having passed through the birefringent plate 17 as the extraordinary ray passes through the birefringent plate 17 as the ordinary ray when it is reflected by the reflecting plates 36a and 36b and is returned. In a period in which the light beams pass through the Faraday rotator 20, are reflected by the reflecting plates 36a and 36b, and are again incident on the Faraday rotator 20, the polarization directions of the two separated light beams are the same. Accordingly, according to this embodiment, the PMD value can be made very small, and the polarization-independent reflection-type optical isolator 4 can be realized.

FIFTH EMBODIMENT

Figure 23:
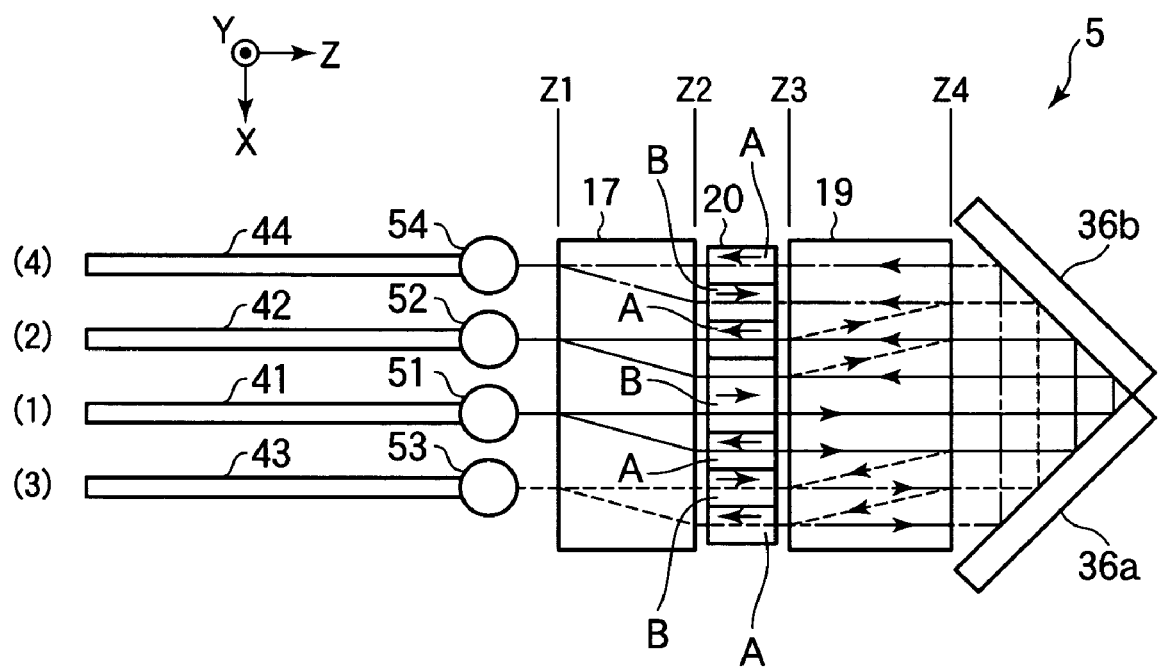
FIG. 23 is a view schematically showing a structure of a reflection-type optical device according to a fifth embodiment of the invention.

Next, a reflection-type optical device according to a fifth embodiment of the invention will be described with reference to FIGS. 23 to 26. FIG. 23 schematically shows a structure of a reflection-type optical circulator according to this embodiment. As shown in FIG. 23, a reflection-type optical circulator 5 is connected to four optical fibers 41, 42, 43 and 44. The respective optical fibers 41, 42, 43 and 44 are disposed in a plane parallel to the X-Z plane, and are disposed substantially in parallel to each other. The optical fiber 43 is disposed at the farthest position in the +X side, and the optical fibers 41, 42 and 44 are disposed, for example, at equal intervals in this order at the −X side of the optical fiber 43. End parts of the optical fibers 41, 42, 43 and 44 at the −Z side are four light incoming/outgoing ports P1, P2, P3 and P4 (denoted by numerals (1) to (4) in the drawing). Lenses 51, 52, 53 and 54 are fused to end parts of the respective optical fibers 41, 42, 43 and 44 at the +Z side. The optical fiber 41 and the lens 51 are united to function as an optical fiber with a lens. Similarly, the optical fibers 42, 43 and 44 and the lenses 52, 53 and 54 are respectively united to function as optical fibers with lenses.

A birefringent plate 17 is disposed in the +Z direction of the lenses 51, 52, 53 and 54. The birefringent plate 17 has an optic axis OA parallel to a direction in which the X axis is inclined counterclockwise by 45° with respect to the Y axis when viewed in the −Y direction.

A Faraday rotator 20 is disposed in the +Z direction of the birefringent plate 17. Although not shown, a permanent magnet for applying magnetic field with a specified distribution to the Faraday rotator 20 is disposed, for example, adjacently to the Faraday rotator 20. By the magnetic field applied by the permanent magnet, a structure with seven magnetic domains is formed in the Faraday rotator 20. A light beam incident from the light incoming/outgoing port P1 and having passed through the birefringent plate 17 as an ordinary ray is incident on a magnetic domain B of the Faraday rotator 20, whereas a light beam having passed through the birefringent plate 17 as an extraordinary ray is incident on a magnetic domain A of the Faraday rotator 20. A light beam incident from the light incoming/outgoing port P2 and having passed through the birefringent plate 17 as an ordinary ray is incident on the magnetic domain A of the Faraday rotator 20 and a light beam having passed through the birefringent plate 17 as an extraordinary ray is incident on the magnetic domain B of the Faraday rotator 20. A light beam incident from the light incoming/outgoing port P3 and having passed through the birefringent plate 17 as an ordinary ray is incident on the magnetic domain B of the Faraday rotator 20, and a light beam having passed through the birefringent plate 17 as an extraordinary ray is incident on the magnetic domain A of the Faraday rotator 20. A light beam incident from the light incoming/outgoing port P4 and having passed through the birefringent plate 17 as an ordinary ray is incident on the magnetic domain A of the Faraday rotator 20, and a light beam having passed through the birefringent plate 17 as an extraordinary ray is incident on the magnetic domain B of the Faraday rotator 20.

A birefringent plate 19 is disposed in the +Z direction of the Faraday rotator 20. The optic axis OA of the birefringent plate 19 is parallel to a plane obtained by inclining the X-Z plane counterclockwise by 45° with respect to the Z axis when viewed in the −Z direction. Reflecting plates 36a and 36b for converting an optical path by dihedral reflection are disposed in the +Z direction of the birefringent plate 19.

Figure 24:
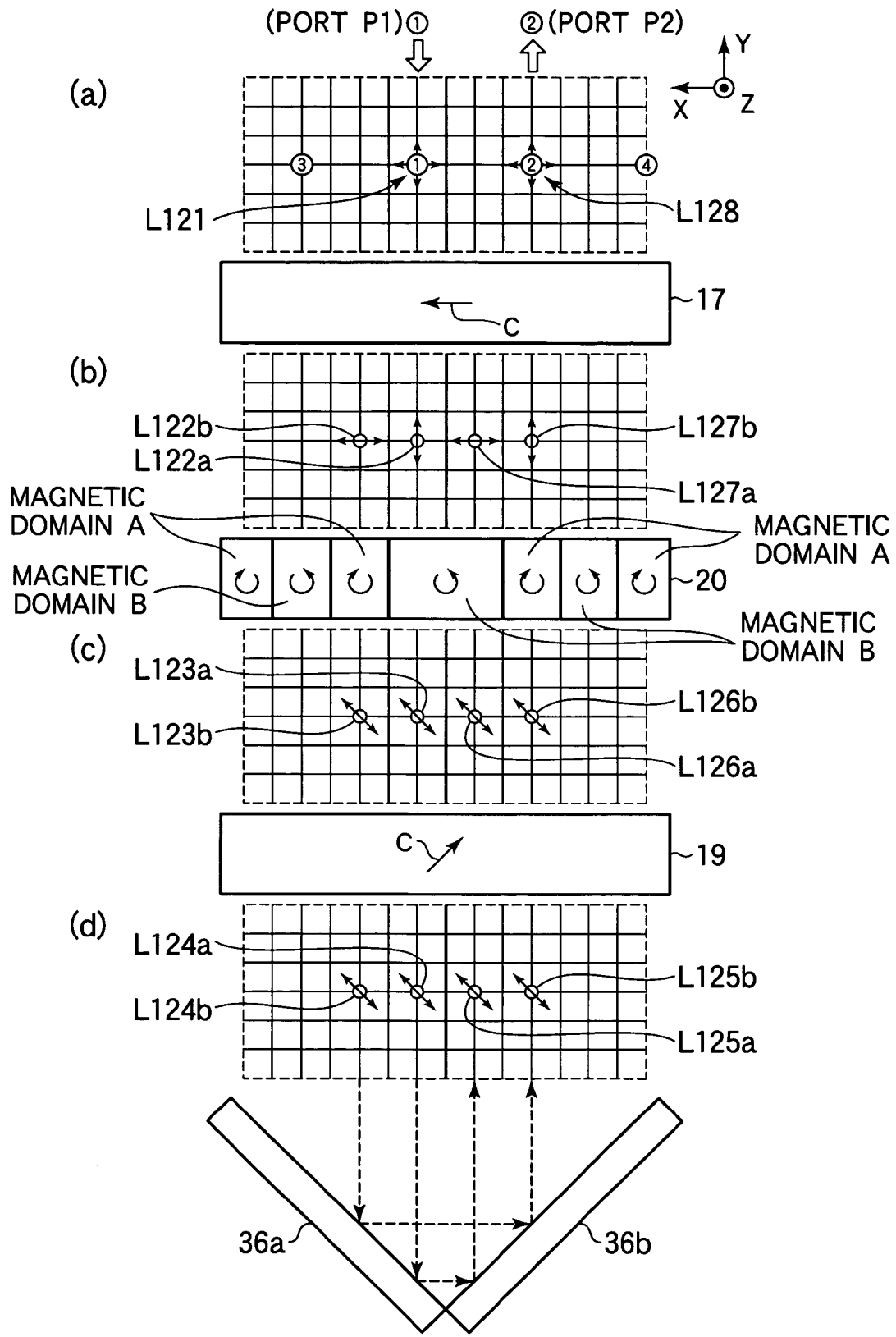
FIG. 24 is a view showing polarization states of light beams passing through respective optical elements constituting a reflection-type optical circulator.
Figure 25:
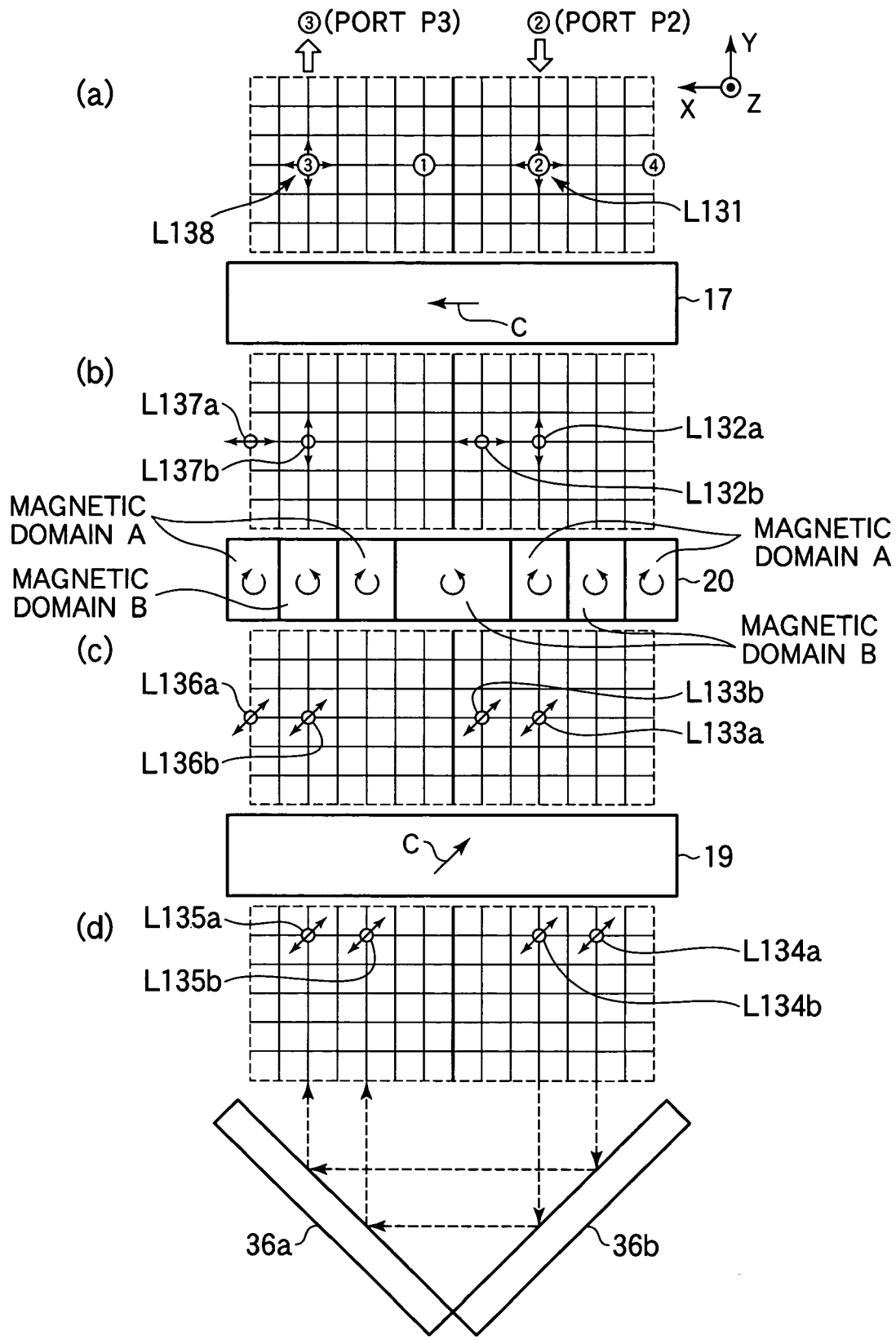
FIG. 25 is a view showing polarization states of light beams passing through the respective optical elements constituting the reflection-type optical circulator.
Figure 26:
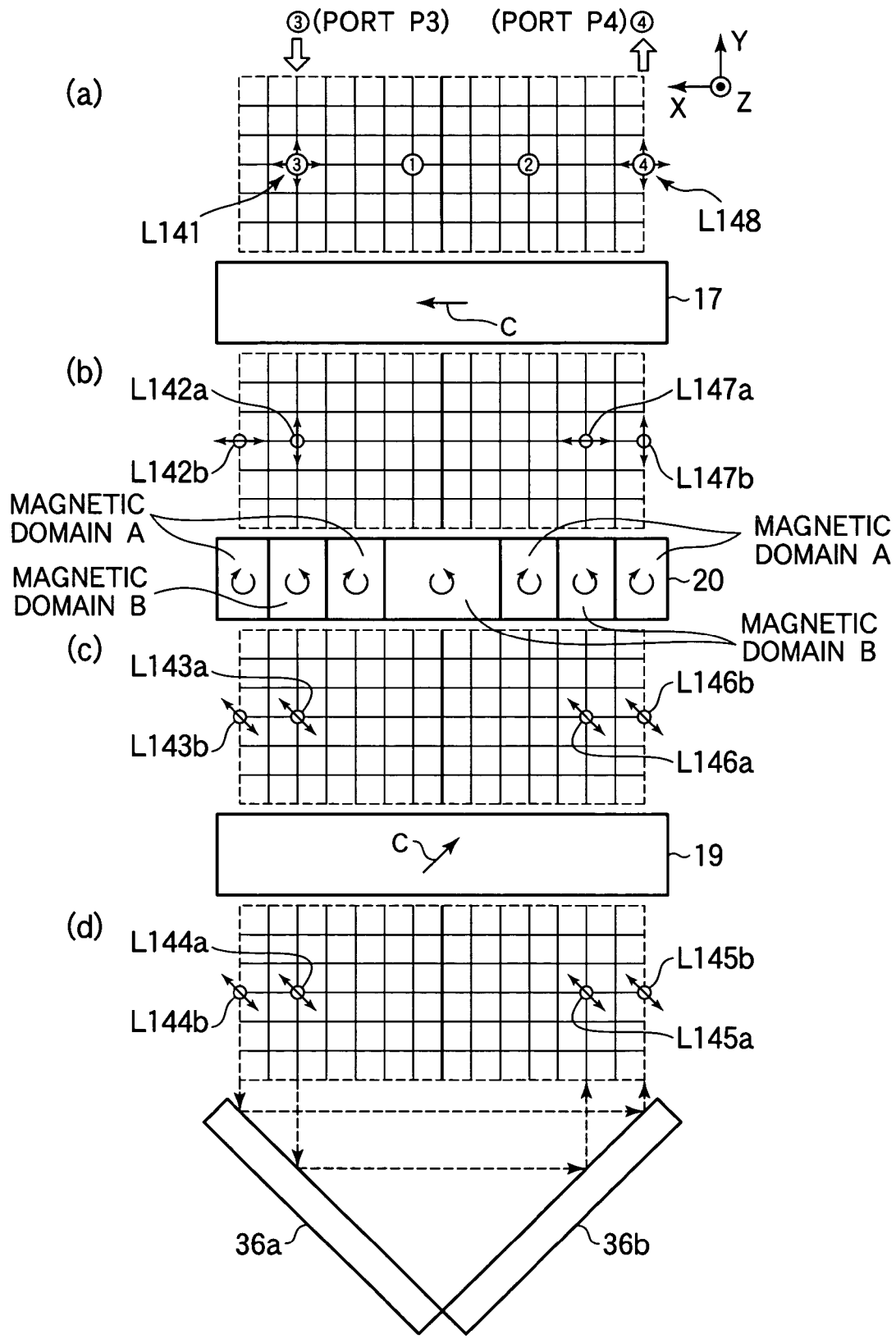
FIG. 26 is a view showing polarization states of light beams passing through the respective optical elements constituting the reflection-type optical circulator.

Next, the operation of the reflection-type optical circulator according to this embodiment will be described. FIGS. 24 to 26 are views in which polarization states of light beams passing through the respective optical elements constituting the reflection-type optical circulator 5 are viewed in the −Z direction. FIGS. 24(a), 25(a) and 26(a) show polarization states of light beams at a light incoming/outgoing plane ZI of the birefringent plate 17 at the −Z side as shown in FIG. 23. FIGS. 24(b), 25(b) and 26(b) show polarization states of light beams at a light incoming/outgoing plane Z2 of the birefringent plate 17 at the +Z side. FIGS. 24(c), 25(c) and 26(c) show polarization states of light beams at a light incoming/outgoing plane Z3 of the birefringent plate 19 at the −Z side. FIGS. 24(d), 25(d) and 26(d) show polarization states of light beams at a light incoming/outgoing plane Z4 of the birefringent plate 19 at the +Z direction. In order to facilitate understanding, FIGS. 24 to 26 also schematically show a state in which the birefringent plate 17, the Faraday rotator 20 and the birefringent plate 19 are viewed in the −Z direction, and a state in which the reflecting plates 36a and 36b are viewed in the −Y direction.

FIG. 24 shows light incident from the light incoming/outgoing port P1 and emitted from the light incoming/outgoing port P2 to the outside like a light beam indicated by a solid line of FIG. 23. As shown at the left side of FIG. 24(a), a light beam L121 incident from the light incoming/outgoing port P1 is incident on the birefringent plate 17. As shown at the left side of FIG. 24(b), the light beam L121 is separated into an ordinary ray L122a and an extraordinary ray L122b axially shifted in the +X direction, and they are emitted from the birefringent plate 17. The light beam L122a of the ordinary ray component is incident on the magnetic domain B of the Faraday rotator 20, and the light beam L122b of the extraordinary ray component is incident on the magnetic domain A of the Faraday rotator 20. The Faraday rotation angle of the magnetic domain A of the Faraday rotator 20 is made, for example, +45° with respect to the Z axis when viewed in the −Z direction, and the Faraday rotation angle of the magnetic domain B is made −45° with respect to the Z axis when viewed in the −Z direction. As shown at the left side of FIG. 24(c), the light beam L122a is emitted from the Faraday rotator 20 as a light beam L123a in which the polarization direction is rotated counterclockwise by 45° with respect to the Z axis when viewed in the −Z direction, and the light beam L122b is emitted from the Faraday rotator 20 as a light beam L123b in which the polarization direction is rotated clockwise by 45°. By this, the polarization directions of the light beams L123a and L123b become perpendicular to the plane formed by crossing of a virtual straight line parallel to the traveling directions of the light beams L123a and L123b and a virtual straight line parallel to the optic axis of the birefringent plate 19. The light beams L123a and L123b are incident on one surface of the birefringent plate 19 as the ordinary ray, and as shown at the left side of FIG. 24(d), are emitted as light beams L124a and L124b from the other surface of the birefringent plate 19 without causing an axial shift. The light beams L124a and L124b are reflected by reflecting plates 36a and 36b, and as shown at the right side of FIG. 24(d), are incident on the other surface of the birefringent plate 19 as light beams L125a and L125b whose optical paths are respectively changed.

As shown at the right side of FIG. 24(c), the light beams L125a and L125b are emitted from one surface of the birefringent plate 19 as light beams L126a and L126b without causing an axial shift. The light beam L126a is incident on the magnetic domain B of the Faraday rotator 20, and the light beam L126b is incident on the magnetic domain A of the Faraday rotator 20. Here, the magnetic domain B on which the light beam L126a is incident is formed in the same region as the magnetic domain B on which the light beam L122a is incident, and the magnetic domain A on which the light beam L126a is incident is formed in a region different from the magnetic domain A on which the light beam L122b is incident. As shown at the right side of FIG. 24(b), the light beam L126a is emitted from the Faraday rotator 20 as a light beam L127a in which the polarization direction is rotated counterclockwise by 45° with respect to the Z axis when viewed in the −Z direction, and the light beam L126b is emitted from the Faraday rotator 20 as a light beam L127b in which the polarization direction is rotated clockwise by 45°. The light beams L127a and L127b are respectively incident on the birefringent plate 17, the light beam L127a passes through the birefringent plate 17 as the extraordinary ray, and the light beam L127b passes through the birefringent plate 17 as the ordinary ray. As shown at the right side of FIG. 24(a), the light beam L127a is axially shifted in the −X direction, is combined with the light beam L127b, and is emitted as a light beam L128 from the birefringent plate 17. The light beam L128 is incident on the light incoming/outgoing port P2 and is emitted to the outside.

Similarly, as shown in FIG. 25 and FIG. 26, in the reflection-type optical circulator 5 according to this embodiment, the input light beam from the light incoming/outgoing port P1 is outputted from the light incoming/outgoing port P2, the input light beam from the light incoming/outgoing port P2 is outputted from the light incoming/outgoing port P3, and the input light beam from the light incoming/outgoing port P3 is outputted from the light incoming/outgoing port P4.

In this embodiment, the reflection-type optical circulator 5 can be constructed by using the three optical elements (the two birefringent plates 17 and 19, and the one Faraday rotator 20). Accordingly, according to this embodiment, the element structure of the reflection-type optical circulator 5 becomes very simple, and miniaturization and reduction in cost become easy. Since the optical fibers 41, 42, 43 and 44 are disposed to be parallel to each other and in the same plane, it becomes possible to form an array in which plural reflection-type optical circulators 5 are disposed to be adjacent to each other in, for example, the ±Y direction.

Incidentally, although the reflection-type optical circulator 5 according to this embodiment has the structure in which it is connected to the four light incoming/outgoing ports P1 to P4, it may be connected to three or five or more light incoming/outgoing ports. For example, in the structure in which the reflection-type optical circulator is connected to three light incoming/outgoing ports, a structure with five magnetic domains has only to be formed in the Faraday rotator 20.

SIXTH EMBODIMENT

Figure 27:
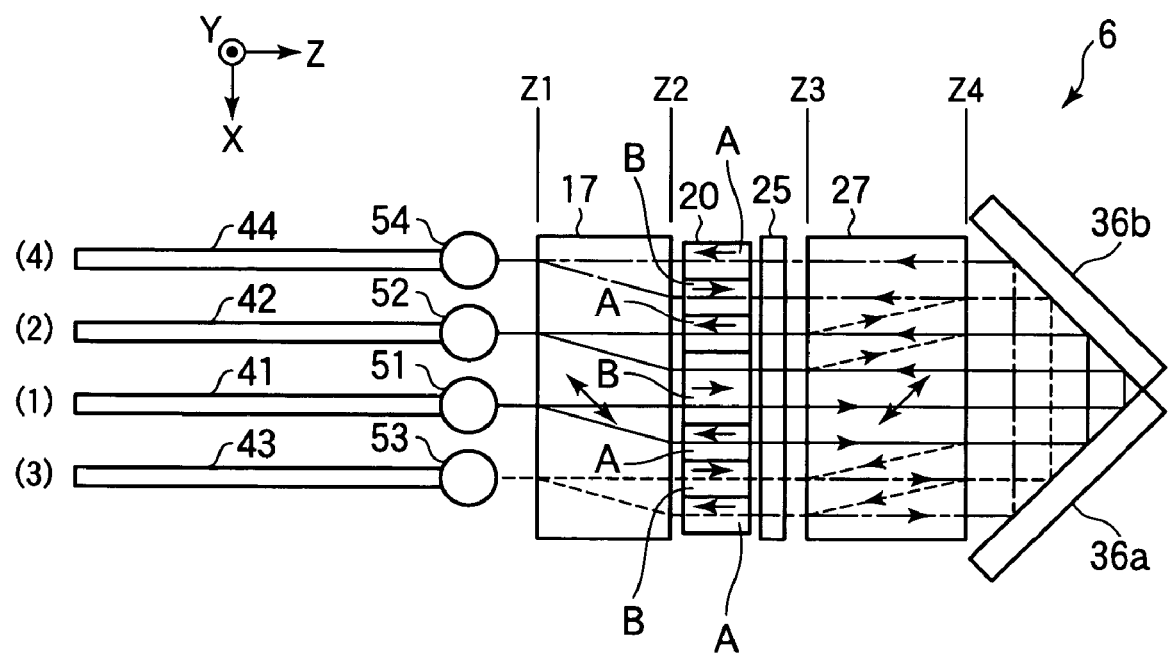
FIG. 27 is a view schematically showing a structure of a reflection-type optical device according to a sixth embodiment of the invention.

Next, a reflection-type optical device according to a sixth embodiment of the invention will be described with reference to FIGS. 27 to 30. FIG. 27 schematically shows a structure of a reflection-type optical circulator according to this embodiment. As shown in FIG. 27, a reflection-type optical circulator 6 is connected to four optical fibers 41, 42, 43 and 44. Similarly to the fifth embodiment, the respective optical fibers 41, 42, 43 and 44 are disposed in a plane parallel to the X-Z plane, and are disposed to be substantially parallel to each other. The optical fiber 43 is disposed at the farthest position in the +X side, and the optical fibers 41, 42 and 44 are disposed at the −X side of the optical fiber 43 and at, for example, equal intervals in this order. End parts of the respective optical fibers 41, 42, 43 and 44 are four light incoming/outgoing ports P1, P2, P3 and P4 (denoted by numerals (1) to (4) in the drawing). Lenses 51, 52, 53 and 54 are respectively fused to end parts of the respective optical fibers 41, 42, 43 and 44 at the +Z side.

A birefringent plate 17 is disposed in the +Z direction of the lenses 51, 52, 53 and 54. The birefringent plate 17 has an optic axis OA parallel to a direction in which the X axis is inclined counterclockwise by 45° with respect to the Y axis when viewed in the −Y direction (direction of the optic axis OA is denoted by a double-headed arrow in FIG. 27).

A Faraday rotator 20 is disposed in the +Z direction of the birefringent plate 17. In the Faraday rotator 20, a structure with seven magnetic domains is formed by magnetic field applied by a not-shown permanent magnet. A light beam incident from the light incoming/outgoing port P1 and having passed through the birefringent plate 17 as an ordinary ray is incident on the magnetic domain B of the Faraday rotator 20, and a light beam having passed through the birefringent plate 17 as an extraordinary ray is incident on the magnetic domain A of the Faraday rotator 20. A light incident from the light incoming/outgoing port P2 and having passed through the birefringent plate 17 as an ordinary ray is incident on the magnetic domain A of the Faraday rotator 20, and a light beam having passed through the birefringent plate 17 as an extraordinary ray is incident on the magnetic domain B of the Faraday rotator 20. A light beam incident from the light incoming/outgoing port P3 and having passed through the birefringent plate 17 as an ordinary ray is incident on the magnetic domain B of the Faraday rotator 20, and a light beam having passed through the birefringent plate 17 as an extraordinary ray is incident on the magnetic domain A of the Faraday rotator 20. A light beam incident from the light incoming/outgoing port P4 and having passed through the birefringent plate 17 as an ordinary ray is incident on the magnetic domain A of the Faraday rotator 20, and a light beam having passed through the birefringent plate 17 as an extraordinary ray is incident on the magnetic domain B of the Faraday rotator 20.

A ½ wavelength plate 25 is disposed in the +Z direction of the Faraday rotator 20. The ½ wavelength plate 25 is disposed so that the polarization direction of light incident in the +Z direction is rotated clockwise by 45° when viewed in the −Z direction. A birefringent plate 27 is disposed in the +Z direction of the ½ wavelength plate 25. The birefringent plate 27 has an optic axis OA parallel to a direction in which the X axis is inclined clockwise by 45° with respect to the Y axis when viewed in the −Y direction. An element having the same specification as the birefringent plate 17 is used as the birefringent plate 27. Reflecting plates 36a and 36b for converting an optical path by dihedral reflection are disposed in the +Z direction of the birefringent plate 27.

Figure 28:
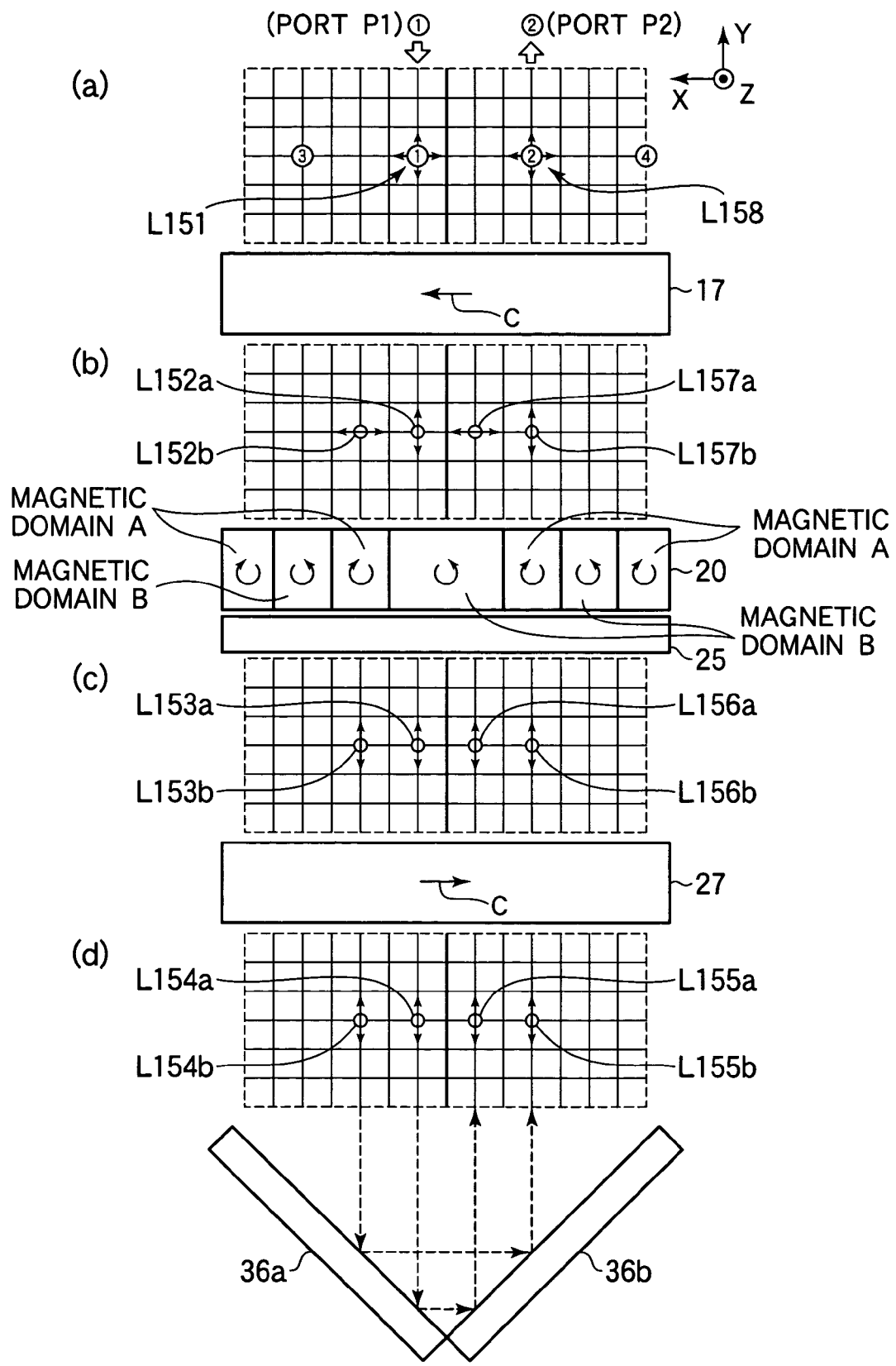
FIG. 28 is a view showing polarization states of light beams passing through respective optical elements constituting a reflection-type optical circulator.
Figure 29:
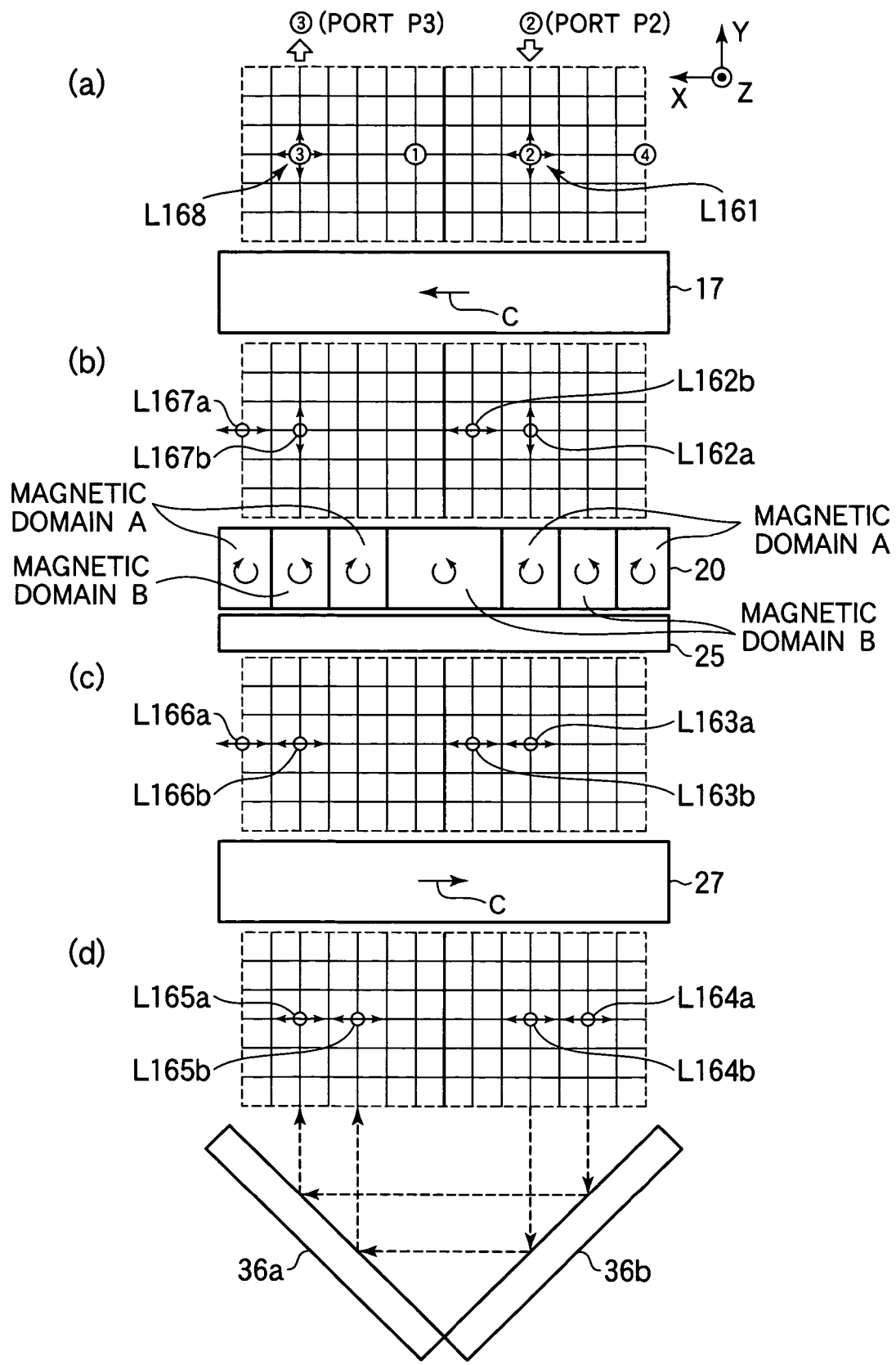
FIG. 29 is a view showing polarization states of light beams passing through the respective optical elements constituting the reflection-type optical circulator.
Figure 30:
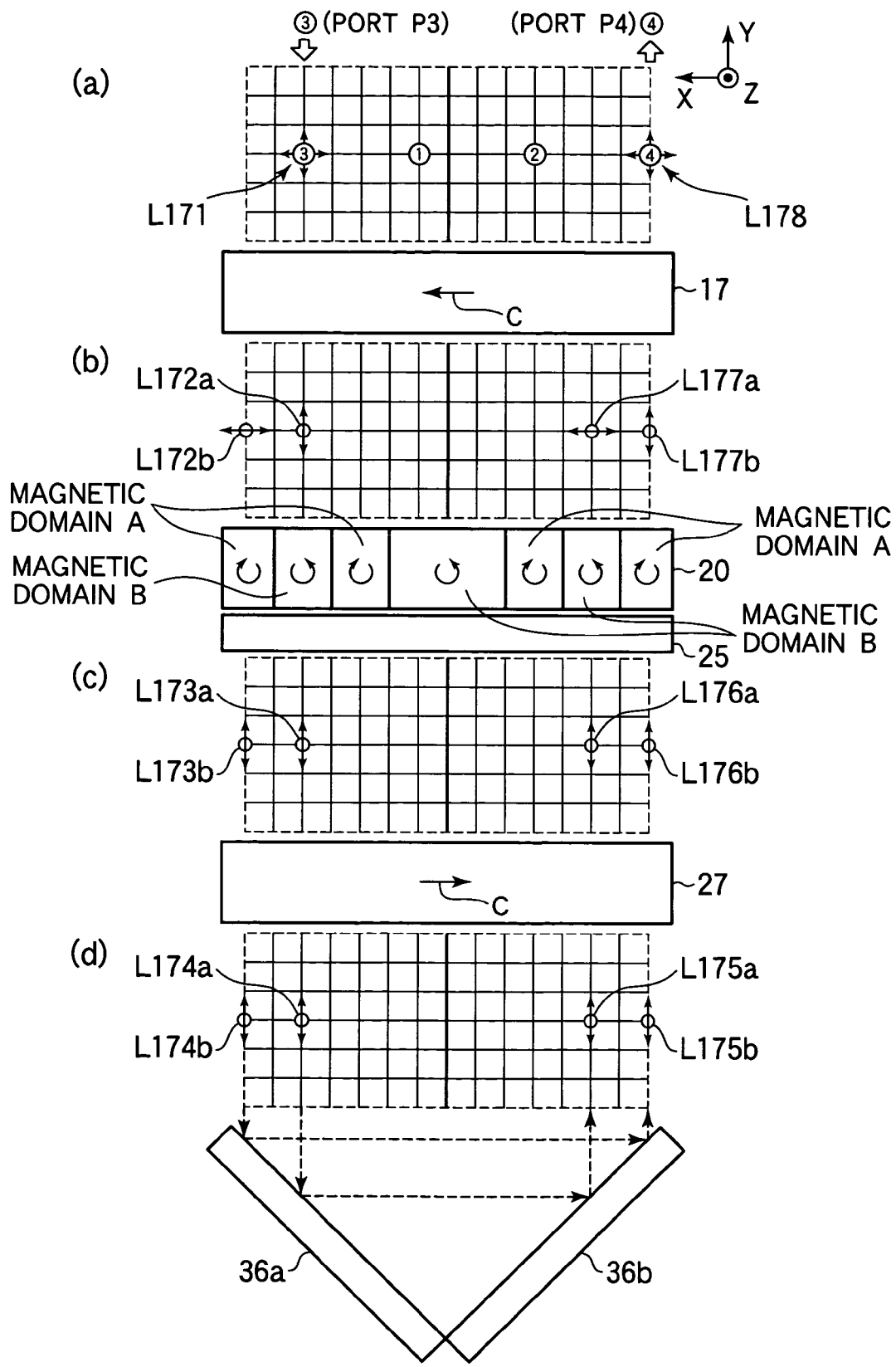
FIG. 30 is a view showing polarization states of light beams passing through the respective optical elements constituting the reflection-type optical circulator.

Next, the operation of the reflection-type optical circulator according to this embodiment will be described. FIGS. 28(a) to 30(d) are views in which polarization states of light beams passing through the respective optical elements constituting the reflection-type optical circulator 6 are viewed in the −Z direction. FIGS. 28(a), 29(a) and 30(a) show polarization states of light beams at a light incoming/outgoing plane Z1 of the birefringent plate 17 at the −Z side as shown in FIG. 27. FIGS. 28(b), 29(b) and 30(b) show polarization states of light beams at a light incoming/outgoing plane Z2 of the birefringent plate 17 at the +Z side. FIGS. 28(c), 29(c) and 30(c) show polarization states of light beams at a light incoming/outgoing plane Z3 of the birefringent plate 27 at the −Z side. FIGS. 28(d), 29(d) and 30(d) show polarization states of light beams at a light incoming/outgoing plane Z4 of the birefringent plate 27 at the +Z side. In order to facilitate understanding, FIGS. 28 to 30 also schematically show a state in which the birefringent plate 17, the Faraday rotator 20, the ½ wavelength plate 25 and the birefringent plate 27 are viewed in the −Z direction and a state in which the reflecting plates 36a and 36b are viewed in the −Y direction.

FIG. 28 shows light incident from the light incoming/outgoing port P1 and emitted from the light incoming/outgoing port P2 to the outside like a light beam indicated by a solid line of FIG. 27. As shown at the left side of FIG. 28(a), a light beam L151 incident from the light incoming/outgoing port P1 is incident on the birefringent plate 17. As shown at the left side of FIG. 28(b), the light beam L151 is separated into an ordinary ray L152a and an extraordinary ray L152b axially shifted in the +X direction, and they are emitted from the birefringent plate 17. The light beam L152a of the ordinary ray component is incident on the magnetic domain B (first Faraday rotating part) of the Faraday rotator 20, and the light beam L152b of the extraordinary ray component is incident on the magnetic domain A (second Faraday rotating part) of the Faraday rotator 20. The Faraday rotation angle of the magnetic domain A of the Faraday rotator 20 is made, for example, +45° with respect to the Z axis when viewed in the −Z direction, and the Faraday rotation angle of the magnetic domain B is made −45° with respect to the Z axis when viewed in the −Z direction. The light beam L152a is emitted from the Faraday rotator 20 as a light beam in which the polarization direction is rotated counterclockwise by 45° with respect to the Z axis when viewed in the −Z direction, and is further incident on the ½ wavelength plate 25, and as shown at the left side of FIG. 28(c), it is emitted as a light beam L153a in which the polarization direction is rotated clockwise by 45° with respect to the Z axis when viewed in the −Z direction. The light beam L152b is emitted from the Faraday rotator 20 as a light beam in which the polarization direction is rotated clockwise by 45° with respect to the Z axis when viewed in the −Z direction, and is further incident on the ½ wavelength plate 25, and is emitted as a light beam L153b in which the polarization direction is rotated clockwise by 45° with respect to the Z axis when viewed in the −Z direction. By this, the polarization directions of the light beams L153a and L153b become perpendicular to a plane formed by crossing of a virtual straight line parallel to the traveling directions of the light beams L153a and L153b and a virtual straight line parallel to the optic axis of the birefringent plate 27. The light beams L153a and L153b are incident on one surface of the birefringent plate 27 as the ordinary ray, and as shown at the left side of FIG. 28(d), they are emitted as light beams L154a and L154b from the other surface of the birefringent plate 27 without causing an axial shift. The light beams L154a and L154b are reflected by the reflecting plates 36a and 36b, and as shown at the right side of FIG. 28(d), they are respectively incident on the other surface of the birefringent plate 27 as light beams L155a and L155b whose optical paths are changed.

As shown at the right side of FIG. 28(c), the light beams L155a and L155b are emitted from the one surface of the birefringent plate 27 as light beams L156a and L156b without causing an axial shift, and are incident on the ½ wavelength plate 25. The light beam L156a is emitted from the ½ wavelength plate 25 as a light beam in which the polarization direction is rotated counterclockwise by 45° with respect to the Z axis when viewed in the −Z direction, and is further incident on the magnetic domain B of the Faraday rotator 20, and as shown at the right side of FIG. 28(b), it is emitted as a light beam L157a in which the polarization direction is rotated counterclockwise by 45° with respect to the Z axis when viewed in the −Z direction. The light beam L156b is emitted from the ½ wavelength plate 25 as a light beam in which the polarization direction is rotated counterclockwise by 45° with respect to the Z axis when viewed in the −Z direction, and is further incident on the magnetic domain A of the Faraday rotator 20, and it is emitted as a light beam L157b in which the polarization direction is rotated clockwise by 45° with respect to the Z axis when viewed in the −Z direction. Here, the magnetic domain B on which the light beam L156a is incident is formed in the same region as the magnetic domain B on which the light beam L152a is incident. The magnetic domain A on which the light beam L156b is incident is formed in a region different from the magnetic domain A on which the light beam L152b is incident. The light beams L157a and L157b are incident on the birefringent plate 17, the light beam L157a passes through the birefringent plate 17 as the extraordinary ray, and the light beam L157b passes through the birefringent plate 17 as the ordinary ray. As shown at the right side of FIG. 28(a), the light beam L157a is axially shifted in the −X direction, is combined with the light beam L157b, and is emitted from the birefringent plate 17 as a light beam L158. The light beam L158 is incident on the light incoming/outgoing port P2 and is emitted to the outside.

Similarly, as shown in FIGS. 29 and 30, in the reflection-type optical circulator 6 according to this embodiment, the input light beam from the light incoming/outgoing port P1 is outputted from the light incoming/outgoing port P2, the input light beam from the light incoming/outgoing port P2 is outputted from the light incoming/outgoing port P3, and the input light beam from the light incoming/outgoing port P3 is outputted from the light incoming/outgoing port P4.

In this embodiment, the reflection-type optical circulator 6 can be constructed by using the four optical elements (the two birefringent plates 17 and 27, the one Faraday rotator 20 and the one ½ wavelength plate 25). When compared with the reflection-type optical circulator 5 according to the fifth embodiment, although the ½ wavelength plate 25 is newly required, elements having the same specification can be used as the two birefringent plates 17 and 27. Accordingly, according to this embodiment, the element structure of the reflection-type optical circulator 6 becomes very simple, and miniaturization and reduction in cost become easy. Besides, since the optical fibers 41, 42, 43 and 44 can be arranged in parallel to each other and in the same plane, it becomes possible to form an array in which plural reflection-type optical circulators 6 are disposed to be adjacent to each other in the ±Y direction.

Incidentally, although the reflection-type optical circulator 5 according to this embodiment has the structure in which it is connected to the four light incoming/outgoing ports P1 to P4, it may be connected to three or five or more light incoming/outgoing ports. For example, in the structure in which the reflection-type optical circulator is connected to three light incoming/outgoing ports, a structure with five magnetic domains has only to be formed in the Faraday rotator 20.

SEVENTH EMBODIMENT

Figure 31A:
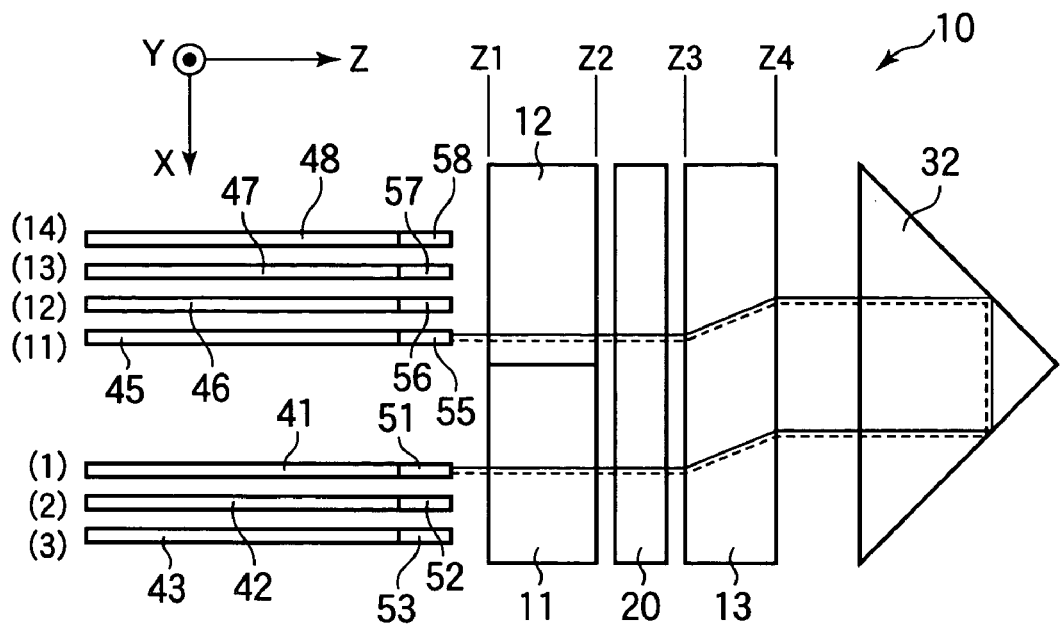
FIGS. 31A and 31B are views schematically showing a structure of a reflection-type optical device according to a seventh embodiment of the invention.
Figure 31B:
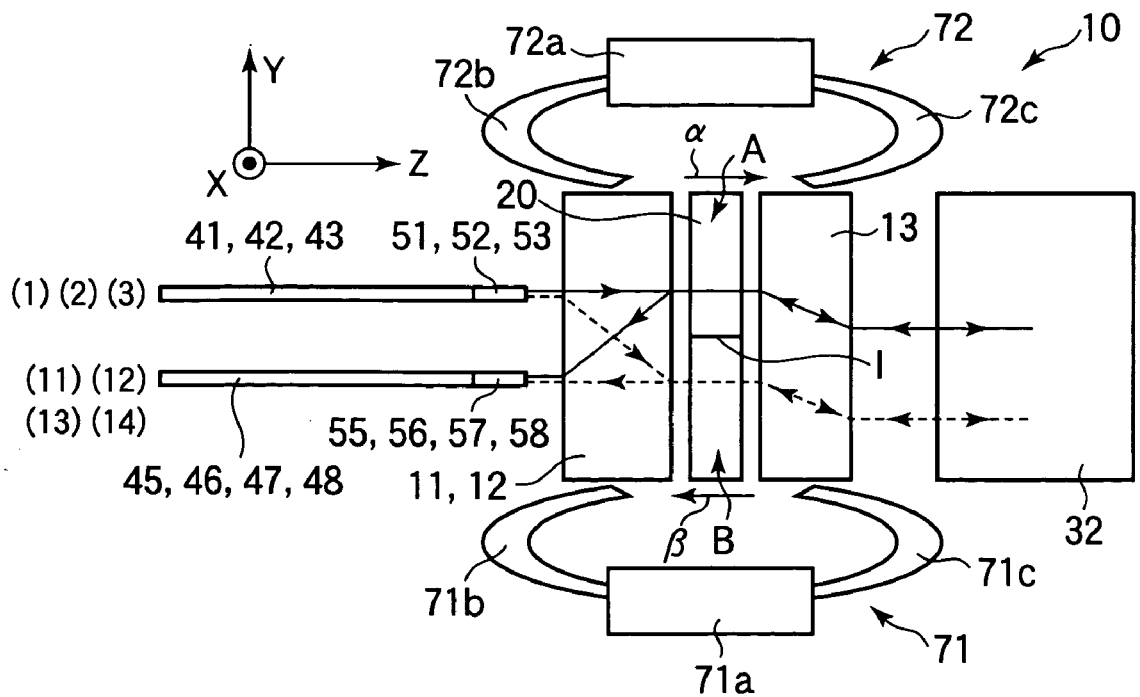

Next, a reflection-type optical device according to a seventh embodiment of the invention will be described with reference to FIGS. 31A to 33. FIGS. 31A and 31B schematically show a reflection-type optical switch according to this embodiment. FIG. 31A shows a structure of a reflection-type optical switch 10 viewed in the −Y direction, and FIG. 31B shows a structure in which the reflection-type optical switch 10 is viewed in the −X direction. As shown in FIGS. 31A and 31B, the reflection-type optical switch 10 has the structure in which magnetic field application systems 71 and 72 for applying variable magnetic fields to a Faraday rotator 20 to invert magnetization are added to the structure of the reflection-type optical circulator 1 of the first embodiment.

The reflection-type optical switch 10 is connected to, for example, seven optical fibers 41, 42, 43, 45, 46, 47 and 48. The optical fibers 41, 42 and 43 are disposed in a plane parallel to the X-Z plane to be adjacent to each other in this order at a specified pitch P in the +X direction. End parts of the respective optical fibers 41, 42 and 43 at the −Z side are light incoming ports P1, P2 and P3 (denoted by (1), (2) and (3) in the drawing) on which light is incident from the outside. The optical fibers 45, 46, 47 and 48 are disposed in a plane parallel to the X-Z plane to be adjacent to each other in this order at a specified pitch P in the −X direction. With respect to the input side optical fiber 41, the output side optical fiber 45 is positioned to be shifted by a specified pitch in the −X direction and the −Y direction. End parts of the respective optical fibers 45, 46, 47 and 48 at the −Z side are light outgoing ports P11, P12, P13 and P14 (denoted by (11), (12), (13) and (14) in the drawing). Lenses 51 to 53 for converting divergent light emitted from the optical fibers 41 to 43 into parallel light are disposed in the +Z direction of the optical fibers 41 to 43. Lenses 55 to 58 for converting parallel light incident on the optical fibers 45 to 48 into convergent light are disposed in the +Z direction of the optical fibers 45 to 48. In order to miniaturize the reflection-type optical switch 10 and an apparatus containing that, it is important to miniaturize the lenses 51 to 53 and the lenses 55 to 58. Also in this embodiment, the lenses as shown in FIGS. 2A and 2B, which can be miniaturized, are used.

The magnetic field application system 71 is disposed in the −Y direction of the Faraday rotator 20, and the magnetic field application system 72 is disposed in the +Y direction. The magnetic field application system 71 includes a coil 71*a* and semi-hard magnets 71*b* and 71*c* passing through the coil 71*a* to be united. The semi-hard magnets 71*b* and 71*c* are disposed so that a region of the Faraday rotator 20 at the −Y side is positioned at a gap between both tip parts of the semi-hard magnets 71*b* and 71*c*.

The semi-hard magnets 71*b* and 71*c* have coercivity smaller than a permanent magnet, and magnetization can be inverted by applying power to the coil 71*a* to apply a reverse magnetic field. The semi-hard magnets 71*b* and 71*c* have self-holding characteristics in which even if power application to the coil 71*a* is stopped, the magnetization state at the time of the power application to the coil 71*a* is held. Accordingly, when a current pulse with a specified current level (for example, about 100 mA) and a specified time length (for example, about 1 ms) is supplied to the coil 71*a* to change the direction in which the current flows, the direction of the magnetic field in the gap of the semi-hard magnets 71*b* and 71*c* can be changed.

Similarly, the magnetic field application system 72 includes a coil 72*a* and semi-hard magnets 72*b* and 72*c* passing through the coil 72*a* to be united. The semi-hard magnets 72*b* and 72*c* are disposed so that a region of the Faraday rotator 20 at the +Y side is positioned at a gap between both tip parts of the semi-hard magnets 72*b* and 72*c*.

Incidentally, instead of the semi-hard magnets 71*b*, 71*c*, 72*b* and 72*c*, a yoke made of soft magnetic material such as permalloy may be used. In this case, there is no self-holding function, and it is necessary to make current always flow, however, there is a feature that high speed response is possible.

FIG. 31B shows a state in which a specified current pulse is supplied to the coil 72*a*, and a magnetic field directed in the +Z direction as indicated by an arrow α is generated in the gap between the semi-hard magnets 72*b* and 72*c*. Besides, FIG. 31B shows a state in which a specified current pulse is supplied to the coil 71*a*, and a magnetic field directed in the −Z direction as indicated by an arrow β is generated in the gap between the semi-hard magnets 71*b* and 71*c*.

The magnetic field component in the +Z direction by the semi-hard magnets 72*b* and 72*c* becomes dominant as a magnetic field applied to a region of the Faraday rotator 20 from substantially the center to the +Y side. On the other hand, the magnetic field component in the −Z direction by the semi-hard magnets 71*b* and 71*c* becomes dominant as a magnetic field applied to a region of the Faraday rotator 20 from substantially the center to the −Y side. The intensity of the magnetic field applied to both the regions is made the saturation magnetic field of the Faraday rotator 20 or higher, so that a magnetic domain A in which magnetization is made uniformly to have one direction is formed in the region in which the magnetic field in the +Z direction is applied, and a magnetic domain B in which magnetization is made uniformly to have a direction opposite to the magnetic domain A is formed in the region in which the magnetic field in the −Z direction is applied. A magnetic wall I substantially parallel to the X-Z plane is formed between the magnetic domain A and the magnetic domain B. The Faraday rotation angle of the magnetic domain A in this embodiment is, for example, 45° in the clockwise direction with respect to the Z axis when viewed in the −Z direction, and similarly, the Faraday rotation angle of the magnetic domain B is 45° in the counterclockwise direction. Since the Faraday rotator 20 of this embodiment is different from the Faraday rotator 20 of the first embodiment in composition, the direction of magnetization in which the same polarization rotation direction can be obtained is opposite each other.

When a current pulse in a direction opposite to the current pulse at the time when the state of FIG. 31B is formed is supplied to the coil 71*a*, a magnetic field in the +z direction opposite to the arrow β can be generated in the gap between the semihard magnets 71*b* and 71*c*. Besides, when a current pulse in a direction opposite to the current pulse at the time when the state of FIG. 31B is formed is supplied to the coil 72*a*, a magnetic field in the −Z direction opposite to the arrow α can be generated in the gap between the semi-hard magnets 72*b* and 72*c*. By this, the magnetic domain A in which the direction of magnetization is inverted is formed in the region of the Faraday rotator 20 from substantially the center to the −Y side, and the magnetic domain B in which the direction of magnetization is inverted is formed in the region of the Faraday rotator 20 from substantially the center to the +Y side with respect to the magnetic wall I. Accordingly, the polarization rotation directions in the respective regions are respectively inverted.

According to this embodiment, the reflection-type optical switch 10 can be constructed by using the four optical elements (the three birefringent plates 11, 12 and 13 and the one Faraday rotator 20). Accordingly, the element structure of the reflection-type optical switch 10 becomes simple, and miniaturization and reduction in cost become easy.

Figure 32:
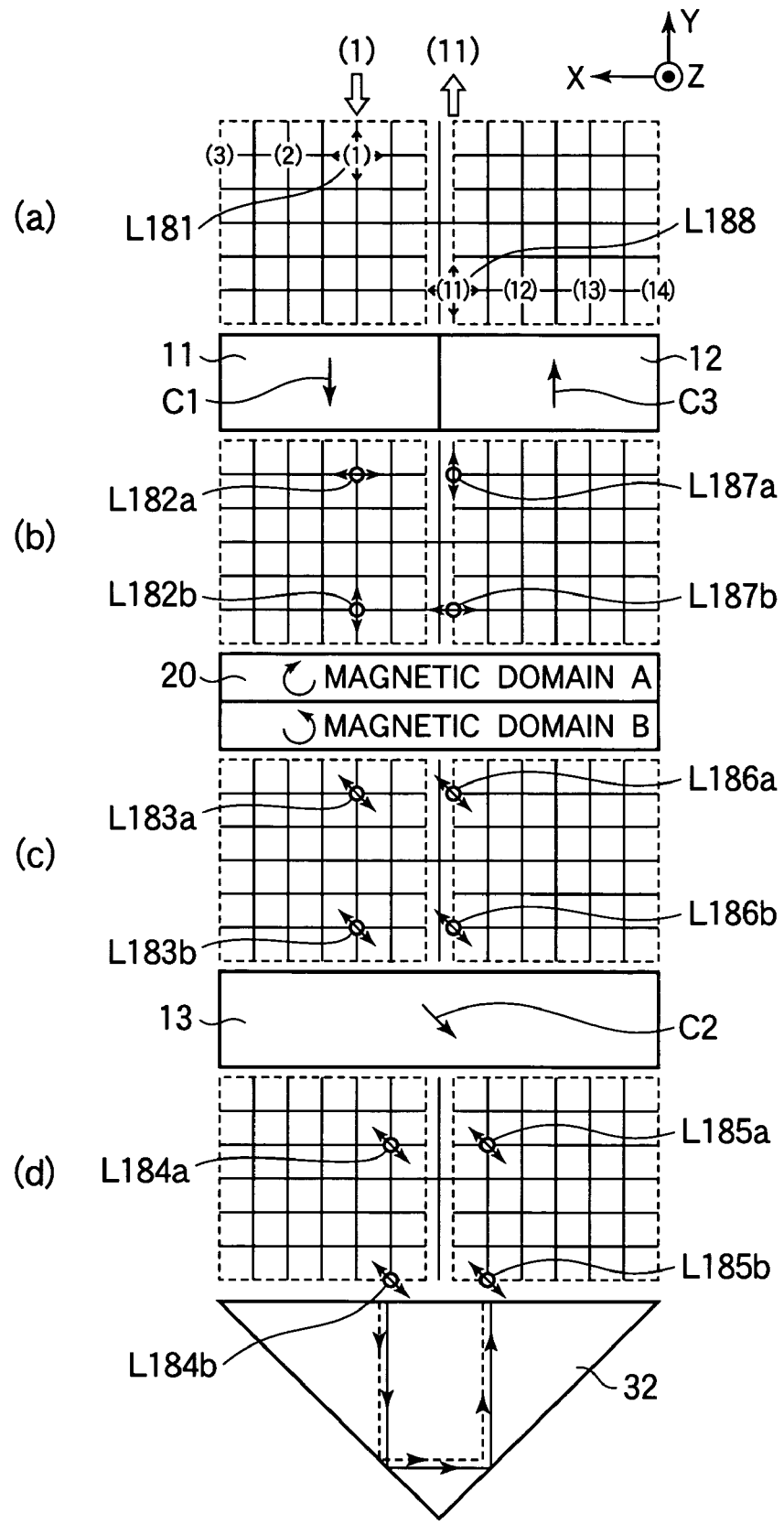
FIG. 32 is a view showing polarization states, in a first state, of light beams passing through respective optical elements constituting a reflection-type optical switch viewed in a −Z direction.
Figure 33:
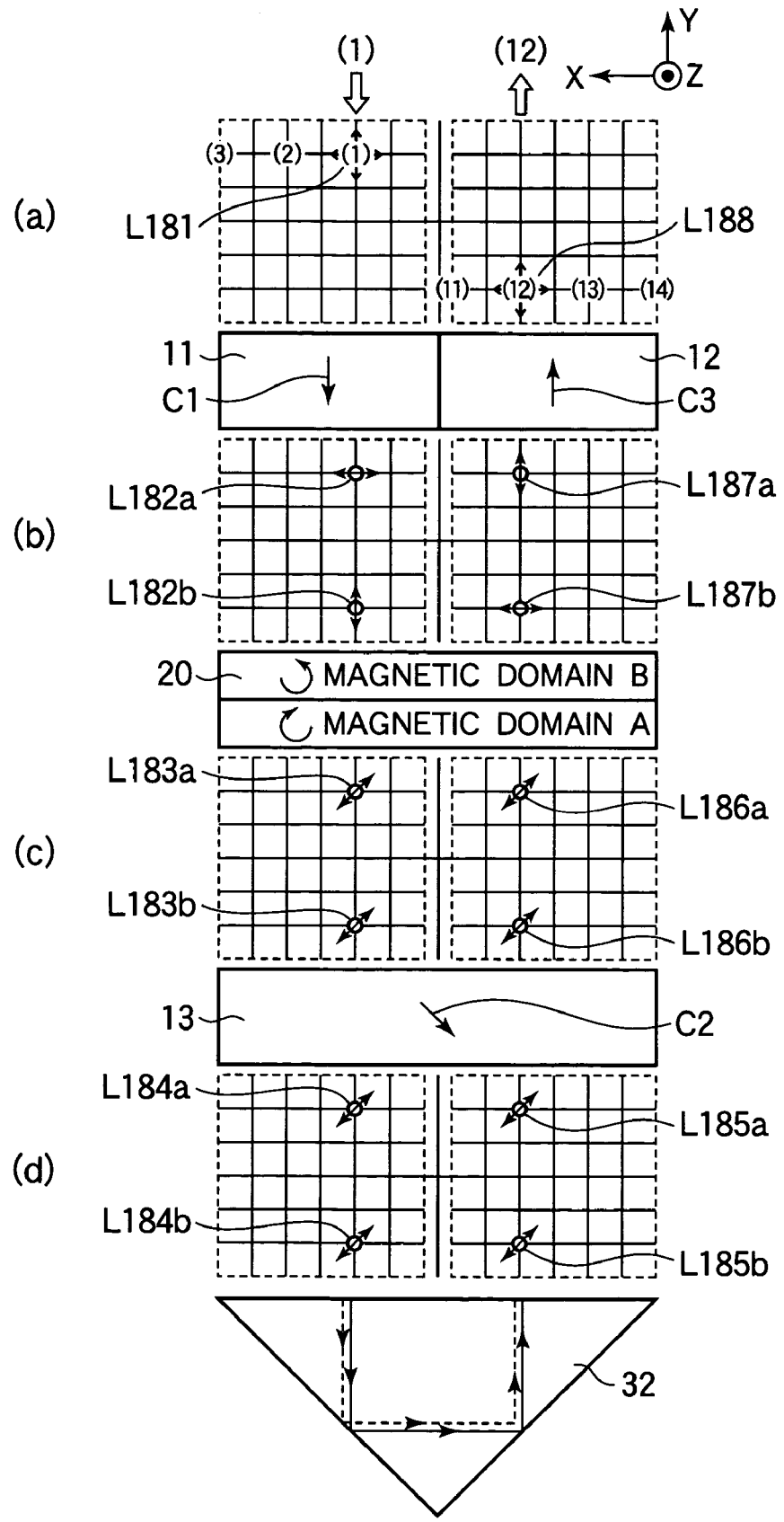
FIG. 33 is a view showing polarization states, in a second state, of light beams passing through the respective optical elements constituting the reflection-type optical switch viewed in the −Z direction.
Figure 34A:
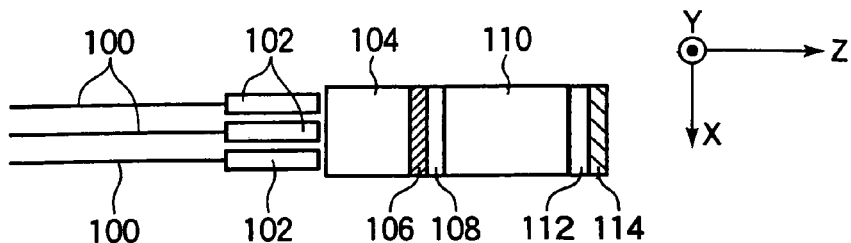
FIGS. 34A and 34B are views showing a structure of a conventional reflection-type optical circulator disclosed in patent document 1.
Figure 34B:
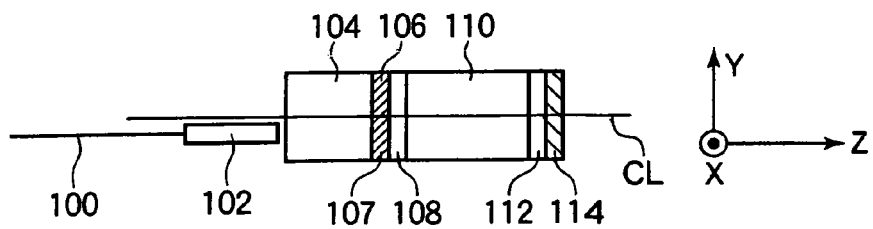
Figure 35A:
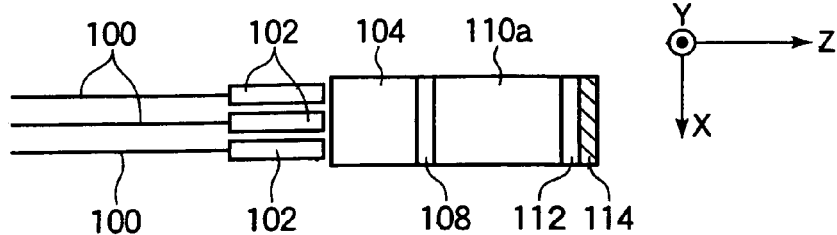
FIGS. 35A and 35B are views showing a structure of another conventional reflection-type optical circulator disclosed in patent document 1.
Figure 35B:
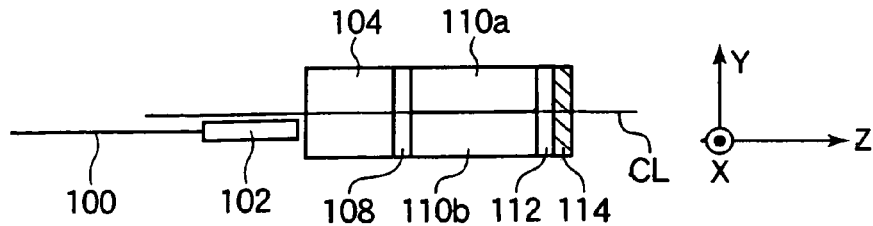
Figure 36:
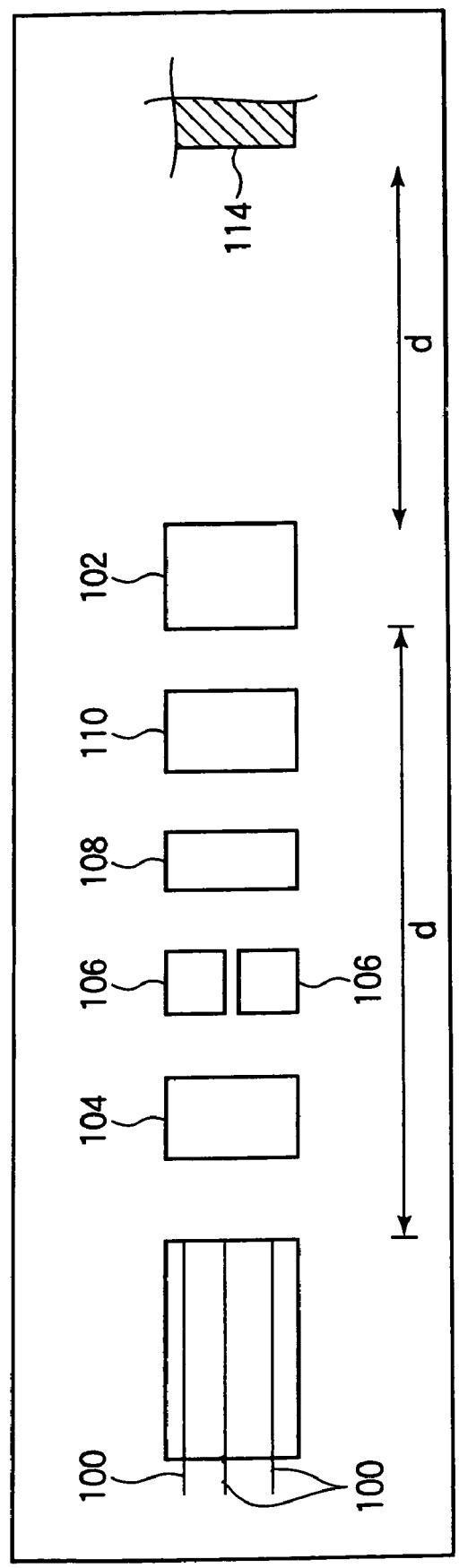
FIG. 36 is a view showing a structure of a conventional reflection-type optical circulator disclosed in patent document 2.
Figure 37A:
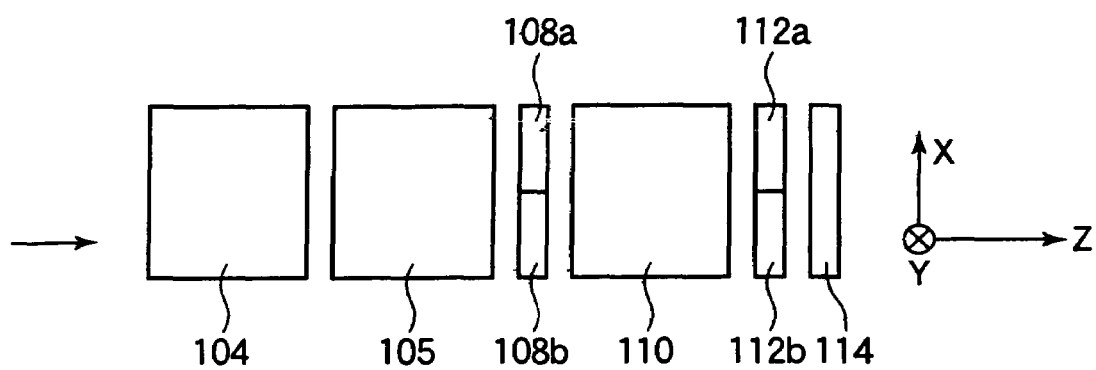
FIGS. 37A and 37B are views showing a structure of a conventional reflection-type optical circulator disclosed in patent document 3.
Figure 37B:
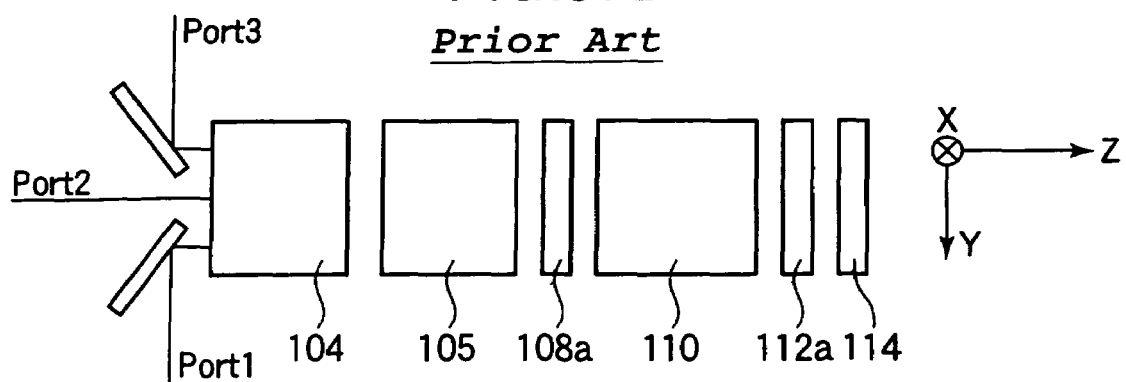

Next, the operation of the reflection-type optical switch 10 according to this embodiment will be described with reference to FIG. 32 and FIG. 33. FIG. 32 and FIG. 33 are views in which polarization states of light beams passing through the respective optical elements constituting the reflection-type optical switch 10 are viewed in the −Z direction. FIGS. 32 and 33 exemplify light incident from the light incoming port P1 among the three light incoming ports P1, P2 and P3. FIGS. 32(*a*) and 33(*a*) show polarization states of light beams at light incoming/outgoing planes Z1 of the birefringent plates 11 and 12 at the −Z side as shown in FIGS. 31A and 31B. FIGS. 32(*b*) and 33(*b*) show polarization states of light beams at light incoming/outgoing planes Z2 of the birefringent plates 11 and 12 at the +Z side. FIGS. 32(*c*) and 33(*c*) show polarization states of light beams at a light incoming/outgoing plane Z3 of the birefringent plate 13 at the −Z side. FIGS. 32(*d*) and 33(*d*) show polarization states of light beams at a light incoming/outgoing plane Z4 of the birefringent plate 13 at the +Z side.

In order to facilitate understanding, FIGS. 32 and 33 also schematically show a state in which the birefringent plates 11 and 12, the Faraday rotator 20 and the birefringent plate 13 are viewed in the −Z direction, and a state in which a dihedral reflector 32 is viewed in the −Y direction. Besides, FIGS. 32 and 33 show an imaginary grid for indicating positions of respective light beams. Polarization directions of respective light beams are indicated by double-headed arrows.

First, a description will be given to a state of light incident from the light incoming port P1 in a state (first state) in which the magnetic domain A (first magnetic domain) is formed in the region of the Faraday rotator 20 at the +Y side by the magnetic field application systems 71 and 72, and the magnetic domain B (second magnetic domain) is formed in the region thereof at the −Y side with reference to FIG. 32. FIG. 32 shows light incident from the light incoming port P1 and emitted from the light outgoing port P11 to the outside like light beams indicated by a solid line and a broken line of FIGS. 31A and 31B. As shown at the left side of FIG. 32(a), a light beam L181 incident from the light incoming port P1 is incident on the birefringent plate (first birefringent plate) 11, is separated into an ordinary ray L182a (first light beam) and an extraordinary ray L182b (second light beam) axially shifted in a direction of an arrow C1 as shown at the left side of FIG. 32(b), and they are emitted from the birefringent plate 11. Next, the light beam L182a of the ordinary ray component is incident on the magnetic domain A (first Faraday rotating part) of the Faraday rotator 20, and the light beam L182b of the extraordinary ray component is incident on the magnetic domain B (second Faraday rotating part) of the Faraday rotator 20. As shown at the left side of FIG. 32(c), the light beam L182a is emitted from the Faraday rotator 20 as a light beam L183a (third light beam) in which the polarization direction is rotated clockwise by 45° with respect to the Z axis when viewed in the −Z direction, and the light beam L182b is emitted from the Faraday rotator 20 as a light beam L183b (fourth light beam) in which the polarization direction is rotated counterclockwise by 45°. By this, the polarization directions of the light beams L183a and L183b become parallel to a plane formed by crossing of a virtual straight line parallel to the traveling directions of the light beams L183a and L183b and a virtual straight line parallel to the optic axis of the birefringent plate (polarizer) 13. Next, as shown at the left side of FIG. 32(d), the light beam L183a and L183b are incident as the extraordinary ray on one surface of the birefringent plate 13, are respectively axially shifted in a direction of an arrow C2, and are emitted from the other surface of the birefringent plate 13 as light beams L184a and L184b. The light beams L184a and L184b are reflected by the dihedral reflector 32, and as shown at the right side of FIG. 32(d), they are respectively incident on the other surface of the birefringent plate 13 as light beams L185a and L185b whose optical paths are changed.

As shown at the right side of FIG. 32(c), the light beams L185a and L185b are respectively axially shifted in a direction opposite to the arrow C2, and are emitted from the one surface of the birefringent plate 13 as light beams L186a and L186b. The light beam L186a is incident on the magnetic domain A (third Faraday rotating part) of the Faraday rotator 20, and the light beam L186b is incident on the magnetic domain B (fourth Faraday rotating part). As shown at the right side of FIG. 32(b), the light beam L186a is emitted from the Faraday rotator 20 as a light beam L187a in which the polarization direction is rotated clockwise by 45° with respect to the Z axis when viewed in the −Z direction, and the light beam L186b is emitted from the Faraday rotator 20 as a light beam L187b in which the polarization direction is rotated counterclockwise by 45°. The light beam L187a is incident on the birefringent plate (second birefringent plate) 12 and becomes the extraordinary ray, and the light beam L187b is incident on the birefringent plate 12 and becomes the ordinary ray. As show at the right side of FIG. 32(a), the light beam 187a is axially shifted in a direction opposite to an arrow C3, is combined with the light beam L187b, and is emitted as a light beam L188 from the birefringent plate 12. The light beam L188 is incident on the light outgoing port P11, and is emitted to the outside. All the light incident on the light incoming port P1 is emitted from the light outgoing port P11 independently of polarization.

As stated above, in the reflection-type optical switch 10 of this embodiment, in the first state, the input light beam from the light incoming port P1 is outputted from the light outgoing port P11, and the input light beam from the light incoming port P2 is outputted from the light outgoing port P12. Similarly, the input light beam from the light incoming port P3 is outputted from the light outgoing port P13.

FIG. 33 shows a state of light incident from the light incoming port P1 in a state (second state) in which the magnetic domain B is formed in the region of the Faraday rotator 20 at the +Y side, and the magnetic domain A is formed in the region thereof at the −Y side by the magnetic field application systems 71 and 72. In the first state shown in FIGS. 32A to 32D, all of the light beams L183a and L183b, and the light beams L185a and L185b pass through the birefringent plate 13 as the extraordinary rays. On the other hand, in the second state shown in FIGS. 33A to 33D, all of light beams L183a and L183b, and light beams L185a and L185b pass through the birefringent plate 13 as ordinary rays. By this, in the second state, an input light beam from the light incoming port P1 is outputted from the light outgoing port P12, not the light outgoing port P11, and an input light beam from the light incoming port P2 is outputted from the light outgoing port P13, not the light outgoing port P12. Similarly, an input light from the light incoming port P3 is outputted from the light outgoing port P14.

When the reflection-type optical switch 10 according to this embodiment as described above is used in the first and the second states, the reflection-type optical switch by combination of various input/output ports can be realized. For example, by using the light incoming port P1, and the light outgoing ports P11 and P12, a 1×2 optical switch can be realized. In this case, in the first state, the light incoming port P1 and the light outgoing port P11 are optically connected, and in the second state, the light incoming port P1 and the light outgoing port P12 are optically connected.

Besides, by using the light incoming ports P1 and P2 and the light outgoing port P12, a 2×1 light switch can be realized. In this case, in the first state, the light incoming port P2 and the light outgoing port P12 are optically connected, and in the second state, the light incoming port P1 and the light outgoing port P12 are optically connected.

Besides, the light outgoing port P14 is connected to the light incoming port P1, and further, the light incoming port P2, the light incoming port P3, and the light outgoing ports P12 and P13 are used, so that a 2×2 optical switch can be realized. In this case, in the first state, the light incoming port P2 and the light outgoing port P12 are optically connected, and the light incoming port P3 and the light outgoing port P13 are optically connected. In the second state, the light incoming port P2 and the light outgoing port P13 are optically connected, and the light incoming port P3 is optically connected to the light outgoing port P12 through the light outgoing port P14 and the light incoming port P1.

In this embodiment, a light beam having passed through one of the birefringent plates 11 and 12 having the same optical characteristics passes through the other as an extraordinary ray, whereas a light beam having passed through one of the birefringent plates 11 and 12 as an extraordinary ray passes through the other as an ordinary ray. Besides, in a period until the light beams are again incident on the Faraday rotator 20 after passing through the Faraday rotator 20, the polarization directions of the two separated light beams are the same. Accordingly, in the reflection-type optical switch 10 according to this embodiment, since the optical path lengths of the two polarization components are equal to each other, the PMD value becomes zero.

Although the reflection-type optical switch 10 of this embodiment has the structure in which the magnetic field application system for inverting the magnetization is added to the reflection-type optical circulator 1 of the first embodiment, a reflection-type optical switch can also be constructed by adding a similar magnetic field application system to, for example, the reflection-type optical circulator 1' of the second embodiment shown in FIGS. 7A and 7B. Further, by adding a similar magnetic field application system to the reflection-type optical isolator 2 of the third embodiment shown in FIGS. 13A and 13B, a reflection-type optical isolator can be realized in which in the first state, a direction from the port P1 to the port P2 becomes a forward direction, and in the second state, a direction from the port P2 to the port P1 becomes a forward direction.

The invention is not limited to the above embodiments, and various modifications can be made.

For example, in the first and the second embodiments, although the four light incoming/outgoing ports are provided, the invention is not limited to this, and it is also naturally possible to provide three or five or more light incoming/outgoing ports. Besides, in the seventh embodiment, the three light incoming ports are provided, and the four light outgoing ports are provided, however, the invention is not limited to this, and it is possible to variously select the number of light incoming ports, the number of light outgoing ports and their combination according to usage.

Further, in the first to the third embodiments, although the lenses 51, 52, 53 and 54 are disposed between the optical fibers 41, 42, 43 and 44 and the birefringent plates 11 and 12 (or 14 and 14'), the lenses 51, 52, 53 and 54 are not provided, and the surface of the reflecting mirror on which the reflecting film 30 is formed may be formed into a spherical shape to have a lens function. Besides, the reflecting mirror is made to have the lens function, and further, the lenses 51, 52, 53 and 54 may also be provided.

Besides, in the embodiments, the reflection-type optical circulator and the reflection-type optical isolator include the permanent magnets 61 and 62. However, by using a material having relatively high retentivity to form a latching type Faraday rotator 20 and by forming a structure with two magnetic domains in advance, the reflection-type optical circulator and the reflection-type optical isolator may be constructed without using the permanent magnets 61 and 62. In this case, for example, as shown in FIG. 1B, the permanent magnets 61 and 62 are disposed in the vicinity of the Faraday rotator 20 to form the structure with two magnetic domains, and then, the permanent magnets 61 and 62 are removed. By this, the permanent magnets 61 and 62 become unnecessary, and the reflection-type optical circulator and the reflection-type optical isolator can be greatly miniaturized.

Further, in the above embodiments, although the birefringent plate is used as the polarization separation/combination part, a polarization beam splitter or the like can also be used as the polarization separation/combination part.

What is claimed is:

1. A reflection-type optical device comprising:
   a first polarization separation/combination part for separating a light beam incident from a first port into a first light beam having an ordinary ray component and a second light beam having an extraordinary ray component and emitting them;
   a first Faraday rotating part for rotating a polarization direction of the first light beam by 45° and emitting it as a third light beam;
   a second Faraday rotating part for rotating a polarization direction of the second light beam by −45° and emitting it as a fourth light beam having a polarization direction substantially parallel to a polarization direction of the third light beam;
   a polarizer which allows the third and the fourth light beams to pass through;
   a reflecting part for reflecting the third and the fourth light beams; and
   a second polarization separation/combination part which allows the third light beam, which has been reflected by the reflecting part and has passed through the polarizer and a third Faraday rotating part, to pass through as an extraordinary ray, allows the fourth light beam, which has been reflected by the reflecting part and has passed through the polarizer and a fourth Faraday rotating part, to pass through as an ordinary ray, combines the third and the fourth light beams, and emits them from a second port.

2. A reflection-type optical device according to claim 1, wherein the first to the fourth Faraday rotating parts include a same magneto-optical element.

3. A reflection-type optical device according to claim 1, wherein
   the first polarization separation/combination part includes a first birefringent plate,
   the second polarization separation/combination part includes a second birefringent plate,
   the first and the third Faraday rotating parts include a same region of a first magneto-optical element, and
   the second and the fourth Faraday rotating parts include a same region of a second magneto-optical element.

4. A reflection-type optical device according to claim 3, wherein the first and the second magneto-optical elements are the same.

5. A reflection-type optical device according to claim 3, wherein
   the polarizer is a third birefringent plate, and
   the reflecting part is a dihedral reflector.

6. A reflection-type optical device according to claim 1, wherein
   the first and the second polarization separation/combination parts include a same birefringent plate,
   the first and the fourth Faraday rotating parts include a same region of a first magneto-optical element, and
   the second and the third Faraday rotating parts include a same region of a second magneto-optical element.

7. A reflection-type optical device according to claim 6, wherein the first and the second magneto-optical elements are the same.

8. A reflection-type optical device according to claim 6, further comprising at least one ½ wavelength plate for rotating a polarization direction by 90°,
   wherein the reflecting part includes a lens and a reflecting film.

9. A reflection-type optical device according to claim 1, wherein the first Faraday rotating part and the second Faraday rotating part respectively include Faraday rotators which have a same material composition and in which directions of magnetization are opposite to each other.

10. A reflection-type optical device according to claim 1, wherein
    the first Faraday rotating part has a magnetic domain A in which magnetization is made uniformly to have one direction in one region of a Faraday rotator, and
    the second Faraday rotating part has a magnetic domain B in which magnetization is made uniformly to have a direction opposite to the magnetic domain A in the other region of the Faraday rotator.

11. A reflection-type optical device according to claim 1, wherein the first and the second polarization separation/combination part include a same birefringent plate.

12. A reflection-type optical device according to claim 1, further comprising a magnetic field application system inverting directions of magnetization of the first to the fourth Faraday rotating parts by applying a variable magnetic field so as to invert polarization rotation directions of the first to the fourth Faraday rotating parts.

* * * * *